(12) United States Patent
Okamoto et al.

(10) Patent No.: US 7,910,682 B2
(45) Date of Patent: Mar. 22, 2011

(54) CURABLE COMPOSITION AND METHODS FOR IMPROVING RECOVERY PROPERTIES AND CREEP PROPERTIES

(75) Inventors: Toshihiko Okamoto, Takasago (JP); Katsuyu Wakabayashi, Takasago (JP); Hiroshi Ito, Takasago (JP); Hiroshi Ando, Takasago (JP)

(73) Assignee: Kaneka Corporation, Osaka (JP)

( * ) Notice: Subject to any disclaimer, the term of this patent is extended or adjusted under 35 U.S.C. 154(b) by 1147 days.

(21) Appl. No.: 10/533,309

(22) PCT Filed: Oct. 22, 2003

(86) PCT No.: PCT/JP03/13498
§ 371 (c)(1),
(2), (4) Date: Jan. 5, 2006

(87) PCT Pub. No.: WO2004/039892
PCT Pub. Date: May 13, 2004

(65) Prior Publication Data
US 2006/0128919 A1    Jun. 15, 2006

(30) Foreign Application Priority Data

Nov. 1, 2002  (JP) .................................. 2002-319335
Dec. 16, 2002  (JP) .................................. 2002-364490

(51) Int. Cl.
*C08L 83/04* (2006.01)
*C08G 77/04* (2006.01)
*B32B 27/28* (2006.01)

(52) U.S. Cl. ................ 528/25; 528/26; 528/31; 528/33; 528/34

(58) Field of Classification Search .................... 528/25, 528/26, 31, 33, 34
See application file for complete search history.

(56) References Cited

U.S. PATENT DOCUMENTS

| | | | |
|---|---|---|---|
| 3,632,557 A | 1/1972 | Brode et al. | |
| 3,857,825 A | 12/1974 | Streck et al. | |
| 3,865,759 A * | 2/1975 | Smith | 521/86 |
| 3,888,815 A | 6/1975 | Bessmer et al. | |
| 3,971,751 A * | 7/1976 | Isayama et al. | 524/783 |
| 3,989,790 A * | 11/1976 | Bruner et al. | 264/225 |
| 4,276,402 A | 6/1981 | Chromecek et al. | |
| 4,310,640 A * | 1/1982 | Kato et al. | 525/100 |
| 4,334,036 A | 6/1982 | Yonezawa | |
| 4,349,603 A | 9/1982 | Kameyama et al. | |
| 4,358,575 A * | 11/1982 | Lampe et al. | 528/17 |
| 4,395,526 A * | 7/1983 | White et al. | 528/18 |
| 4,449,938 A | 5/1984 | Pollak | |
| 4,507,469 A | 3/1985 | Mita et al. | |
| 4,559,387 A * | 12/1985 | Endo et al. | 525/102 |
| 4,562,237 A | 12/1985 | Okuno et al. | |
| 4,707,517 A | 11/1987 | Bullen et al. | |
| 4,720,530 A | 1/1988 | Wüminghausen et al. | |
| 4,735,998 A | 4/1988 | Itoh et al. | |
| 4,818,790 A * | 4/1989 | Ooka et al. | 525/103 |
| 4,873,305 A | 10/1989 | Cavezzan et al. | |
| 4,904,721 A * | 2/1990 | Hanaoka et al. | 524/266 |
| 4,910,255 A * | 3/1990 | Wakabayashi et al. | 525/100 |
| 4,954,565 A | 9/1990 | Liles | |
| 4,960,844 A | 10/1990 | Singh | |
| 4,977,228 A * | 12/1990 | Wakabayashi et al. | 528/12 |
| 4,994,327 A * | 2/1991 | Kato et al. | 428/447 |
| 5,030,691 A * | 7/1991 | Kohmitsu et al. | 525/100 |
| 5,306,759 A * | 4/1994 | Sakagami et al. | 524/379 |
| 5,399,607 A | 3/1995 | Nanbu et al. | |
| 5,554,709 A | 9/1996 | Emmerling et al. | |
| 5,639,825 A | 6/1997 | Nanbu et al. | |
| 5,648,427 A * | 7/1997 | Fujita et al. | 525/104 |
| 5,684,094 A * | 11/1997 | Suzuki et al. | 525/403 |
| 5,807,921 A | 9/1998 | Hill et al. | |
| 5,986,014 A | 11/1999 | Kusakabe et al. | |
| 6,166,163 A * | 12/2000 | Kudo et al. | 528/14 |
| 6,204,350 B1 | 3/2001 | Liu et al. | |
| 6,207,766 B1 * | 3/2001 | Doi et al. | 525/403 |
| 6,271,309 B1 | 8/2001 | Roberts et al. | |
| 6,287,701 B1 | 9/2001 | Oochi et al. | |
| 6,350,345 B1 | 2/2002 | Kotani et al. | |
| 6,407,146 B1 | 6/2002 | Fujita et al. | |
| 6,410,640 B1 | 6/2002 | Fukunaga et al. | |

(Continued)

FOREIGN PATENT DOCUMENTS

EP    50248 A    4/1982

(Continued)

OTHER PUBLICATIONS

Sealing News 35, Published by the Japan Sealant Industry Association, Jan. 25, 1989, pp. 15-27 and 40.

*Primary Examiner* — Randy Gulakowski
*Assistant Examiner* — Robert Loewe
(74) *Attorney, Agent, or Firm* — Sughrue Mion, PLLC

(57) ABSTRACT

Disclosed are a curable composition characterized by using a curable composition including an organic polymer (A1) having one or more silicon-containing functional groups capable of cross-linking by forming siloxane bonds in which the one or more silicon-containing functional groups capable of cross-linking by forming siloxane bonds are silicon-containing functional groups each having three or more hydrolyzable groups on one or more silicon atoms thereof; and a method for controlling the recovery properties, durability and creep resistance of the cured article. Herewith, the present invention provides a curable composition capable of giving a cured article excellent in recovery properties, durability and creep resistance, and a method for controlling the recovery properties, durability and creep resistance of the cured article.

7 Claims, No Drawings

U.S. PATENT DOCUMENTS

| | | |
|---|---|---|
| 6,552,118 B2 | 4/2003 | Fujita et al. |
| 6,642,309 B2 | 11/2003 | Komitsu et al. |
| 6,703,442 B1 | 3/2004 | Ando et al. |
| 6,720,373 B2 | 4/2004 | Lin et al. |
| 6,773,758 B2 * | 8/2004 | Yamanaka ............... 427/407.1 |
| 6,884,852 B1 | 4/2005 | Klauck et al. |
| 7,045,004 B1 * | 5/2006 | Kasei et al. ............. 106/287.16 |
| 7,094,841 B2 * | 8/2006 | Yamanaka ................... 525/474 |
| 7,115,695 B2 | 10/2006 | Okamoto et al. |
| 2001/0031315 A1 * | 10/2001 | Okamoto et al. ........... 427/372.2 |
| 2002/0010271 A1 * | 1/2002 | Toui et al. ..................... 525/100 |
| 2002/0015795 A1 * | 2/2002 | Toui et al. .................. 427/407.1 |
| 2002/0016411 A1 | 2/2002 | Ando et al. |
| 2002/0048680 A1 * | 4/2002 | Yamanaka ................... 428/447 |
| 2002/0086942 A1 | 7/2002 | Fujita et al. |
| 2002/0115811 A1 | 8/2002 | Huang et al. |
| 2002/0182529 A1 * | 12/2002 | Hoshi et al. .................. 430/138 |
| 2003/0092863 A1 * | 5/2003 | Doi et al. ........................ 528/25 |
| 2003/0096904 A1 | 5/2003 | Hakuta et al. |
| 2003/0105261 A1 * | 6/2003 | Komitsu et al. ................ 528/10 |
| 2004/0176518 A1 * | 9/2004 | Okamoto et al. ............ 524/442 |
| 2004/0181025 A1 | 9/2004 | Schindler et al. |
| 2004/0198885 A1 * | 10/2004 | Okamoto et al. ............. 524/394 |
| 2004/0266950 A1 | 12/2004 | Yano et al. |
| 2006/0128919 A1 | 6/2006 | Okamoto et al. |
| 2006/0252903 A1 | 11/2006 | Wakabayashi et al. |
| 2006/0264545 A1 | 11/2006 | Wakabayashi et al. |
| 2007/0167583 A1 | 7/2007 | Yano et al. |

FOREIGN PATENT DOCUMENTS

| | | |
|---|---|---|
| EP | 0 310 129 A2 | 4/1989 |
| EP | 0 538 881 A2 | 4/1993 |
| EP | 0 546 310 A2 | 6/1993 |
| EP | 0 673 972 A1 | 9/1995 |
| EP | 0 771 855 A2 | 5/1997 |
| EP | 0 918 062 A1 | 5/1999 |
| EP | 1 000 980 A1 | 5/2000 |
| EP | 1 024 170 A1 | 8/2000 |
| EP | 1 095 981 A1 | 5/2001 |
| EP | 1 099 728 A1 | 5/2001 |
| EP | 1 285 946 A1 | 2/2003 |
| EP | 1 403 319 A1 | 3/2004 |
| EP | 1 445 287 A1 | 8/2004 |
| EP | 1 471 113 A1 | 10/2004 |
| EP | 1 550 700 A1 | 7/2005 |
| GB | 1 234034 A | 6/1971 |
| JP | 9-12860 A | 1/1977 |
| JP | 55-9669 A | 1/1980 |
| JP | 62-13452 A | 1/1987 |
| JP | 3-122163 A | 5/1991 |
| JP | 05-039428 A | 2/1993 |
| JP | 06-145453 | 5/1994 |
| JP | 6-145453 A | 5/1994 |
| JP | 08-127724 A | 5/1996 |
| JP | 9-183902 A | 7/1997 |
| JP | 09-194728 A | 7/1997 |
| JP | 9-272714 A | 10/1997 |
| JP | 10-245482 A | 9/1998 |
| JP | 10-245484 A | 9/1998 |
| JP | 10-251552 A | 9/1998 |
| JP | 10-324793 A | 12/1998 |
| JP | 10-330630 A | 12/1998 |
| JP | 11-012473 A | 1/1999 |
| JP | 11-012480 A | 1/1999 |
| JP | 11-021463 A | 1/1999 |
| JP | 11-029713 A | 2/1999 |
| JP | 11-049969 A | 2/1999 |
| JP | 11-049970 A | 2/1999 |
| JP | 11-100433 A | 4/1999 |
| JP | 11-116831 A | 4/1999 |
| JP | 11-124509 A | 5/1999 |
| JP | 11-130931 A | 5/1999 |
| JP | 2000-034391 A | 2/2000 |
| JP | 2000-109676 A | 4/2000 |
| JP | 2000-109677 A | 4/2000 |
| JP | 2000-109678 A | 4/2000 |
| JP | 2000-129126 A | 5/2000 |
| JP | 2000-129145 A | 5/2000 |
| JP | 2000-129146 A | 5/2000 |
| JP | 2000-129147 A | 5/2000 |
| JP | 2000-136282 | 5/2000 |
| JP | 2000-136282 A | 5/2000 |
| JP | 2000-136312 A | 5/2000 |
| JP | 2000-136313 A | 5/2000 |
| JP | 2000-239338 A | 9/2000 |
| JP | 2000-327771 A | 11/2000 |
| JP | 2001-055503 A | 2/2001 |
| JP | 2001-072854 A | 3/2001 |
| JP | 2001-072855 A | 3/2001 |
| JP | 2001-139820 | 5/2001 |
| JP | 2001-139820 A | 5/2001 |
| JP | 2001-163918 A | 6/2001 |
| JP | 2001-172515 A | 6/2001 |
| JP | 2001-181532 A | 7/2001 |
| JP | 2001-342363 A | 12/2001 |
| JP | 2002-20458 A | 1/2002 |
| JP | 2002-155201 A | 5/2002 |
| JP | 2002-285018 A | 10/2002 |
| JP | 2006-316287 A | 11/2006 |
| JP | 4101632 B2 | 6/2008 |
| JP | 2008-150627 A | 7/2008 |
| JP | 2008-179830 A | 8/2008 |
| JP | 4150220 B2 | 9/2008 |
| WO | WO 98/47939 A1 | 10/1998 |
| WO | WO 99/48942 A1 | 9/1999 |
| WO | 00/56817 A1 | 9/2000 |
| WO | 2004/031299 A1 | 4/2004 |
| WO | 2004/031300 A1 | 4/2004 |

* cited by examiner

CURABLE COMPOSITION AND METHODS FOR IMPROVING RECOVERY PROPERTIES AND CREEP PROPERTIES

This application is a national stage patent application of PCT/JP2003/13498 filed on Oct. 22, 2003, claiming priority to Japanese patent application No. 2002-364490 filed on Dec. 16, 2002 and Japanese patent application No. 2002-319335, filed on Nov. 1, 2002.

The present invention relates to a curable composition containing an organic polymer which has silicon-containing functional groups (hereinafter also referred to as "reactive silicon groups") capable of cross-linking by forming siloxane bonds.

BACKGROUND ART

It is known that an organic polymer having at least one reactive silicon group in the molecule has an interesting property such that even at room temperature the organic polymer yields a rubber-like cured article through cross-linking based on the formation of siloxane bonds involving the hydrolysis reaction and the like of the reactive silicon group caused by moisture and the like.

Among these reactive silicon group-containing polymers, polyoxyalkylene polymers and polyisobutylene polymers have already been industrially produced to be widely used in applications to sealants, adhesives, coating materials and the like.

When resins for use in adhesives used as adhesives for interior panels, adhesives for exterior panels, adhesives for tiling, adhesives for stone tiling, adhesives for finishing walls and adhesives for vehicle panels and the like are poor in recovery properties and creep resistance, the adhesive layers are distorted with time due to the weights of the adherends and external stress to shift the positions of panels, tiles and stone pieces as the case may be. Accordingly, the compositions to be used in these adhesives are required to be excellent in recovery properties and creep resistance.

Sealants are generally used for the purpose of imparting water tightness and air tightness by filling these materials in the joints and gaps between various members. Accordingly, because the long term followability to the portions to which these adhesives are used is extremely important, the physical properties of the cured articles of these adhesives are required to be excellent both in recovery properties and in durability. Particularly, excellent recovery properties and durability are required for compositions to be used for sealants for working joints in buildings with large joint variation (coping, periphery of window glass, periphery of window frame/window sash, curtain wall, various exterior panels).

On the other hand, there have been disclosed room temperature-curable compositions which have as an indispensable component an organic polymer containing the one or more reactive silicon groups having three hydrolyzable groups bonded to the silicon atom thereof (for example, see); however, in these prior arts, descriptions are mainly made on the fast curability based on the reactive silicon group having three hydrolyzable groups bonded thereto, and there has been made no description to suggest the recovery properties, creep resistance and durability.

Patent Document 1: Japanese Patent Laid-Open No. 10-245482.
Patent Document 2: Japanese Patent Laid-Open No. 10-245484.
Patent Document 3: Japanese Patent Laid-Open No. 10-251552.
Patent Document 4: Japanese Patent Laid-Open No. 10-324793.
Patent Document 5: Japanese Patent Laid-Open No. 10-330630.
Patent Document 6: Japanese Patent Laid-Open No. 11-12473.
Patent Document 7: Japanese Patent Laid-Open No. 11-12480.
Patent Document 8: Japanese Patent Laid-Open No. 11-21463.
Patent Document 9: Japanese Patent Laid-Open No. 11-29713.
Patent Document 10: Japanese Patent Laid-Open No. 11-49969.
Patent Document 11: Japanese Patent Laid-Open No. 11-49970.
Patent Document 12: Japanese Patent Laid-Open No. 11-116831.
Patent Document 13: Japanese Patent Laid-Open No. 11-124509.
Patent Document 14: WO98-47939.
Patent Document 15: Japanese Patent Laid-Open No. 2000-34391.
Patent Document 16: Japanese Patent Laid-Open No. 2000-109676.
Patent Document 17: Japanese Patent Laid-Open No. 2000-109677.
Patent Document 18: Japanese Patent Laid-Open No. 2000-109678.
Patent Document 19: Japanese Patent Laid-Open No. 2000-129126.
Patent Document 20: Japanese Patent Laid-Open No. 2000-129145.
Patent Document 21: Japanese Patent Laid-Open No. 2000-129146.
Patent Document 22: Japanese Patent Laid-Open No. 2000-129147.
Patent Document 23: Japanese Patent Laid-Open No. 2000-136312.
Patent Document 24: Japanese Patent Laid-Open No. 2000-136313.
Patent Document 25: Japanese Patent Laid-Open No. 2000-239338.
Patent Document 26: Japanese Patent Laid-Open No. 2001-55503.
Patent Document 27: Japanese Patent Laid-Open No. 2001-72854.
Patent Document 28: Japanese Patent Laid-Open No. 2001-72855.
Patent Document 29: Japanese Patent Laid-Open No. 2000-327771.

DISCLOSURE OF THE INVENTION

In view of the above described circumstances, the present invention takes as an object thereof the provision of a curable composition capable of giving a cured article excellent in recovery properties, durability and creep resistance. Additionally, the present invention takes as another object thereof the provision of an adhesive for panel or a sealant for working joint in building improved in recovery properties, durability and creep resistance. Moreover, the present invention takes as another object thereof the provision of a method for controlling the recovery properties, durability and creep resistance of a cured article.

As a result of a diligent investigation to solve such problems as described above, the present inventors completed the present invention by discovering that the recovery properties, durability and creep resistance are improved by use of silicon-containing functional groups having three or more hydrolyzable groups on the one or more silicon atoms thereof as the reactive silicon groups in the composition.

More specifically, a first aspect of the present invention relates to a curable composition characterized by comprising: an organic polymer (A1) having one or more silicon-containing functional groups capable of cross-linking by forming siloxane bonds in which the one or more silicon-containing functional groups capable of cross-linking by forming siloxane bonds are silicon-containing functional groups each having three or more hydrolyzable groups on one or more silicon atoms thereof; and a silicate (B).

A preferred embodiment relates to the curable composition according to the above description, characterized in that the silicate is a condensate of a tetraalkoxysilane.

A further preferred embodiment is the curable composition according to any one of the above descriptions, characterized by further comprising a tin carboxylate (C).

A second aspect of the present invention relates to a curable composition characterized by comprising: an organic polymer (A1) having one or more silicon-containing functional groups capable of cross-linking by forming siloxane bonds in which the one or more silicon-containing functional groups capable of cross-linking by forming siloxane bonds are silicon-containing functional groups each having three or more hydrolyzable groups on one or more silicon atoms thereof; and a tin carboxylate (C1) in which the α-carbon of the carboxyl group is a quaternary carbon atom.

A third aspect of the present invention relates to a curable composition characterized by comprising: an organic polymer (A1) having one or more silicon-containing functional groups capable of cross-linking by forming siloxane bonds in which the one or more silicon-containing functional groups capable of cross-linking by forming siloxane bonds are silicon-containing functional groups each having three or more hydrolyzable groups on one or more silicon atoms thereof; a tin carboxylate (C); and an organotin catalyst (D).

A fourth aspect of the present invention relates to a curable composition being characterized by comprising: an organic polymer (A1) having one or more silicon-containing functional groups capable of cross-linking by forming siloxane bonds in which the one or more silicon-containing functional groups capable of cross-linking by forming siloxane bonds are silicon-containing functional groups each having three or more hydrolyzable groups on one or more silicon atoms thereof; and a non-tin catalyst (E).

A preferred embodiment relates to the curable composition according to the above description, characterized in that the non-tin catalyst is one or more selected from a carboxylic acid, a metal carboxylate other than a tin carboxylate and an organic titanate.

A preferred embodiment relates to the curable composition according to the above description, characterized in that the non-tin catalyst is a catalyst which contains a carboxylic acid and an amine compound.

A further preferred embodiment relates to the curable composition according to any one of the above descriptions, characterized in that the carboxylic acid is a carboxylic acid in which the α-carbon atom of the carboxyl group is a quaternary carbon atom.

A fifth aspect of the present invention relates to a curable composition characterized by comprising: an organic polymer (A1) having one or more silicon-containing functional groups capable of cross-linking by forming siloxane bonds in which the one or more silicon-containing functional groups capable of cross-linking by forming siloxane bonds are silicon-containing functional groups each having three or more hydrolyzable groups on one or more silicon atoms thereof; and a microballoon (F).

A sixth aspect of the present invention relates to a curable composition characterized by comprising: an organic polymer (A1) having one or more silicon-containing functional groups capable of cross-linking by forming siloxane bonds in which the one or more silicon-containing functional groups capable of cross-linking by forming siloxane bonds are silicon-containing functional groups each having three or more hydrolyzable groups on one or more silicon atoms thereof, and the proportion of the organic polymer in the total amount of the curable composition being 5 to 28 wt %.

A preferred embodiment relates to the curable composition according to any one of the above descriptions, characterized in that the organic polymer having one or more silicon-containing functional groups capable of cross-linking by forming siloxane bonds is an organic polymer obtained by an addition reaction between an organic polymer having one or more unsaturated groups introduced into the terminals thereof and a hydrosilane compound represented by the general formula (1):

$$H\text{—}SiX_3 \tag{1}$$

where X represents a hydroxy group or a hydrolyzable group, and three X's may be the same or different.

A further preferred embodiment relates to the curable composition according to any one of the above descriptions, characterized in that the one or more silicon-containing functional groups capable of cross-linking by forming siloxane bonds each are a trimethoxysilyl group or a triethoxysilyl group.

A further preferred embodiment relates to the curable composition according to any one of the above descriptions, characterized in that the one or more silicon-containing functional groups capable of cross-linking by forming siloxane bonds each are a group represented by the general formula (2):

$$\text{—}Si(OR^1)_3 \tag{2}$$

where three $R^1$s each are independently a monovalent organic group having 2 to 20 carbon atoms.

A seventh aspect of the present invention relates to a curable composition characterized by comprising: an organic polymer (A2) having one or more silicon-containing functional groups capable of cross-linking by forming siloxane bonds in which the one or more silicon-containing functional groups capable of cross-linking by forming siloxane bonds are represented by the general formula (2):

$$\text{—}Si(OR^1)_3 \tag{2}$$

where $R^1$s are the same as described above; and an aminosilane coupling agent (G) having a group represented by the general formula (3):

$$\text{—}SiR^2{}_a(OR^3)_{3\text{-}a} \tag{3}$$

where a $R^2$s each are independently a monovalent organic group having 1 to 20 carbon atoms, (3-a) $R^3$s each are independently a monovalent organic group having 2 to 20 carbon atoms, and a represents 0, 1 or 2.

An eighth aspect of the present invention relates to a curable composition characterized in that the curable composition is obtained by aging a composition comprising: an organic polymer (A2) having one or more silicon-containing functional groups capable of cross-linking by forming siloxane bonds in which the one or more silicon-containing functional groups capable of cross-linking by forming siloxane bonds are represented by the general formula (2):

$$-\text{Si}(OR^1)_3 \quad (2)$$

where $R^1$s are the same as described above; and an aminosilane coupling agent (H) having a group represented by the general formula (4):

$$-\text{SiR}^4{}_b(OCH_3)_c(OR^5)_{3-b-c} \quad (4)$$

where b $R^4$s each are independently a monovalent organic group having 1 to 20 carbon atoms, (3-b-c) $R^5$s each are independently a monovalent organic group having 2 to 20 carbon atoms, b represents 0, 1 or 2, and c represents 1, 2 or 3; the relation, 3-b-c$\geq$0, is to be satisfied.

A ninth aspect of the present invention relates to a curable composition characterized by comprising: an organic polymer (A2) having one or more silicon-containing functional groups capable of cross-linking by forming siloxane bonds in which the one or more silicon-containing functional groups capable of cross-linking by forming siloxane bonds are represented by the general formula (2):

$$-\text{Si}(OR^1)_3 \quad (2)$$

where $R^1$s are the same as described above; and an epoxy resin (I).

A tenth aspect of the present invention relates to a curable composition characterized by comprising: a polyoxyalkylene polymer (A3) having one or more silicon-containing functional groups capable of cross-linking by forming siloxane bonds in which the one or more silicon-containing functional groups capable of cross-linking by forming siloxane bonds are represented by the general formula (2):

$$-\text{Si}(OR^1)_3 \quad (2)$$

where $R^1$s are the same as described above; and a (meth) acrylate copolymer (A4) having one or more silicon-containing functional groups capable of cross-linking by forming siloxane bonds.

A preferred embodiment relates to the curable composition according to the above description, characterized in that the one or more silicon-containing functional groups of the (meth)acrylate copolymer are the groups represented by the general formula (2):

$$-\text{Si}(OR^1)_3 \quad (2)$$

where $R^1$s are the same as described above.

An eleventh aspect of the present invention relates to a curable composition characterized by comprising: a saturated hydrocarbon polymer (A5) having one or more silicon-containing functional groups capable of cross-linking by forming siloxane bonds in which the one or more silicon-containing functional groups capable of cross-linking by forming siloxane bonds are represented by the general formula (2):

$$-\text{Si}(OR^1)_3 \quad (2)$$

where $R^1$s are the same as described above.

A twelfth aspect of the present invention relates to a curable composition characterized by comprising: a meth(acrylate) copolymer (A6) having one or more silicon-containing functional groups capable of cross-linking by forming siloxane bonds in which the one or more silicon-containing functional groups capable of cross-linking by forming siloxane bonds are represented by the general formula (2):

$$-\text{Si}(OR^1)_3 \quad (2)$$

where $R^1$s are the same as described above.

A preferred embodiment relates to the curable composition according to any one of the above descriptions, characterized in that the organic polymer having one or more silicon-containing functional groups capable of cross-linking by forming siloxane bonds is an organic polymer obtained by an addition reaction between an organic polymer having one or more unsaturated groups introduced into the terminals thereof and a hydrosilane compound represented by the general formula (5):

$$H-\text{Si}(OR^1)_3 \quad (5)$$

where $R^1$s are the same as described above.

A further preferred embodiment relates to the curable composition according to any one of the above descriptions, characterized in that the organic polymer having one or more silicon-containing functional groups capable of cross-linking by forming siloxane bonds is an organic polymer which substantially does not contain an amide segment (—NH—CO—) in the main chain skeleton thereof.

A further preferred embodiment relates to the curable composition according to any one of the above descriptions, characterized in that the one or more silicon-containing functional groups capable of cross-linking by forming siloxane bonds each are a triethoxysilyl group.

A further preferred embodiment relates to the curable composition according to any one of the above descriptions, characterized by further comprising an aminosilane coupling agent.

A further preferred embodiment relates to a one-part curable composition according to any one of the above descriptions, characterized by further comprising a dehydrating agent.

A thirteenth aspect of the present invention relates to a method for producing an organic polymer having a group represented by the general formula (6):

$$-\text{Si}(OCH_3)_d(OR^1)_{3-d} \quad (6)$$

where (3-d) $R^1$s each are independently a monovalent organic group having 2 to 20 carbon atoms, and d represents 1, 2 or 3, characterized in that an organic polymer (A2) having one or more silicon-containing functional groups capable of cross-linking by forming siloxane bonds in which the one or more silicon-containing functional groups capable of cross-linking by forming siloxane bonds represented by the general formula (2):

$$-\text{Si}(OR^1)_3 \quad (2)$$

where $R^1$s are the same as described above, is made to undergo ester exchange reaction with a compound (J) having at least one methoxy group capable of undergoing ester exchange reaction.

A fourteenth aspect of the present invention relates to an adhesive for panel, characterized in that the adhesive comprises an organic polymer (A) having one or more silicon-containing functional groups capable of cross-linking by forming siloxane bonds; and a silicate (B).

A fifteenth aspect of the present invention relates to an adhesive for panel characterized by comprising an organic polymer (A1) having one or more silicon-containing functional groups in which the one or more silicon-containing functional groups capable of cross-linking by forming siloxane bonds are silicon-containing functional groups each having three or more hydrolyzable groups on one or more silicon atoms thereof.

A preferred embodiment relates to the adhesive for panel according to the above description, characterized by using a curable composition in which the main chain of the organic polymer (A1) having one or more silicon-containing functional groups capable of cross-linking by forming siloxane bonds is a (meth)acrylate copolymer produced by a living radical polymerization method.

A further preferred embodiment relates to the adhesive for panel according to any one of the above descriptions, characterized by further comprising a silicate (B).

A further preferred embodiment relates to the adhesive for panel according to any one of the above descriptions, characterized by further comprising a tin carboxylate (C).

A further preferred embodiment relates to the adhesive for panel according to any one of the above descriptions, characterized by further comprising an organotin catalyst (D).

A sixteenth aspect of the present invention relates to an adhesive for panel characterized in that an organic polymer having one or more silicon-containing functional groups capable of cross-linking by forming siloxane bonds is an organic polymer (A7) which has on average 1.7 to 5 silicon-containing functional groups capable of cross-linking by forming siloxane bonds per molecule.

A preferred embodiment relates to the adhesive for panel according to the above description, characterized in that the one or more silicon-containing functional groups capable of cross-linking by forming siloxane bonds each are a silicon-containing functional group having three or more hydrolyzable groups on the one or more silicon atoms thereof.

A further preferred embodiment relates to the adhesive for panel according to any one of the above descriptions, characterized in that the organic polymer having one or more silicon-containing functional groups capable of cross-linking by forming siloxane bonds is an organic polymer obtained by an addition reaction between an organic polymer having one or more unsaturated groups introduced into the terminals thereof and a hydrosilane compound represented by the general formula (7):

$$H-(SiR^6{}_{2-f}X_fO)_m-SiR^7{}_{3-e}X_e \qquad (7)$$

where $R^6$ and $R^7$ may be the same or different, and each are an alkyl group having 1 to 20 carbon atoms, an aryl group having 6 to 20 carbon atoms, an aralkyl group having 7 to 20 carbon atoms, or a triorganosiloxy group represented by $(R')_3SiO-$; when two or more $R^6$ or $R^7$ are present, they may be the same or different; here, R' represents a monovalent hydrocarbon group having 1 to 20 carbon atoms, and three R's may be the same or different; X represents a hydroxy group or a hydrolyzable group; when two or more X's are present, they may be the same or different; e represents 0, 1, 2 or 3; f represents 0, 1 or 2; f's in m $(SiR^6{}_{2-f}X_fO)$ groups may be the same or different; m represents an integer of 0 to 19; and the relation, $e+\Sigma f \geq 1$, is to be satisfied.

A further preferred embodiment relates to the adhesive for panel according to any one of the above descriptions, characterized in that the organic polymer having one or more silicon-containing functional groups capable of cross-linking by forming siloxane bonds is an organic polymer obtained by an addition reaction between an organic polymer having one or more unsaturated groups introduced into the terminals thereof and a hydrosilane compound represented by the general formula (1):

$$H-SiX_3 \qquad (1)$$

where X's are the same as described above.

A seventeenth aspect of the present invention relates to an adhesive for panel characterized in that an organic polymer having one or more silicon-containing functional groups capable of cross-linking by forming siloxane bonds is an organic polymer (A8) having a structural moiety represented by the general formula (8):

$$-O-R^8-CH(CH_3)-CH_2-(SiR^6{}_{2-f}X_fO)_m-SiR^7{}_{3-e}X_e \qquad (8)$$

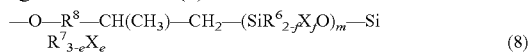

where $R^8$ represents a divalent organic group having 1 to 20 carbon atoms and containing as constituent atoms one or more selected from the group consisting of hydrogen, oxygen and nitrogen; and $R^6$, $R^7$, X, e, f and m are the same as described above.

A further preferred embodiment relates to the adhesive for panel according to the above description, characterized in that the organic polymer having one or more silicon-containing functional groups capable of cross-linking by forming siloxane bonds is an organic polymer obtained by an addition reaction between an organic polymer having one or more unsaturated groups introduced thereinto, represented by the general formula (9):

$$-O-R^8-C(CH_3)=CH_2 \qquad (9)$$

where $R^8$ is the same as described above and a hydrosilane compound represented by the general formula (7):

$$H-(SiR^6{}_{2-f}X_fO)_m-SiR^7{}_{3-e}X_e \qquad (7)$$

where $R^6$, $R^7$, X, e, f and m are the same as described above.

A further preferred embodiment relates to the adhesive for panel according to any one of the above descriptions, characterized in that the organic polymer having one or more silicon-containing functional groups capable of cross-linking by forming siloxane bonds is an organic polymer having a structural moiety represented by the general formula (10):

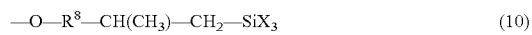

$$-O-R^8-CH(CH_3)-CH_2-SiX_3 \qquad (10)$$

where $R^8$ and X's are the same as described above.

A further preferred embodiment relates to the adhesive for panel according to any one of the above descriptions, characterized in that the organic polymer having one or more silicon-containing functional groups capable of cross-linking by forming siloxane bonds is an organic polymer which substantially does not contain an amide segment ($-NH-CO-$) in the main chain skeleton thereof.

A further preferred embodiment relates to the adhesive for panel according to any one of the above descriptions, characterized in that the one or more silicon-containing functional groups capable of cross-linking by forming siloxane bonds each are a group represented by the general formula (2):

$$-Si(OR^1)_3 \qquad (2)$$

where $R^1$s are the same as described above.

A further preferred embodiment relates to the adhesive for panel according to any one of the above descriptions, characterized in that the one or more silicon-containing functional groups capable of cross-linking by forming siloxane bonds each are a triethoxysilyl group.

An eighteenth aspect of the present invention relates to a sealant for working joint in building, characterized in that the sealant comprises an organic polymer (A) which has one or more silicon-containing functional groups capable of cross-linking by forming siloxane bonds; and a silicate (B).

A nineteenth aspect of the present invention relates to a sealant for working joint in building characterized by comprising an organic polymer (A1) having one or more silicon-containing functional groups capable of cross-linking by forming siloxane bonds in which the one or more silicon-containing functional groups capable of cross-linking by forming siloxane bonds each are a silicon-containing functional group having three or more hydrolyzable groups on the one or more silicon atoms thereof.

A preferred embodiment relates to the sealant for working joint in building according to the above description, characterized by using a curable composition in which the main chain of the organic polymer (A1) having one or more silicon-containing functional groups capable of cross-linking by forming siloxane bonds is a (meth)acrylate copolymer produced by a living radical polymerization method.

A further preferred embodiment relates to the sealant for working joint in building according to any one of the above descriptions, characterized by further comprising a silicate (B).

A further preferred embodiment relates to the sealant for working joint in building according to any one of the above descriptions, characterized by further comprising a tin carboxylate (C).

A further preferred embodiment relates to the sealant for working joint in building according to any one of the above descriptions, characterized by further comprising an organotin catalyst (D).

A twentieth aspect of the present invention relates to a sealant for working joint in building characterized in that an organic polymer having one or more silicon-containing functional groups capable of cross-linking by forming siloxane bonds is an organic polymer (A7) which has on average 1.7 to 5 silicon-containing functional groups capable of cross-linking by forming siloxane bonds per molecule.

A preferred embodiment relates to the sealant for working joint in building according to the above description, characterized in that the one or more silicon-containing functional groups capable of cross-linking by forming siloxane bonds each are a silicon-containing functional group having three or more hydrolyzable groups on the one or more silicon atoms thereof.

A further preferred embodiment relates to the sealant for working joint in building according to any one of the above descriptions, characterized in that the organic polymer having one or more silicon-containing functional groups capable of cross-linking by forming siloxane bonds is an organic polymer obtained by an addition reaction between an organic polymer having one or more unsaturated groups introduced into the terminals thereof and a hydrosilane compound represented by the general formula (7):

$$H-(SiR^6{}_{2-f}X_fO)_m-SiR^7{}_{3-e}X_e \quad (7)$$

where $R^6$ and $R^7$ may be the same or different, and each are an alkyl group having 1 to 20 carbon atoms, an aryl group having 6 to 20 carbon atoms, an aralkyl group having 7 to 20 carbon atoms, or a triorganosiloxy group represented by $(R')_3SiO-$; when two or more $R^6$ or $R^7$ are present, they may be the same or different; here, R' represents a monovalent hydrocarbon group having 1 to 20 carbon atoms, and three R's may be the same or different; X represents a hydroxy group or a hydrolyzable group; when two or more X's are present, they may be the same or different; e represents 0, 1, 2 or 3; f represents 0, 1 or 2; f's in m $(SiR^6{}_{2-f}X_fO)$ groups may be the same or different; m represents an integer of 0 to 19; and the relation, $e+\Sigma f \geq 1$, is to be satisfied.

A further preferred embodiment relates to the sealant for working joint in building according to any one of the above descriptions, characterized in that the organic polymer having one or more silicon-containing functional groups capable of cross-linking by forming siloxane bonds is an organic polymer obtained by an addition reaction between an organic polymer having one or more unsaturated groups introduced into the terminals thereof and a hydrosilane compound represented by the general formula (1):

$$H-SiX_3 \quad (1)$$

where X's are the same as described above.

A twenty-first aspect of the present invention relates to a sealant for working joint in building characterized in that an organic polymer having one or more silicon-containing functional groups capable of cross-linking by forming siloxane bonds is an organic polymer (A8) having a structural moiety represented by the general formula (8):

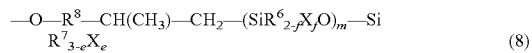

$$-O-R^8-CH(CH_3)-CH_2-(SiR^6{}_{2-f}X_fO)_m-Si R^7{}_{3-e}X_e \quad (8)$$

where $R^8$ represents a divalent organic group having 1 to 20 carbon atoms and containing as constituent atoms one or more selected from the group consisting of hydrogen, oxygen and nitrogen; and $R^6$, $R^7$, X, e, f and m are the same as described above.

A preferred embodiment relates to the sealant for working joint in building according to the above description, characterized in that the organic polymer having one or more silicon-containing functional groups capable of cross-linking by forming siloxane bonds is an organic polymer obtained by an addition reaction between an organic polymer having one or more unsaturated groups introduced thereinto, represented by the general formula (9):

$$-O-R^8-C(CH_3)=CH_2 \quad (9)$$

where $R^8$ is the same as described above, and a hydrosilane compound represented by the general formula (7):

$$H-(SiR^6{}_{2-f}X_fO)_m-SiR^7{}_{3-e}X_e \quad (7)$$

where $R^6$, $R^7$, X, e, f and m are the same as described above.

A further preferred embodiment relates to the sealant for working joint in building according to any one of the above descriptions, characterized in that the organic polymer having one or more silicon-containing functional groups capable of cross-linking by forming siloxane bonds is an organic polymer having a structural moiety represented by the general formula (10):

$$-O-R^8-CH(CH_3)-CH_2-SiX_3 \quad (10)$$

where $R^8$ and X's are the same as described above.

A further preferred embodiment relates to the sealant for working joint in building according to any one of the above descriptions, characterized in that the organic polymer having one or more silicon-containing functional groups capable of cross-linking by forming siloxane bonds is an organic polymer which substantially does not contain an amide segment ($-NH-CO-$) in the main chain skeleton thereof.

A further preferred embodiment relates to the sealant for working joint in building according to any one of the above descriptions, characterized in that the one or more silicon-containing functional groups capable of cross-linking by forming siloxane bonds each are a group represented by the general formula (2):

$$-Si(OR^1)_3 \quad (2)$$

where $R^1$s are the same as described above.

A further preferred embodiment relates to the sealant for working joint in building according to any one of the above descriptions, characterized in that the one or more silicon-containing functional groups capable of cross-linking by forming siloxane bonds each are a triethoxysilyl group.

A twenty-second aspect of the present invention relates to a method for controlling the recovery properties, durability and creep resistance of a cured article, characterized by using a curable composition which contains an organic polymer (A) having one or more silicon-containing functional groups capable of cross-linking by forming siloxane bonds; and a silicate (B).

A twenty-third aspect of the present invention relates to a method for controlling the recovery properties, durability and creep resistance of a cured article, characterized by using a curable composition comprising an organic polymer (A1) having one or more silicon-containing functional groups capable of cross-linking by forming siloxane bonds in which one or more silicon-containing functional groups capable of cross-linking by forming siloxane bonds each are a silicon-containing functional group having three or more hydrolyzable groups on the one or more silicon atoms thereof.

A preferred embodiment relates to the method for controlling the recovery properties, durability and creep resistance of a cured article according to the above description, characterized by using a curable composition in which the main chain of the organic polymer (A1) having one or more silicon-containing functional groups capable of cross-linking by forming siloxane bonds is a (meth)acrylate copolymer produced by a living radical polymerization method.

A further preferred embodiment relates to the method for controlling the recovery properties, durability and creep resistance of a cured article according to any one of the above descriptions, characterized by using a curable composition further comprising a silicate (B).

A further preferred embodiment relates to the method for controlling the recovery properties, durability and creep resistance of a cured article according to any one of the above descriptions, characterized by using a curable composition further comprising a tin carboxylate (C).

A further preferred embodiment relates to the method for controlling the recovery properties, durability and creep resistance of a cured article according to any one of the above descriptions, characterized by using a curable composition further comprising an organotin catalyst (D).

A twenty-fourth aspect of the present invention relates to a method for controlling the recovery properties, durability and creep resistance of a cured article characterized by using a curable composition in which an organic polymer having one or more silicon-containing functional groups capable of cross-linking by forming siloxane bonds is an organic polymer (A7) which has on average 1.7 to 5 silicon-containing functional groups capable of cross-linking by forming siloxane bonds per molecule.

A preferred embodiment relates to the method for controlling the recovery properties, durability and creep resistance of a cured article according to the above description, characterized by using a curable composition in which the one or more silicon-containing functional groups capable of cross-linking by forming siloxane bonds are silicon-containing functional groups each having three or more hydrolyzable groups on one or more silicon atoms thereof.

A further preferred embodiment relates to the method for controlling the recovery properties, durability and creep resistance of a cured article according to any one of the above descriptions, characterized by using a curable composition in which the organic polymer having one or more silicon-containing functional groups capable of cross-linking by forming siloxane bonds is an organic polymer obtained by an addition reaction between an organic polymer having one or more unsaturated groups introduced into the terminals thereof and a hydrosilane compound represented by the general formula (7):

$$H-(SiR^6{}_{2-f}X_fO)_m-SiR^7{}_{3-e}X_e \quad (7)$$

where $R^6$, $R^7$, X, e, f and m are the same as described above.

A further preferred embodiment relates to the method for controlling the recovery properties, durability and creep resistance of a cured article according to any one of the above descriptions, characterized by using a curable composition in which the organic polymer having one or more silicon-containing functional groups capable of cross-linking by forming siloxane bonds is an organic polymer obtained by an addition reaction between an organic polymer having one or more unsaturated groups introduced into the terminals thereof and a hydrosilane compound represented by the general formula (1):

$$H-SiX_3 \quad (1)$$

where X represents a hydroxy group or a hydrolyzable group, and three X's may be the same or different.

A twenty-fifth aspect of the present invention relates to a method for controlling the recovery properties, durability and creep resistance of a cured article, characterized by using a curable composition in which an organic polymer having one or more silicon-containing functional groups capable of cross-linking by forming siloxane bonds is an organic polymer (A8) having a structural moiety represented by the general formula (8):

$$-O-R^8-CH(CH_3)-CH_2-(SiR^6{}_{2-f}X_fO)_m-Si R^7{}_{3-e}X_e \quad (8)$$

where $R^6$, $R^7$, $R^8$, X, e, f and m are the same as described above.

A preferred embodiment relates to the method for controlling the recovery properties, durability and creep resistance of a cured article according to the above description, characterized by using a curable composition in which the organic polymer having one or more silicon-containing functional groups capable of cross-linking by forming siloxane bonds is an organic polymer obtained by an addition reaction between an organic polymer having one or more unsaturated groups introduced thereinto, represented by the general formula (9):

$$-O-R^8-C(CH_3)=CH_2 \quad (9)$$

where $R^8$ is the same as described above, and a hydrosilane compound represented by the general formula (7):

$$H-(SiR^6{}_{2-f}X_fO)_m-SiR^7{}_{3-e}X_e \quad (7)$$

where $R^6$, $R^7$, X, e, f and m are the same as described above.

A further preferred embodiment relates to the method for controlling the recovery properties, durability and creep resistance of a cured article according to any one of the above descriptions, characterized by using a curable composition in which the organic polymer having one or more silicon-containing functional groups capable of cross-linking by forming siloxane bonds is an organic polymer having a structural moiety represented by the general formula (10):

$$-O-R^8-CH(CH_3)-CH_2-SiX_3 \quad (10)$$

where $R^8$ and X's are the same as described above.

A further preferred embodiment relates to the method for controlling the recovery properties, durability and creep resistance of a cured article according to any one of the above descriptions, characterized by using a curable composition in which the organic polymer having one or more silicon-containing functional groups capable of cross-linking by forming siloxane bonds is an organic polymer which substantially does not contain an amide segment (—NH—CO—) in the main chain skeleton thereof.

A further preferred embodiment relates to the method for controlling the recovery properties, durability and creep resistance of a cured article according to any one of the above descriptions, characterized by using a curable composition in which the one or more silicon-containing functional groups capable of cross-linking by forming siloxane bonds each are a group represented by the general formula (2):

$$-Si(OR^1)_3 \quad (2)$$

where three R¹s each are independently a monovalent organic group having 2 to 20 carbon atoms.

A further preferred embodiment relates to the method for controlling the recovery properties, durability and creep resistance of a cured article according to any one of the above descriptions, characterized by using a curable composition in which the one or more silicon-containing functional groups capable of cross-linking by forming siloxane bonds each are a triethoxysilyl group.

A twenty-sixth aspect of the present invention relates to a method for improving thin-layer curability, characterized by using a curable composition comprising: an organic polymer (A1) having one or more silicon-containing functional groups capable of cross-linking by forming siloxane bonds in which the one or more silicon-containing functional groups capable of cross-linking by forming siloxane bonds are silicon-containing functional groups each having three or more hydrolyzable groups on one or more silicon atoms thereof; and an organotin catalyst (D).

The curable composition of the present invention is excellent in recovery properties, durability and creep resistance.

BEST MODE FOR CARRYING OUT THE INVENTION

No particular constraint is imposed on the main chain skeleton of a reactive silicon group-containing organic polymer (A) used in the present invention, and organic polymers having various types of main chain skeletons can be used.

More specifically, examples of the organic polymer (A) include polyoxyalkylene polymers such as polyoxyethylene, polyoxypropylene, polyoxybutylene, polyoxytetramethylene, polyoxyethylene-polyoxypropylene copolymer, and polyoxypropylene-polyoxybutylene copolymer; hydrocarbon polymers such as ethylene-propylene copolymer, polyisobutylene, copolymers between isobutylene and isoprene and the like, polychloroprene, polyisoprene, copolymers between isoprene or butadiene and acrylonitrile and/or styrene and the like, polybutadiene, copolymers between isoprene or butadiene and acrylonitrile, styrene and the like, hydrogenated polyolefin polymers obtained by hydrogenation of these polyolefin polymers; polyester polymers obtained by the condensation between dibasic acids such as adipic acid and glycol, or by the ring-opening polymerization of lactones; (meth)acrylate polymers obtained by radical polymerization of the monomers such as ethyl (meth)acrylate and butyl (meth)acrylate; vinyl polymers obtained by radical polymerization of (meth)acrylate monomers, and the monomers such as vinyl acetate, acrylonitrile and styrene; graft polymers obtained by polymerization of vinyl monomers in the above described organic polymers; polysulfide polymers; polyamide polymers such as nylon 6 obtained by ring-opening polymerization of ε-caprolactam, nylon 6,6 obtained by condensation polymerization between hexamethylenediamine and adipic acid, nylon 6,10 obtained by condensation polymerization between hexamethylenediamine and sebacic acid, nylon 11 obtained by condensation polymerization of ε-aminoundecanoic acid, nylon 12 obtained by ring-opening polymerization of ε-aminolaurolactam, and copolymerized nylons containing two or more components of the above described nylons; polycarbonate polymers manufactured by condensation polymerization of, for example, bisphenol A and carbonyl chloride; and diallyl phthalate polymers. Among the polymers having the above described main chain skeletons, polyoxyalkylene polymers, hydrocarbon polymers, polyester polymers, (meth)acrylate polymers, and polycarbonate polymers are preferable because these polymers are easily available and can be easily manufactured.

Moreover, saturated hydrocarbon polymers such as polyisobutylene, hydrogenated polyisoprene and hydrogenated polybutadiene, polyoxyalkylene polymers, and (meth)acrylate polymers are particularly preferable because these polymers are relatively low in glass transition temperature and yield cured articles excellent in low-temperature resistance.

The above described organic polymer (A) may contain other components such as a urethane bond-containing component in its main chain skeleton as long as the advantageous effects of the present invention are not greatly impaired.

No particular constraint is imposed on the urethane-bond containing component; examples of the urethane bond-containing component include those obtained by reaction of polyisocyanate compounds, such as aromatic polyisocyanates including toluene (tolylene) diisocyanate, diphenylmethane diisocyanate and xylylene diisocyanate, and aliphatic polyisocyanates including isophorone diisocyanate and hexamethylene diisocyanate, with polyols having the above described various types of main chain skeletons.

When amide segments (—NH—CO—) generated in the main chain skeleton on the basis of the above described urethane bond are abundant, the viscosity of the organic polymer becomes high to form a composition poor in workability. Accordingly, the amount of the amide segments occupying the main chain skeleton of the organic polymer is preferably 3 wt % or less, more preferably 1 wt % or less, and most preferably substantially null.

The reactive silicon group contained in the reactive silicon group-containing organic polymer is a group having one or more hydroxyl groups or one or more hydrolyzable groups, which bonds to the silicon atom, and being capable of cross-linking by forming siloxane bonds by a reaction accelerated by a silanol condensation catalyst. As the reactive silicon group, there can be cited a group represented by the general formula (11):

$$-(SiR^1_{2-b}X_bO)_m-SiR^2_{3-a}X_a \quad (11)$$

where $R^1$ and $R^2$ may be the same or different, and each are an alkyl group having 1 to 20 carbon atoms, an aryl group having 6 to 20 carbon atoms, an aralkyl group having 7 to 20 carbon atoms, or a triorganosiloxy group represented by (R')₃SiO—; when two or more $R^1$ or $R^2$ are present, they may be the same or different; here, R' represents a monovalent hydrocarbon group having 1 to 20 carbon atoms, and the three R's may be the same or different; X represents a hydroxy group or a hydrolyzable group; when two or more X's are present, they may be the same or different; a represents 0, 1, 2 or 3; b represents 0, 1 or 2; bs in m $(SiR^1_{2-b}X_bO)$ groups may be the same or different; m represents an integer of 0 to 19; and the relation, $a+\Sigma b \geq 1$, is to be satisfied.

The hydrolyzable group is not particularly limited, and may be a hydrolyzable group well known in the art. More specifically, examples of the hydrolyzable group include a hydrogen atom, a halogen atom, an alkoxy group, an acyloxy group, a ketoximate group, an amino group, an amide group, an acid amide group, an aminooxy group, a mercapto group, and an alkenyloxy group. Of these groups, a hydrogen atom, an alkoxy group, an acyloxy group, a ketoximate group, an amino group, an amide group, an aminooxy group, a mercapto group and an alkenyloxy group are preferable; an alkoxy group is particularly preferable from the viewpoints of moderate hydrolyzability and easy handlablity.

To one silicon atom, 1 to 3 hydrolyzable groups and 1 to 3 hydroxy groups can be bonded, and (a+Σb) falls preferably in the range from 1 to 5. When two or more hydrolyzable groups and two or more hydroxy groups are bonded in a reactive silicon group, the hydrolyzable groups may be the same or different.

In particular, because of easy availability, preferable is the reactive silicon group represented by the general formula (12):

where $R^2$ and X are the same as described above, and a is an integer of 1 to 3.

Additionally, specific examples of $R^1$ and $R^2$ in the above general formulas (11) and (12) include alkyl groups such as a methyl group and an ethyl group; cycloalkyl groups such as a cyclohexyl group; aryl groups such as a phenyl group; aralkyl groups such as a benzyl group; and a triorganosiloxy group represented by $(R')_3SiO$— in which R' is a methyl group, a phenyl group or the like. Of these groups, a methyl group is particularly preferable.

More specific examples of the reactive silicon group include a trimethoxysilyl group, a triethoxysilyl group, a triisopropoxysilyl group, a dimethoxymethylsilyl group, a diethoxymethylsilyl group, and a diisopropoxymethylsilyl group.

In the present invention, a particular organic polymer, belonging to the (A) component organic polymer, which has one or more silicon-containing functional groups each having three or more hydrolyzable groups bonded to the one or more silicon atoms thereof (namely, a+b×m in the general formula (11) is 3 or more) can be used as the (A1) component.

The (A1) component has three or more hydrolyzable groups bonded to the one or more silicon atoms thereof, and a cross-linked cured article thereof obtained through the silanol condensation reaction involving the reactive silicon groups exhibits a satisfactory recovery properties, and also exhibits marked improvement effects on the creep resistance and the durability as compared to the case of a reactive silicon group-containing organic polymer in which each of the reactive silicon groups has two or less hydrolyzable groups.

The value of a+b×m in the general formula (11) for the (A1) component is preferably 3 to 5, and particularly preferably 3. Of such reactive silicon groups, trialkoxysilyl groups are preferable because these groups have particularly significant improvement effects of the recovery properties, durability and creep resistance of the curable composition of the present invention, and the raw materials thereof are easily available. Here, the alkoxyl groups having 1 to 20 carbon atoms are preferable, those having 1 to 10 carbon atoms are more preferable and those having 1 to 4 carbon atoms are furthermore preferable. Specifically, a trimethoxysilyl group and a triethoxysilyl group are most preferable. When the number of carbon atoms is larger than 20, curing is sometimes slowed.

Additionally, the (A1) component has effects of improving the water resistant adhesion, moisture and heat resistant adhesion, and surface weather resistance of the curable composition of the present invention.

In general, it is known that with decreasing weight percentage of a reactive silicon group-containing organic polymer in a curable composition, the durability of the obtained cured article is degraded. However, the use of the (A1) component of the present invention as the reactive silicon group-containing organic polymer makes it possible to maintain a high durability even when the weight percentage of a reactive silicon group-containing organic polymer in a curable composition is made low. Accordingly, when the proportion of the (A1) component in a curable composition is 5 to 28 wt %, more preferably 10 to 26 wt %, and particularly preferably 15 to 24 wt %, both low cost and high durability can be preferably realized.

In the present invention, a particular organic polymer, belonging to the (A1) component organic polymer, which has a trialkoxysilyl group having 2 to 20 carbon atoms, can be used as the (A2) component. More specifically, the organic polymer having a group represented by the general formula (2) can be used as the (A2) component:

where three $R^1$s each are independently a monovalent organic group having 2 to 20 carbon atoms.

It is known that methanol generated by the hydrolysis reaction of a methoxysilyl group has such a specific toxicity that it causes optic nerve disorder. On the other hand, because in the (A2) component the number of carbon atoms of each of the alkoxy groups bonded to the silicon atom is 2 to 20, the alcohols generated by the hydrolysis reaction of the reactive silicon group do not include highly toxic methanol and the (A2) component leads to a highly safe composition.

The number of the carbon atoms of $R^1$ in the general formula (2) for the (A2) component is more preferably 2 to 10, and particularly preferably 2 to 4; in the case where the number is 2, the alcohol generated by the hydrolysis is ethanol, which is of the highest safety, so that this case is most preferable. More specifically, the triethoxysilyl group is most preferable. In the case where the number of the carbon atoms is larger than 20, sometimes the curing of the curable composition is made slow, and sometimes the anesthetic action and stimulating action due to the generated alcohol are significant.

Moreover, in the present invention, a particular organic polymer, belonging to the (A2) component organic polymer, in which the main chain skeleton is a polyoxyalkylene, can be used as the (A3) component. More specifically, the polyoxyalkylene polymer having a group represented by the general formula (2) can be used as the (A3) component:

where $R^1$s are the same as described above.

The average number of the reactive silicon groups per molecule in the organic polymer (A) is preferably at least 1, and more preferably 1.1 to 5. When the number of the reactive silicon groups contained in one molecule of the organic polymer (A) is less than 1, the curability becomes insufficient and satisfactory rubber elasticity behavior is hardly exhibited. The reactive silicon groups may be located at the terminals or in the inner portion of the molecular chain of the organic polymer (A). When the reactive silicon groups are located at the terminals of the molecular chain, the effective chain density in the organic polymer (A) component contained in the finally formed cured article becomes large, so that it becomes easier to obtain a rubber-like cured article having a high strength, a high elongation property and a low elastic modulus.

In the present invention, a particular organic polymer, belonging to the (A) component organic polymer, in which the average number of the reactive silicon groups per molecule is 1.7 to 5 can be used as the (A7) component.

In the (A7) component, the average number of the reactive silicon groups per molecule is 1.7 to 5; a cross-linked cured article obtained therefrom through the silanol condensation reaction involving the reactive silicon groups exhibits a satisfactory recovery properties, and also exhibits marked improvement effects of the creep resistance and the durability as compared to the case of an organic polymer in which the average number of the reactive silicon groups per molecule is less than 1.7.

The number of the reactive silicon groups per molecule of the (A7) component is more preferably 2 to 4, and particularly preferably 2.3 to 3. When the number of the reactive silicon groups per molecule is less than 1.7, the improvement effect of recovery properties, durability and creep resistance of the curable composition of the present invention is sometimes insufficient, while when the number of the groups concerned is larger than 5, the elongation of the obtained cured article sometimes becomes small.

In the present invention, a particular organic polymer, belonging to the (A) component organic polymer, which has a structural moiety represented by the general formula (8) can be used as the (A8) component:

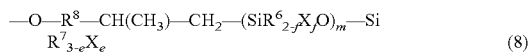
$$—O—R^8—CH(CH_3)—CH_2—(SiR^6{}_{2-f}X_fO)_m—Si\ R^7{}_{3-e}X_e \quad (8)$$

where $R^8$ represents a divalent organic group having 1 to 20 carbon atoms and containing as constituent atoms one or more selected from the group consisting of hydrogen, oxygen and nitrogen; and $R^6$, $R^7$, X, e, f and m are the same as described above.

The (A8) component has the structural moiety represented by the general formula (8); a cross-linked cured article obtained therefrom through the silanol condensation reaction involving the reactive silicon groups exhibits a satisfactory recovery properties, and also exhibits marked improvement effects of the creep resistance and the durability as compared to the case of an organic polymer which has the terminal structure other than that represented by the general formula (8).

The number of the carbon atoms of $R^8$ in the general formula (8) is preferably 1 to 10 from the viewpoint of availability, and particularly preferably 1 to 4. More specifically, $R^3$ is preferably a methylene group.

In the case where the (A8) component is an organic polymer having a structural moiety represented by the general formula (10):

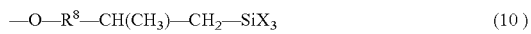
$$—O—R^8—CH(CH_3)—CH_2—SiX_3 \quad (10)$$

where $R^8$ and X's are the same as described above, the improvement effects of the recovery properties, durability and creep resistance of the curable composition of the present invention are particularly significant, and the raw materials thereof is easily available, and hence such an organic polymer is preferable.

The introduction of the reactive silicon group in the (A) component may be carried out by methods well known in the art. More specifically, examples of such methods include the following:

(a) With an organic polymer having in the molecule functional groups such as hydroxy groups, an organic compound having both an active group exhibiting reactivity to the functional groups and an unsaturated group is reacted, to yield an unsaturated group-containing organic polymer. Alternatively, an unsaturated group-containing organic polymer is obtained by copolymerization of an epoxy compound having an unsaturated group. Then, a reactive silicon group-containing hydrosilane is reacted with the obtained reaction product to be hydrosilylated.

(b) With an unsaturated group-containing organic polymer, obtained similarly to the method described in (a), a mercapto group-and reactive silicon group-containing compound is reacted.

(c) With an organic polymer having in the molecule functional groups such as hydroxy groups, epoxy groups and isocyanate groups, a compound having a functional group, exhibiting reactivity to the functional groups, and having a reactive silicon group is reacted.

Among the above methods, a method described in (a) or a method described in (c) in which a hydroxy group-terminated polymer is reacted with an isocyanate group- and reactive silicon group-containing compound is preferable because the method provides a high conversion rate for a relatively short reaction time. Additionally, the method described in (a) is particularly preferable because an organic polymer obtained by the method described in (a) is lower in viscosity and more satisfactory in workability than an organic polymer obtained by the method described in (c), and an organic polymer obtained by the method described in (b) is strong in odor due to mercaptosilane.

Specific examples of the hydrosilane compound used in the method described in (a) include halogenated silanes such as trichlorosilane, methyldichlorosilane, dimethylchlorosilane and phenyldichlorosilane; alkoxysilanes such as trimethoxysilane, triethoxysilane, methyldiethoxysilane, methyldimethoxysilane and phenyldimethoxysilane; acyloxysilanes such as methyldiacetoxysilane and phenyldiacetoxysilane; and ketoximatesilanes such as bis(dimethylketoximate)methylsilane and bis(cyclohexylketoximate)methylsilane; however, the hydrosilane compound used in the method described in (a) is not limited to these compounds. Among these examples, halogenated silanes and alkoxysilanes are preferable; in particular, alkoxysilanes are most preferable because the obtained curable compositions are moderately hydrolyzable and easily handlable.

Among the above described hydrosilane compounds, the hydrosilane compounds represented by the general formula (1) are preferable because significant is the improvement effect on the recovery properties, durability and creep resistance of each of the curable compositions made of organic polymers obtained from addition reaction of the hydrosilane compounds concerned:

$$H—SiX_3 \quad (1)$$

where X's are the same as described above. Among the hydrosilane compounds represented by the general formula (1), trialkoxysilanes such as trimethoxysilane, triethoxysilane and triisopropoxysilane are more preferable.

Among the above described trialkoxysilanes, trialkoxysilanes such as trimethoxysilane having alkoxy groups (methoxy groups) each having one carbon atom sometimes undergoes rapidly proceeding disproportionation reaction; when the disproportionation reaction proceeds, a fairly harmful compound such as dimethoxysilane is generated. From the viewpoint of handling safety, it is preferable to use trialkoxysilanes each containing alkoxy groups having two or more carbon atoms represented by the general formula (5):

$$H—Si(OR^1)_3 \quad (5)$$

where $R^1$s are the same as described above. Triethoxysilane is most preferable from the viewpoints of the availability and handling safety thereof, and from the viewpoints of the recovery properties, durability and creep resistance of each of the obtained curable compositions.

Examples of the synthesis method described in (b) include a method in which a mercapto group- and reactive silicon group-containing compound is introduced into the sites on the unsaturated bonds of an organic polymer by means of a radical addition reaction in the presence of a radical initiator and/or a radical generating source; however, the synthesis method concerned is not limited to these methods. Examples of the above described mercapto group- and reactive silicon group-containing compound include γ-mercaptopropyltrimethoxysilane, γ-mercaptopropylmethyldimethoxysilane, γ-mercaptopropyltriethoxysilane and γ-mercaptopropylmethyldiethoxysilane; however, the mercapto group- and reactive silicon group-containing compound is not limited to these compounds.

Examples of the method, of the methods described in (c), in which a hydroxy-terminated polymer is reacted with an isocyanate group- and reactive silicon group-containing compound include a method disclosed in Japanese Patent Laid-Open No. 3-47825; however, the method concerned is not limited to these methods. Examples of the above described isocyanate group- and reactive silicon group-containing compound include γ-isocyanatopropyltrimethoxysilane, γ-isocyanatopropylmethyldimethoxysilane, γ-isocyanatopropyltriethoxysilane, and γ-isocyanatopropylmethyldiethoxysilane; however, the compound concerned is not limited to these compounds.

As described above, silane compounds each having three hydrolyzable groups bonded to one silicon atom such as trimethoxysilane sometimes undergo proceeding disproportionation reaction; particularly, trialkoxysilanes such as trimethoxysilane having alkoxy groups (methoxy groups) each having one carbon atom sometimes undergoes rapidly proceeding disproportionation reaction. When the disproportionation reaction proceeds, a fairly harmful compound such as dimethoxysilane is generated. However, with γ-mercaptopropyltrimethoxysilane and γ-isocyanatopropyltrimethoxysilane, no such disproportionation reaction proceeds. Accordingly, when a trialkoxysilyl group having a methoxy group such as trimethoxysilyl group is used as the silicon-containing group, it is preferable to use the synthesis methods described in (b) or (c).

As a method for obtaining an organic polymer having one or more silicon-containing groups each with one or more silicon atoms bonded to methoxy groups, there can be cited a method in which an organic polymer (namely, the above described (A2) component) having one or more reactive silicon groups represented by the general formula (2) is produced by means of any one of the above described methods (a) (b) and (c):

$$—Si(OR^1)_3 \quad (2)$$

where $R^1$s are the same as described above, and then the obtained organic polymer is made to undergo ester exchange reaction with a compound (J) having at least one methoxy group capable of undergoing ester exchange reaction in the presence or absence of an ester exchange reaction catalyst, whereby an organic polymer having one or more groups represented by the general formula (6) is produced:

$$—Si(OCH_3)_d(OR^1)_{3-d} \quad (6)$$

where (3-d) $R^1$s each are independently a monovalent organic group having 2 to 20 carbon atoms, and d represents 1, 2 or 3. The organic polymer having the groups represented by the general formula (6) exhibits a faster curability than the organic polymer having the groups represented by the general formula (2).

Among the above described production methods, more preferable is the method in which the reactive silicon groups are introduced into an organic polymer by means of the method (a), and then the polymer undergoes ester exchange reaction with the above described (J) component to thereby produce an organic polymer having the groups represented by the general formula (6), because the method concerned does not generate in the course of production a harmful compound such as dimethoxysilane due to disproportionation reaction; and the organic polymer thus produced is weaker in odor than the organic polymer obtained by the method (b), and gives a curable composition lower in viscosity and better in workability than that based on the organic polymer obtained by the method (c).

No particular constraint is imposed on the compound (J) having at least one methoxy group capable of undergoing ester exchange reaction, and various types of compounds can be used as the compound (J).

Here, the examples of the (J) component may include methanol, methyl esters of various acids such as carboxylic acids and sulfonic acids, and compounds having silicon atoms bonded to at least one methoxy group. As a compound having silicon atoms bonded to at least one methoxy group, more preferable is a compound having 2 to 4 methoxy groups bonded to the same silicon atom, because such a compound has a faster rate of ester exchange reaction. Moreover, a compound having 2 to 4 methoxy groups bonded to the same silicon atom and an amino group is particularly preferable because of a fast rate of ester exchange reaction.

Specific examples include amino group-containing silanes such as γ-aminopropyltrimethoxysilane, γ-aminopropylmethyldimethoxysilane, γ-((β-aminoethyl)amino)propyltrimethoxysilane, γ-((β-aminoethyl)amino)propylmethyldimethoxysilane, γ-ureidopropyltrimethoxysilane, N-phenyl-γ-aminopropyltrimethoxysilane, and N-benzyl-γ-aminopropyltrimethoxysilane. Additionally, the derivatives obtained by modifying the above described silane compounds and the condensation reaction products of the above described silane compounds can be used as the (J) component.

The above described amino group-containing silanes are preferable because they undergo ester exchange reaction which can proceed under the conditions of such relatively low temperatures as 60° C. or lower in the presence of an ester exchange reaction catalyst.

As for the (J) component used in the present invention, the (J) component is used to undergo ester exchange reaction within a range preferably from 0.1 to 10 parts, and particularly preferably from 1 to 5 parts in relation to 100 parts of the (A2) component of the reactive silicon group-containing organic polymer. The above described (J) components may be used each alone or as admixtures of two or more thereof.

The reactive silicon group-containing organic polymer (A) may be a straight chain or may have branches, and the number average molecular weight thereof, measured by GPC relative to polystyrene standard, is preferably of the order of 500 to 50,000, and more preferably 1,000 to 30,000. When the number average molecular weight is less than 500, there is found an adverse trend involving the elongation property, while when the number average molecular weight exceeds 50,000, there is found an adverse trend involving the workability because the viscosity becomes high.

The reactive silicon group may be located at the terminals of the organic polymer molecule chain or in the inner portion of the chain, or both at the terminals and in the inner portion. In particular, the reactive silicon groups located at the molecular terminals are preferable because such groups increase the effective chain density in the organic polymer component contained in the finally formed cured article, so that it becomes easier to obtain a rubber-like cured article having a high strength and a high elongation property.

The above described polyoxyalkylene polymer is essentially a polymer having the repeating units represented by the general formula (13):

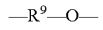

$$—R^9—O— \quad (13)$$

where $R^9$ is a divalent organic group which has 1 to 14 carbon atoms and is a straight chain or branched alkylene group. In the general formula (13), $R^9$ is preferably a straight chain or branched alkylene group having 1 to 14 carbon atoms, and more preferably 2 to 4 carbon atoms. Examples of the repeating units represented by the general formula (13) include:

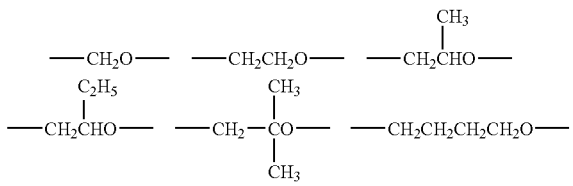

The main chain skeleton of the polyoxyalkylene polymer may be formed of either only one type of repeating units or two or more types of repeating units. In particular, in the case where the polymer is used for a sealant and the like, it is preferable that the main chain skeleton is formed of a polymer containing as the main component a propylene oxide polymer because a polymer having such a main chain skeleton is amorphous and relatively low in viscosity.

Examples of the synthesis method of the polyoxyalkylene polymer include a polymerization method based on an alkaline catalyst such as KOH; a polymerization method based on a transition metal compound-porphyrin complex catalyst prepared by reacting an organoaluminum compound with porphyrin, disclosed in Japanese Patent Laid-Open No. 61-215623; polymerization methods based on double metal cyanide complex catalysts, disclosed in Japanese Patent Publication Nos. 46-27250 and 59-15336, and U.S. Pat. Nos. 3,278,457, 3,278,458, 3,278,459, 3,427,256, 3,427,334, 3,427,335 and the like; a polymerization method using a catalyst composed of a polyphosphazene salt disclosed in Japanese Patent Laid-Open No. 10-273512, and a polymerization method using a catalyst composed of a phosphazene compound disclosed in Japanese Patent Laid-Open No. 11-060722. However, the method concerned is not limited to these methods.

Examples of the manufacturing method of the reactive silicon group-containing polyoxyalkylene polymer include the methods disclosed in Japanese Patent Publication Nos. 45-36319 and 46-12154, Japanese Patent Laid-Open Nos. 50-156599, 54-6096, 55-13767, 55-13468, 57-164123, Japanese Patent Publication No. 3-2450, and U.S. Pat. Nos. 3,632, 557, 4,345,053, 4,366,307 and 4,960,844; and the methods manufacturing polyoxyalkylene polymers each having a high molecular weight and a narrow molecular weight distribution such that the number average molecular weight is 6,000 or more and the Mw/Mn value is 1.6 or less, disclosed in Japanese Patent Laid-Open Nos. 61-197631, 61-215622, 61-215623, 61-218632, 3-72527, 3-47825 and 8-231707. However, the method concerned is not limited to these methods.

The above described reactive silicon group-containing polyoxyalkylene polymers may be used either each alone or in combinations of two or more thereof.

The above described saturated hydrocarbon polymers are the polymers which substantially do not contain carbon-carbon unsaturated bonds other than aromatic rings; the polymers forming the skeletons of the saturated hydrocarbon polymers can be obtained by the methods in which (1) olefin compounds having 1 to 6 carbon atoms such as ethylene, propylene, 1-butene and isobutylene are polymerized as main monomers, and (2) diene compounds such as butadiene and isoprene are homopolymerized or copolymerized with the above described olefin compounds and then hydrogenation is applied; however, isobutylene polymers and hydrogenated polybutadiene polymers are preferable because functional groups can be easily introduced into the terminals of these polymers, the molecular weights of these polymers can be easily controlled and the number of the terminal functional groups can be increased; and isobutylene polymers are particularly preferable because of the ease of the synthesis thereof.

The polymers having saturated hydrocarbon polymers as the main chain skeleton are characterized in that the polymers each having such a skeleton are excellent in heat resistance, weather resistance, durability and moisture blocking property.

The isobutylene polymers may be formed in such a way that all the monomer units are solely isobutylene units, or may be copolymers with monomers other than isobutylene units; however, from the viewpoint of the rubber property, in each of the polymers concerned, the content of the units derived from isobutylene is preferably 50 wt % or more, more preferably 80 wt % or more, and most preferably 90 to 99 wt %.

As for the synthesis methods of saturated hydrocarbon polymers, various types of polymerization methods have hitherto been reported, particularly among which are many so-called living polymerization methods developed in these years. It has been known that the saturated hydrocarbon polymers, in particular, the isobutylene polymers can be easily produced by use of the inifer polymerization discovered by Kennedy et al. (J. P. Kennedy et al., J. Polymer Sci., Polymer Chem. Ed., Vol. 15, p. 2843 (1997)) in such a way that polymers having the molecular weights of the order of 500 to 100,000 can be polymerized with the molecular weight distribution of 1.5 or less and various types of functional groups can be introduced into the molecular terminals.

The manufacturing methods of the reactive silicon group-containing saturated hydrocarbon polymers are described, for example, in Japanese Patent Publication Nos. 4-69659 and 7-108928, Japanese Patent Laid-Open Nos. 63-254149, 64-22904 and 1-197509, Japanese Patent Nos. 2539445 and 2873395, Japanese Patent Laid-Open No. 7-53882 and the like; however, the methods concerned are not particularly limited to these methods.

Among the above described reactive silicon group-containing saturated hydrocarbon polymers, a particular saturated hydrocarbon polymer which has one or more groups represented by the general formula (2) can be used as the (A5) component:

where $R^1$s are the same as described above. The (A5) component is a polymer which has such features based on the saturated hydrocarbon polymer forming the main chain skeleton that the heat resistance, weather resistance and moisture blocking property thereof are excellent, undergoes no generation of methanol caused by the hydrolysis reaction of the reactive silicon groups, and is satisfactory in the recovery properties, durability and creep resistance of the cured article.

The above described reactive silicon group-containing saturated hydrocarbon polymers may be used either each alone or in combinations of two or more thereof.

In the present invention, a particular organic polymer, belonging to the (A) component organic polymer, in which the molecular chain thereof is a (meth)acrylate copolymer can be used as the (A4) component.

No particular constraint is imposed on the (meth)acrylate monomers constituting the main chains of the above described (meth)acrylate polymers, but various types can be used. Examples of the monomers concerned include (meth) acrylic acid monomers such as (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth) acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, tolyl (meth) acrylate, benzyl (meth)acrylate, 2-methoxyethyl (meth)acrylate, 3-methoxybutyl (meth)acrylate, 2-hydroxyethyl (meth) acrylate, 2-hydroxypropyl (meth)acrylate, stearyl (meth) acrylate, glycidyl (meth)acrylate, 2-aminoethyl (meth) acrylate, γ-(methacryloyloxypropyl)trimethoxysilane, ethylene oxide adduct of (meth)acrylic acid, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth)acrylate, diperfluoromethylmethyl (meth)acrylate, 2-perfluoromethyl-2-perfluoroethylmethyl (meth)acrylate, 2-perfluorohexylethyl (meth)acrylate, 2-perfluorodecylethyl (meth)acrylate and 2-perfluorohexadecylethyl (meth)acrylate. For the above described (meth)acrylate polymers, (meth)acrylate monomers can be copolymerized with the following vinyl monomers. Examples of the vinyl monomers concerned include styrene monomers such as styrene, vinyltoluene, α-methylstyrene, chlorostyrene, and styrenesulfonic acid and the salts thereof; fluorine containing vinyl monomers such as perfluoroethylene, perfluoropropylene and fluorinated vinylidene; silicon containing vinyl monomers such as vinyltrimethoxysilane and vinyltriethoxysilane; maleic anhydride, maleic acid, and monoalkyl esters and dialkyl esters of maleic acid; fumaric acid, and monoalkyl esters and dialkyl esters of fumaric acid; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide, cyclohexylmaleimide; nitrile group-containing vinyl monomers such as acrylonitrile and methacrylonitrile; amide group-containing vinyl monomers such as acrylamide and methacrylamide; vinyl esters such as vinyl acetate, vinyl propionate, vinyl pivalate, vinyl benzoate and vinyl cinnamate; alkenes such as ethylene and propylene; conjugated dienes such as butadiene and isoprene; and vinyl chloride, vinylidene chloride, allyl chloride and allylalcohol. These monomers may be used either each alone or two or more of these monomers may be copolymerized. Among these, from the viewpoint of the physical properties of the products, polymers formed of styrene monomers and (meth)acrylic acid monomers are preferable. More preferable are the (meth)acryl polymers formed of acrylate monomers and methacrylate monomers, and particularly preferable are the acryl polymers formed of acrylate monomers. For general construction applications, the butyl acrylate monomers are further preferable because compositions concerned each are required to have physical properties including a low viscosity, and the cured articles each are required to have physical properties including a low modulus, a high elongation property, a weather resistance and a heat resistance. On the other hand, for applications to vehicles and the like where oil resistance is required, copolymers made of ethyl acrylate as the main material are further preferable. The copolymers made of ethyl acrylate as the main material are excellent in oil resistance, but slightly tend to be poor in low-temperature property (low-temperature resistance); for the purpose of improving the low-temperature property thereof, part of ethyl acrylate can be replaced with butyl acrylate. However, with the increase of the ratio of butyl acrylate, the satisfactory oil resistance comes to be degraded, so that for the application to the use requiring oil resistance, the ratio of butyl acrylate is set preferably at 40% or less, and more preferably at 30% or less. Additionally, it is also preferable to use 2-methoxyethyl acrylate and 2-ethoxyethyl acrylate which have side chain alkyl groups containing oxygen atoms introduced for the purpose of improving the low-temperature property and the like without degrading the oil resistance; in this connection, it is to be noted that the introduction of alkoxy groups having an ether bond in the side chains tends to degrade the heat resistance, so that the ratio of such an acrylate is preferably 40% or less when heat resistance is required. It is possible to obtain appropriate polymers by varying the ratio in consideration of the required physical properties such as oil resistance, heat resistance and low-temperature property according to the various applications and the demanded objectives. Examples of the polymers excellent in the balance between the physical properties including the oil resistance, heat resistance, low-temperature property and the like include a copolymer of ethyl acrylate/ butyl acrylate/2-methoxyethyl acrylate (40 to 50/20 to 30/30 to 20 in ratio by weight), this copolymer imposing no constraint on the polymers concerned. In the present invention, these preferable monomers can be copolymerized with other monomers, and moreover, block copolymerized with other monomers; in such cases, it is preferable that the preferable monomers are contained in 40% or more in ratio by weight. Incidentally, it is to be noted that in the above form of presentation, for example, "(meth)acrylic acid" means acrylic acid and/or methacrylic acid.

No particular constraint is imposed on the synthesis methods of the (meth)acrylate copolymers (A4), and the methods well known in the art can be applied. However, polymers obtained by the usual free radical methods using azo compounds and peroxides as polymerization initiators have a problem such that the molecular weight distribution values of the polymers are generally larger than 2 and the viscosities of the polymers are high. Accordingly, it is preferable to apply living radical polymerization methods for the purpose of obtaining (meth)acrylate copolymers being narrow in molecular weight distribution and low in viscosity, and moreover, having cross-linking functional groups at the molecular chain terminals in a high ratio.

Among "the living radical polymerization methods," "the atom transfer radical polymerization method" in which (meth)acrylate monomers are polymerized by use of an organic halogenated compound or a halogenated sulfonyl compound as an initiator and a transition metal complex as a catalyst has, in addition to the features of the above described "living radical polymerization methods," halogen atoms at the terminals relatively favorable for the functional group conversion reaction and is large in freedom for designing the initiator and the catalyst, so that the atom transfer radical polymerization method is further preferable as a method for manufacturing (meth)acrylate copolymers having particular functional groups. Examples of the atom transfer radical polymerization method include the method reported by Matyjaszewski et al. in Journal of the American Chemical Society (J. Am. Chem. Soc.), Vol. 117, p. 5614 (1995).

A cured article obtained by curing a curable composition which contains a reactive silicon group-containing (meth) acrylate copolymer sometimes exhibits a smaller elongation as compared to curable compositions which contain organic polymers having other main chain skeletons such as polyoxyalkylene polymers. Even when there is used a (meth)acrylate copolymer produced by use of the above described "living radical polymerization method" or the above described "atom transfer radical polymerization method," sometimes the elongation is insufficient and the durability is poor. The durability of such a (meth)acrylate copolymer can be markedly improved by using as the reactive silicon groups the silicon-containing functional groups having three or more hydrolyzable groups on the one or more silicon atoms thereof; the improvement effect of the durability is more significant in such a copolymer than in organic polymers having other main chain skeletons.

As a manufacturing method of a reactive silicon group-containing (meth)acrylate copolymer, for example, Japanese Patent Publication Nos. 3-14068 and 4-55444, and Japanese Patent Laid-Open No. 6-211922 and the like disclose manufacturing methods which apply the free radical polymerization methods using chain transfer agents. Additionally, Japanese Patent Laid-Open No. 9-272714 and the like disclose a manufacturing method which applies the atom transfer radical polymerization method. However, the manufacturing method concerned is not limited to these methods.

Additionally, among the above described reactive silicon group-containing (meth)acrylate copolymers, a particular (meth)acrylate copolymer having one or more groups represented by the general formula (2) can be used as the (A6) component:

$$-Si(OR^1)_3 \qquad (2)$$

where $R^1$s are the same as described above. The (A6) component is a polymer which has such features based on the (meth)acrylate copolymer forming the main chain skeleton that the heat resistance, weather resistance and chemical resistance are excellent, undergoes no generation of methanol caused by the hydrolysis reaction of the reactive silicon groups, and is satisfactory in the recovery properties, durability and creep resistance of the cured article.

The reactive silicon group in the above described (A6) component may be located at the terminals of the organic polymer molecule chain or in the inner portion of the chain, or both at the terminals and in the inner portion. In particular, the reactive silicon groups located at the terminals of the polymer main chain are preferable because such groups increase the effective network-chain content in the polymer component contained in the finally formed cured article, so that it becomes easier to obtain a rubber-like cured article having a high strength and a high elongation property.

As the polymerization method to produce the above described (A6) component, the living radical polymerization method is preferable because this method can lead to a narrow molecular weight distribution and a low viscosity, and can allow the introduction of cross-linking functional groups into the molecular chain terminals in a high proportion; the atom transfer radical polymerization method is particularly preferable.

The above described reactive silicon group-containing (meth)acrylate copolymers may be used each alone or in combinations of two or more thereof.

These reactive silicon group-containing organic polymers may be used either each alone or in combinations of two or more thereof. Specifically, there can be used organic polymers formed by blending two or more polymers selected from the group consisting of the reactive silicon group-containing polyoxyalkylene polymers, the reactive silicon group-containing saturated hydrocarbon polymers, and the reactive silicon group-containing (meth)acrylate copolymers.

The manufacturing methods of the organic polymers formed by blending the reactive silicon group-containing polyoxyalkylene polymers with the reactive silicon group-containing (meth)acrylate copolymers are proposed in Japanese Patent Laid-Open Nos. 59-122541, 63-112642, 6-172631, 11-116763 and the like. However, the manufacturing method concerned is not limited to these methods.

It is known that the organic polymer formed by blending a reactive silicon group-containing polyoxyalkylene polymer with a reactive silicon group-containing (meth)acrylate copolymer is poor in recovery properties as compared to the case where a polyoxyalkylene polymer is used alone. Accordingly, as the polyoxyalkylene polymer component in the above described blended organic polymer, the polyoxyalkylene polymer (A3) having one or more groups represented by the general formula (2) is used:

$$-Si(OR^1)_3 \qquad (2)$$

where $R^1$s are the same as described above; the organic polymer formed by blending the (A3) polymer with the reactive silicon-group containing (meth)acrylate copolymer (A4) exhibits excellent weather resistance and adhesion based on the (A4) component, and simultaneously has excellent recovery properties, durability and creep resistance based on the (A3) component.

A preferable specific example of the (A4) component (meth)acrylate copolymer is based on a production method in which a reactive silicon group-containing polyoxyalkylene polymer is blended with a copolymer having a molecular chain substantially formed of the following two (meth)acrylate monomer units: one (meth)acrylate monomer unit has the alkyl groups having 1 to 8 carbon atoms represented by the following general formula (14):

where $R^{10}$ represents a hydrogen atom or a methyl group, and $R^{11}$ represents an alkyl group having 1 to 8 carbon atoms; and the other (meth)acrylate monomer unit has the alkyl groups having 10 or more carbon atoms represented by the following general formula (15):

where $R^{10}$ is the same as described above, and $R^{12}$ represents an alkyl group having 10 or more carbon atoms.

In the general formula (14), examples of $R^{11}$ include alkyl groups having 1 to 8 carbon atoms, preferably 1 to 4 carbon atoms and further preferably 1 to 2 carbon atoms such as a methyl group, an ethyl group, a propyl group, a n-butyl group, a tert-butyl group and a 2-ethylhexyl group. It is also to be noted that $R^{11}$ may represent either one type or admixtures of two or more types.

In the above general formula (15), examples of $R^{12}$ include long chain alkyl groups having 10 or more carbon atoms, usually 10 to 30 carbon atoms, and preferably 10 to 20 carbon atoms such as a lauryl group, a tridecyl group, a cetyl group, a stearyl group and a behenyl group. It is also to be noted that $R^{12}$ may represent, similarly to $R^{11}$, either one type or admixtures of two or more types.

The molecular chain of the above described (meth)acrylate copolymer is substantially formed of the monomer units represented by formulas (14) and (15): "substantially" as referred to here means that in the copolymer concerned the sum content of the monomer unit of formula (14) and the monomer unit of formula (15) exceeds 50 wt %. The sum content of the monomer units of formulas (14) and (15) is preferably 70 wt % or more.

Additionally, the abundance ratio by weight of the monomer unit of formula (14) to the monomer unit of formula (15) is preferably 95:5 to 40:60, and further preferably 90:10 to 60:40.

Examples of the monomer units other than the monomer units of formulas (14) and (15) which may be contained in the above described copolymer include acrylic acids such as acrylic acid and methacrylic acid; monomers containing amide groups such as acrylamide, methacrylamide, N-methylolacrylamide and N-methylolmethacrylamide, epoxy groups such as glycidylacrylate and glycidylmethacrylate, and amino groups such as diethylaminoethylacrylate, diethylaminoethylmethacrylate and aminoethyl vinyl ether; and monomer units derived from acrylonitrile, styrene, α-methylstyrene, alkyl vinyl ethers, vinyl chloride, vinyl acetate, vinyl propionate and ethylene.

The organic polymers formed by blending a reactive silicon group-containing saturated hydrocarbon polymer with a reactive silicon group-containing (meth)acrylate copolymer are proposed in Japanese Patent Laid-Open Nos. 1-168764, 2000-186176 and the like. However the organic polymer concerned is not limited to these organic polymers.

Moreover, for the production method of the organic polymers formed by blending the (meth)acrylate copolymers having the reactive silicon functional groups, there can be used additional methods in which (meth)acrylate monomers are polymerized in the presence of a reactive silicon group-containing organic polymer. These methods are disclosed specifically in Japanese Patent Laid-Open Nos. 59-78223, 59-168014, 60-228516, 60-228517 and the like. However, the method concerned is not limited to these methods.

For the (B) component in the present invention, there can be used a silicate, which has a function to improve the recovery properties, durability and creep resistance of the organic polymer that is the (A) component of the present invention.

A silicate that is the (B) component is a tetraalkoxysilane represented by the general formula (16) or the partially hydrolyzed condensates thereof:

$$\mathrm{Si(OR^{13})_4} \qquad (16)$$

where $R^{13}$s each are independently a hydrogen atom or a monovalent hydrocarbon group selected from an alkyl group having 1 to 20 carbon atoms, an aryl group having 6 to 20 carbon atoms, and an aralkyl group having 7 to 20 carbon atoms.

Specific examples of the silicate include tetraalkoxysilanes (tetraalkylsilicates) such as tetramethoxysilane, tetraethoxysilane, ethoxytrimethoxysilane, dimethoxydiethoxysilane, methoxytriethoxysilane, tetra-n-propoxysilane, tetra-i-propoxysilane, tetra-n-butoxysilane, tetra-i-butoxysilane and tetra-tert-butoxysilane, and the partially hydrolyzed condensates of these silanes.

The partially hydrolyzed condensates of the tetraalkoxysilanes are preferable because these condensates are lager in the improvement effect of the recovery properties, durability and creep resistance of the present invention than the tetraalkoxysilanes.

Examples of the above described partially hydrolyzed condensate of a tetraalkoxysilane include a condensate obtained by the usual process. In the process, water is added to a tetraalkoxysilane to partially hydrolyze the tetraalkoxysilane, and then condensation reaction occurs. Additionally, partially hydrolyzed condensates of organosilicate compounds are commercially available. Examples of such condensates include Methyl silicate 51 and Ethyl silicate 40 (both manufactured by Colcoat Co., Ltd.).

The silicate (B) in combination with the (A1) component, the (A7) component or the (A8) component of the present invention exhibits further satisfactory improvement effects of the recovery properties, durability and creep resistance. In particular, the silicate (B) in combination with the (A1) component exhibits satisfactory improvement effects of recovery properties, durability and creep resistance.

Additionally, the silicate has effects to improve the adhesion, water resistant adhesion, moisture and heat resistant adhesion and surface weather resistance of the curable composition of the present invention.

The used amount of the (B) component is preferably 0.1 to 10 parts by weight, and more preferably 1 to 5 parts by weight in relation to 100 parts by weight of the (A) component. When the blended amount of the (B) component is less than the above described ranges, sometimes the improvement effects of the recovery properties, durability and creep resistance is insufficient, while when the blended amount of the (B) component exceeds the above described ranges, sometimes the curing rate becomes slow. The above described silicates may be used each alone or as admixtures of two or more thereof.

In the present invention, as the (C) component, a tin carboxylate can be used. The use of the tin carboxylate as a silanol condensation catalyst for the organic polymer that is the (A1) component of the present invention makes it possible to increase the recovery properties, durability and creep resistance of the obtained cured article as compared to other silanol condensation catalysts.

No particular constraint is imposed on the tin carboxylates (C) used in the present invention, and various compounds can be used.

Here, as the carboxylic acids having the acid radicals of the tin carboxylates (C), preferably used are compounds containing hydrocarbon based carboxylic acid radicals having 2 to 40 carbon atoms inclusive of the carbonyl carbon atom; because of availability, hydrocarbon based carboxylic acids having 2 to 20 carbon atoms are particularly preferably used.

Specific examples include straight chain saturated fatty acids such as acetic acid, propionic acid, butyric acid, valeric acid, caproic acid, enanthic acid, caprylic acid, 2-ethylhexanoic acid, pelargonic acid, capric acid, undecanoic acid, lauric acid, tridecanoic acid, myristic acid, pentadecanoic acid, palmitic acid, heptadecanoic acid, stearic acid, nonadecanoic acid, arachic acid, behenic acid, lignoceric acid, cerotic acid, montanic acid, melissic acid and lacceric acid; monoene unsaturated fatty acids such as undecylenic acid, linderic acid, tsuzuic acid, physeteric acid, myristoleic acid, 2-hexadecenoic acid, 6-hexadecenoic acid, 7-hexadecenoic acid, palmitoleic acid, petroselic acid, oleic acid, elaidic acid, asclepinic acid, vaccenic acid, gadoleic acid, gondoic acid, cetoleic acid, erucic acid, brassidic acid, selacholeic acid, ximenic acid, lumequeic acid, acrylic acid, methacrylic acid, angelic acid, crotonic acid, isocrotonic acid and 10-undecenoic acid; polyene unsaturated fatty acids such as linoelaidic acid, linoleic acid, 10,12-octadecadienoic acid, hiragoic acid, α-eleostearic acid, β-eleostearic acid, punicic acid, linolenic acid, 8,11,14-eicosatrienoic acid, 7,10,13-docosatrienoic acid, 4,8,11,14-hexadecatetraenoic acid, moroctic acid, stearidonic acid, arachidonic acid, 8,12,16,19-docosatetraenoic acid, 4,8,12,15,18-eicosapentaenoic acid, clupanodonic acid, nishinic acid and docosahexaenoic acid; branched fatty acids such as 1-methylbutyric acid, isobutyric acid, 2-ethylbutyric acid, isovaleric acid, tuberculostearic acid, pivalic acid and neodecanoic acid; fatty acids having a triple bond such as propiolic acid, tariric acid, stearolic acid, crepenynic acid, ximenynic acid and 7-hexadecynoic acid; alicyclic carboxylic acids such as naphthenic acid, malvalic acid, sterculic acid, hydnocarpic acid, chaulmoogric acid and gorlic acid; oxygen containing fatty acids such as acetoacetic acid, ethoxy acetic acid, glyoxylic acid, glycolic acid, gluconic acid, sabinic acid, 2-hydroxytetradecanoic acid, ipurolic acid, 2-hydroxyhexadecanoic acid, jalapinolic acid, juniperic acid, ambrettolic acid, aleuritic acid, 2-hydroxyoctadecanoic acid, 12-hydroxyoctadecanoic acid, 18-hydroxyoctadecanoic acid, 9,10-dihydroxyoctadecanoic acid, ricinoleic acid, camlolenic acid, licanic acid, pheronic acid and cerebronic acid; and halogen substituted monocarboxylic acids such as chloroacetic acid, 2-chloroacrylic acid and chlorobenzoic acid. Examples of aliphatic dicarboxylic acids include saturated dicarboxylic acids such as adipic acid, azelaic acid, pimelic acid, suberic acid, sebacic acid, ethylmalonic acid, glutaric acid, oxalic acid, malonic acid, succinic acid, oxydiacetic acid; and unsaturated dicarboxylic acids such as maleic acid, fumaric acid, acetylenedicarboxylic acid and itaconic acid. Examples of aliphatic polycarboxylic acids include tricarboxylic acids such as aconitic acid, citric acid and isocitric acid. Examples of aromatic carboxylic acids include aromatic monocarboxylic acids such as benzoic acid, 9-anthracenecarboxylic acid, atrolactic acid, anisic acid, isopropylbenzoic acid, salicylic acid and toluic acid; and aromatic polycarboxylic acids such as phthalic acid, isophthalic acid, terephthalic acid, carboxyphenylacetic acid and pyromellitic acid. Additional other examples include amino acids such as alanine, leucine, threonine, aspartic acid, glutamic acid, arginine, cysteine, methionine, phenylalanine, tryptophane and histidine.

The above described carboxylic acid is preferably 2-ethylhexanoic acid, octylic acid, neodecanoic acid, oleic acid or naphthenic acid, because particularly these acids are easily available and low in price, and satisfactorily compatible with the (A1) component.

When the melting point of the carboxylic acid is high (the crystallinity is high), the tin carboxylate having the acid radical of the carboxylic acid has similarly a high melting point and is hardly handlable (poor in workability). Accordingly, the melting point of the carboxylic acid is preferably 65° C. or lower, more preferably −50 to 50° C., and particularly preferably −40 to 35° C.

Additionally, when the number of the carbon atoms in the above described carboxylic acid is large (the molecular weight thereof is large), the tin carboxylate having the acid radical takes a solid form or a highly viscous liquid form, becoming hardly handlable (degrading the workability thereof). On the contrary, when the number of the carbon atoms in the above described carboxylic acid is small (the molecular weight thereof is small), sometimes the tin carboxylate having the acid radical contains such components that are easily evaporated by heating, and the catalytic activity of the metal carboxylate is degraded. Particularly, under the conditions that the composition is extended thinly (a thin layer), sometimes the evaporation due to heating becomes significant, and the catalytic activity of the metal carboxylate is largely degraded. Accordingly, for the above described carboxylic acid, the number of the carbon atoms inclusive of the carbonyl carbon atom is preferably 2 to 20, more preferably 6 to 17, and particularly preferably 8 to 12.

From the viewpoint of easy handlability (workability and viscosity) of the tin carboxylate, the tin carboxylate is preferably a tin dicarboxylate or a tin monocarboxylate, and more preferably a tin monocarboxylate.

As the above described tin monocarboxylate, preferable is a divalent Sn compound represented by the general formula (17):

$$Sn(OCOR)_2 \quad (17)$$

where Rs each are a substituted or unsubstituted hydrocarbon group, and may include carbon-carbon double bonds, and the two RCOO— groups maybe the same or different, or a tetravalent Sn compound represented by the general formula (18):

$$Sn(OCOR)_4 \quad (18)$$

where Rs are the same as described above, and two RCOO— groups may be the same or different. From the viewpoints of curability and availability, the divalent Sn compound represented by the general formula (17) is more preferable.

Additionally, the above described tin carboxylate (C) is preferably a tin carboxylate (tin 2-ethylhexanoate and the like) in which the α-carbon atom of the carboxyl group is a tertiary carbon atom or a tin carboxylate (tin neodecanoate, tin pivalate and the like) in which the α-carbon atom of the carboxyl group is a quaternary carbon atom because of rapid curing rate, and is particularly preferably a tin carboxylate in which the carbon atom adjacent to the carbonyl group is a quaternary carbon atom.

In the present invention, among the tin carboxylates (C), a particular tin carboxylate in which the α-carbon atom of the carboxyl group is a quaternary carbon atom is used as the (C1) component.

Examples of the (C1) component tin carboxylate include the tin salt of a chain fatty acid represented by the general formula (19):

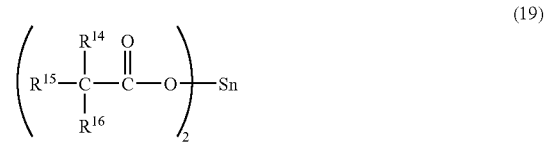

where $R^{14}$, $R^{15}$ and $R^{16}$ each are independently a substituted or unsubstituted monovalent organic group, and the group may include carboxyl groups; the tin salt of a cyclic fatty acid represented by the general formula (20):

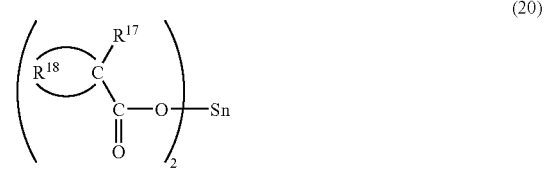

where $R^{17}$ is a substituted or unsubstituted monovalent organic group, $R^{18}$ is a substituted or unsubstituted divalent organic group, and these groups each may include carboxyl groups; or the tin salt of a cyclic fatty acid represented by the general formula (21):

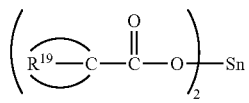

(21)

where $R^{19}$ is a substituted or unsubstituted trivalent organic group, and the group may include carboxyl groups. Specific examples of the carboxylic acid having the acid radical of the tin carboxylate (C1) include chain monocarboxylic acids such as pivalic acid, 2,2-dimethylbutyric acid, 2-ethyl-2-methylbutyric acid, 2,2-diethylbutyric acid, 2,2-dimethylvaleric acid, 2-ethyl-2-methylvaleric acid, 2,2-diethylvaleric acid, 2,2-dimethylhexanoic acid, 2,2-diethylhexanoic acid, 2,2-dimethyloctanoic acid, 2-ethyl-2,5-dimethylhexanoic acid, neodecanoic acid, versatic acid, 2,2-dimethyl-3-hydroxypropionic acid; chain dicarboxylic acids such as dimethylmalonic acid, ethylmethylmalonic acid, diethylmalonic acid, 2,2-dimethylsuccinic acid, 2,2-diethylsuccinic acid, 2,2-dimethylglutaric acid; chain tricarboxylic acids such as 3-methylisocitric acid and 4,4-dimethylaconitic acid; and cyclic carboxylic acids such as 1-methylcyclopentane carboxylic acid, 1,2,2-trimethyl-1,3-cyclopentane dicarboxylic acid, 1-methylcyclohexane carboxylic acid, 2-methylbicyclo[2.2.1]-5-heptene-2-carboxylic acid, 2-methyl-7-oxabicyclo[2.2.1]-5-heptene-2-carboxylic acid, 1-adamantane carboxylic acid, bicyclo[2.2.1]heptane-1-carboxylic acid and bicyclo[2.2.2]octane-1-carboxylic acid. Compounds having such structures are abundant in natural products, and such compounds can also be used.

Particularly, the tin monocarboxylates are more preferable because the compatibility thereof with the (A1) component and the workability thereof are satisfactory; moreover, the tin chain-monocarboxylates are more preferable. Additionally, because of easy availability, tin pivalate, tin neodecanoate, tin versatate, tin 2,2-dimethyloctanoate, tin 2-ethyl-2,5-dimethylhexanoate and the like are particularly preferable.

Similarly to the case of the above described (C) component, divalent tin carboxylates and tetravalent tin carboxylates can be cited for the (C1) component; however, divalent tin carboxylates are more preferable from the viewpoints of the curability and availability.

The number of the carbon atoms in a carboxylic acid having the acid radical of the (C1) component is preferably 5 to 20, more preferably 6 to 17, and particularly preferably 8 to 12. When the number of the carbon atoms exceeds these ranges, sometimes unpreferably such a tin carboxylate tends to take a solid form, the compatibility thereof with the (A1) component is degraded, and the catalytic activity tends to be degraded. On the other hand, when the number of the carbon atoms is small, unpreferably the volatility and the odor tend to be increased, and the thin-layer curability of the curable composition is degraded.

From these viewpoints, as the (C1) component, particularly preferable are tin(II) neodecanoate, tin(II) versatate, tin(II) 2,2-dimethyloctanoate, tin(II) 2-ethyl-2,5-dimethylhexanoate, tin(IV) neodecanoate, tin(IV) versatate, tin(IV) 2,2-dimethyloctanoate and tin (IV) 2-ethyl-2,5-dimethylhexanoate.

The used amount of each of the (C) component and the (C1) component is preferably of the order of 0.01 to 20 parts by weight, and further preferably of the order of 0.5 to 10 parts by weight, in relation to 100 parts by weight of the (A1) component. When the blended amount concerned is smaller than the above described ranges, sometimes unpreferably the curing rate becomes slow, and the curing reaction hardly proceeds to a sufficient extent. On the other hand, when the blended amount concerned exceeds the above described ranges, sometimes unpreferably the work life becomes too short and the workability is degraded, and this is not preferable from the viewpoint of the storage stability.

Additionally, the (C) component and the (C1) component may be used each alone or in combinations of two or more thereof.

When the activity is low only with the (C) component and the (C1) component, and accordingly an appropriate curability cannot be obtained, an amine compound may be added as an auxiliary catalyst.

Various such amines are described, for example, in Japanese Patent Laid-Open No. 5-287187; specific examples of the amine compound include aliphatic primary amines such as methylamine, ethylamine, propylamine, isopropylamine, butylamine, amylamine, hexylamine, octylamine, 2-ethylhexylamine, nonylamine, decylamine, laurylamine, pentadecylamine, cetylamine, stearylamine and cyclohexylamine; aliphatic secondary amines such as dimethylamine, diethylamine, dipropylamine, diisopropylamine, dibutylamine, diamylamine, dioctylamine, di(2-ethylhexyl)amine, didecylamine, dilaurylamine, dicetylamine, distearylamine, methylstearylamine, ethylstearylamine and butylstearylamine; aliphatic tertiary amines such as triethylamine, triamylamine, trihexylamine and trioctylamine; aliphatic unsaturated amines such as triallylamine and oleylamine; aromatic amines such as laurylaniline, stearylaniline, triphenylamine, N,N-dimethylaniline and dimethylbenzylaniline; and other amines such as monoethanolamine, diethanolamine, triethanolamine, dimethylaminoethanol, diethylenetriamine, triethylenetetramine, tetraethylenepentamine, benzylamine, diethylaminopropylamine, xylylenediamine, ethylenediamine, hexamethylenediamine, dodecamethylenediamine, dimethylethylenediamine, triethylenediamine, guanidine, diphenylguanidine, N,N,N',N'-tetramethyl-1,3-butanediamine, N,N,N',N'-tetramethylethylenediamine, 2,4,6-tris(dimethylaminomethyl)phenol, morpholine, N-methylmorpholine, 2-ethyl-4-methylimidazole, and 1,8-diazabicyclo(5,4,0)undecene-7 (DBU). However, the amine is not limited to these examples.

The blended amount of the above described amine compound is preferably of the order of 0.01 to 20 parts by weight, and more preferably 0.1 to 5 parts by weight in relation to 100 parts by weight of the (A1) component. When the blended amount of the amine compound is less than 0.01 part by weight, sometimes the curing rate becomes slow, and the curing reaction hardly proceeds to a sufficient extent. On the other hand, when the blended amount of the amine compound exceeds 20 parts by weight, sometimes the pot life tends to become too short, and this is not preferable from the viewpoint of workability.

In the present invention, an organotin catalyst can be used as the (D) component. When such an organotin catalyst is used as a silanol condensation catalyst for a reactive silicon group-containing organic polymer, the organotin catalyst is higher in catalytic activity, as compared to other silanol condensation catalysts, to yield a curable composition satisfactory in deep-part curability and adhesion. However, the organotin catalyst, according to the addition amount thereof, degrades the recovery properties, durability and creep resistance of the cured article derived from the obtained curable composition.

By use of the organic polymer that is the (A1) component of the present invention, as the polymer component, the curable composition added with the (D) component organotin catalyst is made to be high in catalytic activity, satisfactory in deep-part curability and adhesion, and the recovery properties, durability and creep resistance of the obtained cured article can be maintained at high levels.

On the other hand, when an adhesive or a sealant which contains as the main component a reactive silicon group-containing organic polymer is used in applications requiring durability, the above described (C) component tin carboxylate is often used as a curing catalyst. However, when the tin carboxylate is used as a curing catalyst, the sealant remaining, if any, as a thin layer portion around joints sometimes results in a hardly curable thin layer portion, particularly, a portion remaining uncured under high temperature and high humidity conditions. On the other hand, the above described organotin catalyst (D) is used as a curing catalyst, the recovery properties and durability are degraded as described above, whereas the curability of the thin layer portion is satisfactory. Accordingly, when the (A1) component organic polymer of the present invention and the (D) component organotin catalyst are used in combination, the curability of the thin layer portion can be markedly improved while the recovery properties and durability of the obtained cured article are being maintained at high levels.

However, even when the (A1) component organic polymer of the present invention is combined with the (D) component organotin catalyst, sometimes the recovery properties and durability are slightly degraded depending on the addition amount of the (D) component organotin catalyst. Accordingly, it is more preferable that the (D) component organotin catalyst and the (C) component tin carboxylate are simultaneously used as the curing catalyst, and the addition amount of the (D) component is decreased to such an extent that sufficient curability, deep-part curability, adhesion and thin-layer curability can be obtained.

Specific examples of the above described organotin catalyst (D) include dialkyltin carboxylates, dialkyltin oxides, and the compounds represented by the general formula (22):

$$Q_gSn(OZ)_{4-g} \text{ or } [Q_2Sn(OZ)]_2O \qquad (22)$$

where Q represents a monovalent hydrocarbon group having 1 to 20 carbon atoms, Z represents a monovalent hydrocarbon group having 1 to 20 carbon atoms or an organic group having therein one or more functional groups capable of forming coordination bonds with Sn, and g is any one of 0, 1, 2, and 3. The reaction products between tetravalent tin compounds such as dialkyltin oxides and dialkyltin diacetates and low-molecular-weight, hydrolyzable silicon group-containing silicon compounds such as tetraethoxysilane, methyltriethoxysilane, diphenyldimethoxysilane and phenyltrimethoxysilane can also be used as the (D) component. Among these compounds, the compounds represented by the general formula (22), namely, chelate compounds such as dibutyltin bis(acetylacetonate) and tin alcoholates are preferable because of high activity as silanol condensation catalyst.

Specific examples of the dialkyltin carboxylates include dibutyltin dilaurate, dibutyltin diacetate, dibutyltin diethylhexanolate, dibutyltin dioctanoate, dibutyltin dimethylmaleate, dibutyltin diethylmaleate, dibutyltin dibutylmaleate, dibutyltin diisooctylmaleate, bibutyltin ditridecylmaleate, dibutyltin dibenzylmaleate, dibutyltin maleate, dioctyltin diacetate, dioctyltin distearate, dioctyltin dilaurate, dioctyltin diethylmaleate, and dioctyltin diisooctylmaleate.

Specific examples of the dialkyltin oxides include dibutyltin oxide, dioctyltin oxide, and a mixture composed of dibutyltin oxide and a phthalate.

Specific examples of the chelate compounds include the following:

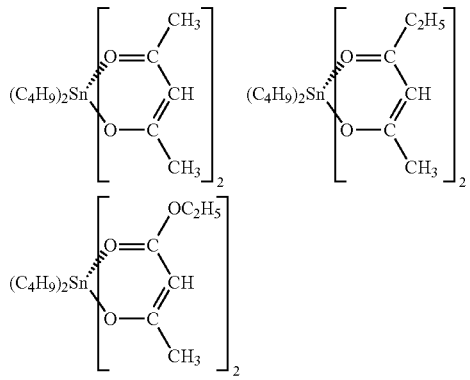

However, the chelate compounds concerned are not limited to these examples. Among these chelate compounds, dibutyltin bis(acetylacetonate) is most preferable because it is high in catalytic activity, low in cost, and easily available.

Specific examples of the tin alcoholates include the following:

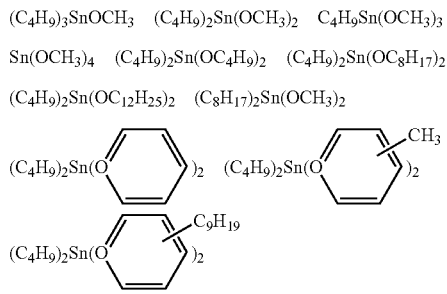

However, the tin alcoholates concerned are not limited to these examples. Among these tin alcoholates, dialkylltin dialkoxides are preferable. In particular, dibutyltin dimethoxide is preferable because it is low in cost and easily available.

The used amount of the (D) component is preferably of the order of 0.01 to 20 parts by weight, and furthermore preferably of the order of 0.1 to 10 parts by weight in relation to 100 parts by weight of the (A1) component. When the blended amount concerned is smaller than the above described ranges, sometimes unpreferably the curing rate becomes slow, and the curing reaction hardly proceeds to a sufficient extent. On the other hand, when the blended amount concerned exceeds the above described ranges, sometimes unpreferably the work life becomes too short and the workability is degraded, and this is not preferable from the viewpoint of the storage stability.

The used amounts of the (C) and (D) components, when used in combination as the curing catalyst, are preferably 0.5 to 20 parts by weight and 0.01 to 10 parts by weight, respectively, and more preferably, 1 to 10 parts by weight and 0.02 to 5 parts by weight, respectively, in relation to 100 parts by weight of the (A1) component. When the blended amount of the (C) component is less than the above described ranges, sometimes the curing rate becomes slow, while when the blended amount concerned exceeds the above described ranges, sometimes the work life becomes too short and the workability is degraded. When the blended amount of the (D)

component is smaller than the above described ranges, sometimes the improvement effects of the curability, deep-part curability, adhesion and thin-layer curability become insufficient, while when the blended amount concerned exceeds the above described ranges, sometimes the recovery properties, durability and creep resistance of the obtained cured article are degraded.

Additionally, the (D) component may be used each alone or in combinations of two or more thereof.

In the present invention, a non-tin catalyst can be used as component (E). Such a non-tin catalyst has the function of increasing the recovery properties, durability and creep resistance of the obtained cured article when used as a silanol condensation catalyst for an organic polymer (component (A1)) of the present invention, as compared with other silanol condensation catalysts. The component (E) non-tin catalyst is also an environmentally friendly curing catalyst for which there is a strong desire from society.

Although the non-tin catalyst component (E) used in the present invention is not particularly limited, examples include carboxylic acid, a carboxylic acid metal salt other than tin carboxylate, an organic sulfonic acid, an acidic phosphate ester and an organometallic compound containing a Group 3B or Group 4A metal. Examples of an organometallic compound containing a Group 3B or Group 4A metal include organotitanate compounds, organoaluminum compounds, organozirconium compounds and organoboron compounds. Among these, carboxylic acid, a carboxylic acid metal salt other than tin carboxylate and an organotitanate compound are preferable in terms of their availability, curability and the recovery properties of the obtained cured article. More preferable are carboxylic acid and an organotitanate compound, and particularly preferable is carboxylic acid.

Examples of the carboxylic acid include the above-described various carboxylic acids having the acid group of the component (C) tin carboxylate.

The above-described carboxylic acid, in the same manner as the tin carboxylate (C), preferably contains from 2 to 20 carbon atoms including the carboxylic acid carbon atom. More preferable is from 6 to 17 carbon atoms, and from 8 to 12 is particularly preferable. From the standpoint of ease of handling of the carboxylic acid (workability and viscosity), a dicarboxylic acid or a monocarboxylic acid is preferable, and more preferable is a monocarboxylic acid. The above-described carboxylic acid is more preferably a carboxylic acid wherein the α-site carbon atom of the carboxyl group is a tertiary carbon (2-ethylhexanoic acid, etc.) or a quaternary carbon (neodecanoic acid, pivalic acid, etc.) because of its rapid curing rate. Particularly preferable is a carboxylic acid wherein a carbon atom adjacent to the carbonyl group is quaternary.

In view of availability, curability and workability, particularly preferable as the carboxylic acid are 2-ethylhexanoic acid, neodecanoic acid, versatic acid, 2,3-dimethyloctanoic acid and 2-ethyl-2,5-dimethylhexanoic acid.

As the carboxylic acid metal salt other than the above-described tin carboxylate, the above-described various kinds of carboxylic acid metal salt may be suitably employed.

Of the carboxylic acid metal salts other than the above-described tin carboxylate, bismuth carboxylate, calcium carboxylate, vanadium carboxylate, iron carboxylate, titanium carboxylate, potassium carboxylate, barium carboxylate, manganese carboxylate, nickel carboxylate, cobalt carboxylate, zirconium carboxylate and cerium carboxylate exhibit high catalytic activity, and are thus preferable. More preferable are bismuth carboxylate, calcium carboxylate, vanadium carboxylate, iron carboxylate, titanium carboxylate, potassium carboxylate, barium carboxylate, manganese carboxylate, and zirconium carboxylate, still more preferable are bismuth carboxylate, calcium carboxylate, vanadium carboxylate, iron carboxylate, titanium carboxylate, and zirconium carboxylate, while most preferable among these are bismuth carboxylate, iron carboxylate and titanium carboxylate.

Further, more preferable are bismuth carboxylate, calcium carboxylate, vanadium carboxylate, titanium carboxylate, potassium carboxylate, barium carboxylate, manganese carboxylate, nickel carboxylate, cobalt carboxylate and zirconium carboxylate in view of the fact that the obtained curable composition has low coloration and that the obtained cured article possesses high thermal resistance and weatherability, and still more preferable are bismuth carboxylate, calcium carboxylate, titanium carboxylate, potassium carboxylate, barium carboxylate and zirconium carboxylate.

From the standpoint of ease of handling of the carboxylic acid metal salt (workability and viscosity), a metal salt of a monocarboxylic acid is more preferable.

Preferable carboxylic acid metal salts for such a monocarboxylic acid metal salt are represented by the general formulae (23) to (35):

$$Bi(OCOR)_3 \quad (23)$$

$$Ca(OCOR)_2 \quad (24)$$

$$V(OCOR)_3 \quad (25)$$

$$Fe(OCOR)_2 \quad (26)$$

$$Fe(OCOR)_3 \quad (27)$$

$$Ti(OCOR)_4 \quad (28)$$

$$K(OCOR) \quad (29)$$

$$Ba(OCOR)_2 \quad (30)$$

$$Mn(OCOR)_2 \quad (31)$$

$$Ni(OCOR)_2 \quad (32)$$

$$Co(OCOR)_2 \quad (33)$$

$$Zr(O)(OCOR)_2 \quad (34)$$

$$Ce(OCOR)_3 \quad (35)$$

wherein R represents a substituted or non-substituted hydrocarbon group and may contain a carbon-carbon double bond; and 2 RCOO— groups may be the same or different.

Examples of the carboxylic acid group of the carboxylic acid metal salt other than the above-described tin carboxylates include the acid groups of the various tin carboxylates exemplified as the above-described component (C).

In view of the availability and compatibility of the raw materials, specific examples of a preferable carboxylic acid metal salt include bismuth 2-ethylhexanoate (trivalent), iron 2-ethylhexanoate (divalent), iron 2-ethylhexanoate (trivalent), titanium 2-ethylhexanoate (tetravalent), vanadium 2-ethylhexanoate (trivalent), calcium 2-ethylhexanoate (divalent), potassium 2-ethylhexanoate (monovalent), barium 2-ethylhexanoate (divalent) manganese 2-ethylhexanoate (divalent), nickel 2-ethylhexanoate (divalent), cobalt 2-ethylhexanoate (divalent), zirconium 2-ethylhexanoate (tetravalent), cerium 2-ethylhexanoate (trivalent), bismuth neodecanoate (trivalent), iron neodecanoate (divalent), iron neodecanoate (trivalent), titanium neodecanoate (tetravalent), vanadium neodecanoate (trivalent), calcium neodecanoate (divalent), potassium neodecanoate (monovalent), barium neodecanoate (divalent), zirconium neodecanoate (tetravalent), cerium neodecanoate (trivalent), bismuth oleate (trivalent), iron oleate (divalent), iron oleate (trivalent), titaniumoleate (tetravalent), vanadium oleate (trivalent), calcium oleate (divalent), potassium oleate (monovalent), barium oleate (divalent), manganese oleate (divalent), nickel oleate (divalent) cobalt oleate (divalent), zirconium oleate (tetravalent), cerium oleate (trivalent), bismuth naphthenate (trivalent), iron naphthenate (divalent), iron naphthenate (trivalent), titanium naphthenate (tetravalent), vanadium naphthenate (trivalent), calcium naphthenate (divalent), potassium naphthenate (monovalent) barium naphthenate (divalent), manganese naphthenate (divalent) nickel naphthenate (divalent), cobalt naphthenate (divalent), zirconium naphthenate (tetravalent) and cerium naphthenate (trivalent).

In view of catalytic activity, more preferable are bismuth 2-ethylhexanoate (trivalent), iron 2-ethylhexanoate (divalent), iron 2-ethylhexanoate (trivalent), titanium 2-ethylhexanoate (tetravalent), bismuth neodecanoate (trivalent), iron neodecanoate (divalent), iron neodecanoate (trivalent), titanium neodecanoate (tetravalent), bismuth oleate (trivalent), iron oleate (divalent), iron oleate (trivalent), titanium oleate (tetravalent), bismuth naphthenate (trivalent), iron naphthenate (divalent), iron naphthenate (trivalent) and titanium naphthenate (tetravalent), and particularly preferable are iron 2-ethylhexanoate (trivalent), iron neodecanoate (trivalent) and iron naphthenate (trivalent).

In view of coloration, more preferred are bismuth 2-ethylhexanoate (trivalent), titanium 2-ethylhexanoate (tetravalent), calcium 2-ethylhexanoate (divalent), potassium 2-ethylhexanoate (monovalent), barium 2-ethylhexanoate (divalent), zirconium 2-ethylhexanoate (tetravalent), bismuth neodecanoate (trivalent), titanium neodecanoate (tetravalent), calcium neodecanoate (divalent), potassium neodecanoate (monovalent), barium neodecanoate (divalent), zirconium neodecanoate (tetravalent), bismuth oleate (trivalent), titanium oleate (tetravalent), calcium oleate (divalent), potassium oleate (monovalent), barium oleate (divalent), zirconium oleate (tetravalent), bismuth naphthenate (trivalent), titanium naphthenate (tetravalent), calcium naphthenate (divalent), potassium naphthenate (monovalent), barium naphthenate (divalent) and zirconium naphthenate (tetravalent).

Examples of the organic sulfonic acid include toluenesulfonic acid and styrenesulfonic acid, among others.

The acidic phosphate ester is a phosphoric acid ester containing an —O—P(=O)OH moiety and includes the below-mentioned acidic phosphate esters. Organic acidic phosphate ester compounds are preferred in view of their compatibility and cure-catalyzing activity.

The organic acidic phosphate ester compound is represented by the formula $(R^{20}—O)_h—P(=O)(—OH)_{3-h}$ (wherein h is equal to 1 or 2; and $R^{20}$ represents an organic residue).

Specific examples include $(CH_3O)_2—P(=O)(—OH)$, $(CH_3O)—P(=O)(—OH)_2$, $(C_2H_5O)_2—P(=O)(—OH)$, $(C_2H_5O)—P(=O)(—OH)_2$, $(C_3H_7O)_2—P(=O)(—OH)$, $(C_3H_7O)—P(=O)(—OH)_2$, $(C_4H_9O)_2—P(=O)(—OH)$, $(C_4H_9O)—P(=O)(—OH)_2$, $(C_8H_{17}O)_2—P(=O)(—OH)$, $(C_8H_{17}O)—P(=O)(—OH)_2$, $(C_{10}H_{21}O)_2—P(=O)(—OH)$, $(C_{10}H_{21}O)—P(=O)(—OH)_2$, $(C_{13}H_{27}O)_2—P(=O)(—OH)$, $(C_{13}H_{27}O)—P(=O)(—OH)_2$, $(C_{16}H_{33}O)_2—P(=O)(—OH)$, $(C_{16}H_{33}O)—P(=O)(—OH)_2$, $(HO—C_6H_{12}O)_2—P(=O)(—OH)$, $(HO—C_6H_{12}O)—P(=O)(—OH)_2$, $(HO—C_8H_{16}O)_2—P(=O)(—OH)$, $(HO—C_8H_{16}O)—P(=O)(—OH)_2$, $\{(CH_2OH)(CHOH)O\}_2—P(=O)(—OH)$, $\{(CH_2OH)(CHOH)O\}—P(=O)(—OH)_2$, $\{(CH_2O)(CHOH)C_2H_4O\}_2—P(=O)(—OH)$, $\{(CH_2OH)(CHOH)C_2H_4O\}—P(=O)(—OH)_2$ and the like, although the present invention is not limited to these exemplified substances.

In cases where the carboxylic acid, carboxylic acid metal salt other than tin carboxylate, organic sulfonic acid, and acidic phosphate ester alone results in low activity, whereby suitable curability cannot be achieved, an amine compound may be added as a promoter.

Examples of the various amine compounds that can be used include the various amine compounds described above as a promoter for the tin carboxylate (C).

The amount of the amine compound is preferably from about 0.01 to 20 parts by weight, and more preferably from about 0.1 to 5 parts by weight, in relation to 100 parts by weight of the component (A1) organic polymer. When the amount of the amine compound is less than 0.01 parts by weight, the curing rate may decrease, and in some cases it becomes more difficult for the curing reaction to proceed sufficiently. On the other hand, when the amount of the amine compound is more than 20 parts by weight, pot life may become too short, which is not preferable from a workability standpoint.

Examples of the non-tin metal compound include an organometallic compound containing a Group 3B or Group 4A metal, as well as the above-described carboxylic acid metal salt other than tin carboxylate. While organotitanate compounds, organoaluminum compounds, organozirconium compounds, organoboron compounds and the like are preferable in view of their activity, the non-tin metal compound is not limited to these examples.

Examples of the above-described organotitanate compound include titanium alkoxides such as tetraisopropyl titanate, tetrabutyl titanate, tetramethyl titanate, tetra(2-ethylhexyl titanate), triethanolamine titanate, and chelate compounds such as titanium chelate compounds, for example titanium tetraacetylacetonate, titanium ethylacetoacetate, octylene glycol titanate ester, titanium lactate and the like.

Examples of the above-described organoaluminum compound include aluminum alkoxides such as aluminum isopropylate, mono-sec-butoxyaluminum diisopropylate, and aluminum sec-butylate, and aluminum chelate compounds, such as aluminum tris(acetylacetonate), aluminum tris(ethyl acetoacetate), diisopropoxyaluminum ethylacetoacetate and the like.

Examples of the above-described organozirconium compound include zirconium alkoxides such as zirconium tetraisopropylate, zirconium tetra-n-propylate and zirconium n-butylate, and zirconium chelate compounds, such as zirconium tetraacetylacetonate, zirconium monoacetylacetonate, zirconium bisacetylacetonate, zirconium acetylacetonato-bis-etylacetoacetate, zirconium acetate and the like.

While these organotitanate compounds, organoaluminum compounds, organozirconium compounds, organoboron compounds, etc. may be each used in combination, the use of these compounds in combination with the above-described amine compound or acidic phosphate ester compound is preferable from the standpoint that savings in catalyst material may be realized because activity can be increased. The use of such combination is further preferable from the point of improved curability at elevated temperature and adjustment of the work life at room temperature.

The content of component (E) is preferably from 0.01 to 20 parts by weight relative in relation to 100 parts by weight of component (A1), and more preferable is from 0.5 to 10 parts by weight. An amount less than this range is not preferable, since the curing rate may decrease, and in some cases it becomes more difficult for the curing reaction to proceed sufficiently. On the other hand, an amount above this range is not preferable, since work life may become too short causing a deterioration in workability, and is also not preferable in terms of storage stability.

Component (E) can not only be used alone, but also used in combination with two types or more.

In the present invention microballoons can be used as component (F). It is known, as disclosed in Japanese Patent Publication Nos. 11-35923 and 11-310772, that when such microballoons are used, workability (thread-pulling properties, thixotropy properties) of the compound dramatically improves, and the compound can become lighter and lower in cost. However, it is known that depending on the added amount of microballoons, the recovery properties and durability of the obtained curable composition cured article can deteriorate.

Using the component (A1) organic polymer of the present invention for the polymer component allows a curable composition to which component (F) microballoons have been added to maintain high recovery properties and durability of the obtained cured article while dramatically improving workability (thread-pulling properties).

The component (F) microballoons of the present invention (hereinafter referred to as "balloons"), as described by CMC Books in "Current Technology of Functional Fillers", are hollow bodies constituted from an inorganic or organic material having a diameter of not more than 1 mm, and preferably not more than 500 μm. Component (F) is not particularly restricted, and various kinds of commonly known balloons may be used.

The average particle density of the balloons is preferably from 0.01 to 1.0 g/cm$^3$, from 0.03 to 0.7 g/cm$^3$ is more preferable and from 0.1 to 0.5 g/cm$^3$ is particularly preferable. If the average particle density is lower than this range the tensile strength of the cured article can deteriorate, while if the average particle density is greater than this range the workability improvement effects are sometimes insufficient.

From the standpoint of recovery properties and durability, inorganic balloons are preferable to organic balloons.

Examples of the above-described inorganic balloons include silicic acid balloons and non-silicic acid balloons. Examples of silicic-acid balloons include shirasu balloons, pearlite, glass balloons, silica balloons and fly-ash balloons. Examples of non-silicic acid balloons include alumina balloons, zirconia balloons and carbon balloons. Specific commercially-available examples of these inorganic balloons include Winlite (product of Idichi Chemical) and Sankilite (product of Sanki Engineering Co., Ltd.) as shirasu balloons, Calloon (product of Nippon Sheet Glass Co.), Selstar Z-28 (product of Sumitomo 3M), MICRO BALLOON (product of Emerson & Cuming Co.), CELAMIC GLASSMODULES (product of Pittsburge Corning) and GLASS BUBBLES (product of 3M) and Fuji Balloon (product of Fuji Silysia Chemical Ltd.) as glass balloons, Q-CEL (product of Asahi Glass CO.) and Sylisia (product of Fuji Silysia Chemical Ltd.) as silica balloons, CEROSPHERES (product of Pfamarketing) and FILLITE (product of Fillite U.S.A.) as fly-ash balloons, BW (product of Showa Denko Co.) as alumina balloons, HOLLOW ZIRCONIUM SPHERES (product of Zircoa) as zirconia balloons, and Kurekasphere (product of Kureha Chemical Industry Co.) and Carbosphere (product of General Technologies) as carbon balloons.

Examples of the above-described organic balloons include thermosetting resin balloons and thermoplastic resin balloons. Thermosetting balloons specifically include phenol balloons, epoxy balloons and urea balloons, and thermoplastic balloons specifically include saran balloons, polystyrene balloons, polymethacrylate balloons, poly(vinyl alcohol) balloons and styrene-acrylic balloons. Crosslinked thermoplastic resin balloons can also be used. The term "balloons" as used here may be foamed balloons or balloons comprising a foaming agent and being foamed after compounding to thereby render the same as a balloon.

Specific commercially-available examples of the above-described organic balloons include UCAR and PHENOLIC MICROBALLOONS (both being products of Union Carbide) as phenol balloons, ECCOSPHERES (product of Emerson & Cuming Co.) as epoxy balloons, ECCOSPHERES VF-O (product of Emerson & Cuming Co.) as urea balloons, SARAN MICROSPHERES (product of Dow Chemicals, Inc.), Expancel (product of Nihon Filament) and Matsumoto Microsphere (product of Matsumoto Yushi-Seiyaku Co.) as saran balloons, DYLITE EXPANDABLE POLYSTYRENE (product of Arco Polymers, Inc.) and EXPANDABLE POLYSTYRENE BEADS (product of BASF Wyandote) as polystyrene balloons and SX863 (P) (product of Japan Synthetic Rubber Co.) as crosslinked styrene-acrylic balloons.

The above balloons may be used independently or two or more species may be used in admixture. Furthermore, these balloons may be used after surface-treating with a fatty acid, fatty acid ester, rosin, rhodinic acid lignin, a silane coupling agent, a titanium coupling agent, an aluminum coupling agent or polypropylene glycol to improve dispersibility and workability of the composition. These balloons are used for the purpose of making the curing products light and reducing the cost without deteriorating flexibility, elongation or strength properties among the physical properties when a mixture is subjected to curing.

The balloon content is preferably in the range of about 0.1 to 50 parts, more preferably about 0.5 to 30 parts, relative in relation to 100 parts by weight of component (A1). If the content is less than 0.1 parts by weight, the effects of workability improvement maybe insufficient, while if the content exceeds this range, tensile strength of the cured article may decrease, and recovery properties and durability may deteriorate.

In the present invention, as component (G), the aminosilane coupling agent represented by general formula (3):

$$-SiR^2_a(OR^3)_{3-a} \qquad (3)$$

wherein a R$^2$ each are independent by a monovalent organic group having 1 to 20 carbons, 3-a R$^3$ each are independent by a monovalent organic group having 2 to 20 carbons, and a represents 0, 1 or 2, can also be used. Adding this component (G) to the organic polymer having a group represented by general formula (2) (the (A2) component of the present invention):

$$-Si(OR^1)_3 \qquad (2)$$

(wherein R$^1$ is the same as described above) provides for a curable composition which has excellent recovery properties, durability and creep resistance, as well as exhibiting superior adhesion. Since the reactive silicon groups of this component (G) do not have a methoxy group as the alkoxy group which is bonded to the silicon atom, even if an ester exchange reaction progresses between component (G) and the reactive silicon group of component (A2) after the component (A2) has been added, a highly reactive methoxysilyl group does not form in the reactive silicon group of component (A2). Therefore, the curing rate of a curable composition which comprises the component (G) and the component (A2) does not vary much between before and after storage. In addition, this reactive silicon group of both component (G) and component (A2) provides a very safe compound, because the alkoxy group bonded to the silicon atom has from 2 to 20 carbons, whereby highly-toxic methanol is not contained in the alcohol formed as a result of the hydrolysis reaction of the reactive silicon group during condensation curing of the curable composition.

The above-described curable composition, which comprises a component (G) and a component (A2), can be used as one-part or as a multi-part composition, such as two-part, although a one-part composition has a large effect on lowering the variation in curing rate between before and after storage, and is thus more preferable.

Component (G) is a compound which comprises a reactive silicon group represented by general formula (3) and an amino group. Specific examples of the reactive silicon group represented by general formula (3) include triethoxysilyl, methyldiethoxysilyl, dimethylethoxysilyl, ethyldiethoxysilyl, triisopropoxysilyl and methyldiisopropoxysilyl. From the standpoint of the toxicity of the alcohol formed as a result of the hydrolysis reaction, the alkoxy group bonded to the silicon atom is preferably ethoxysilyl or isopropxysilyl, ethoxysilyl being more preferable. From the standpoint of curing rate, the number of alkoxy groups bonded to a single silicon atom of the reactive silicon group is preferably not less than 2, and not less than 3 is more preferable. From the standpoints of toxicity of the alcohol formed as a result of the hydrolysis reaction and curing rate, triethoxysilyl is the most preferable.

Specific examples of component (G) include amino group-containing silanes such as γ-aminopropyltriethoxysilane, γ-aminopropyltriisopropoxysilane, γ-aminopropylmethyldiethoxysilane, γ-((β-aminoethyl)amino)propyltriethoxysilane, γ-((β-aminoethyl)amino)propyltriisopropoxysilane, γ-(β-aminoethyl)aminopropylmethyldiethoxysilane, γ-ureidopropyltriethoxysilane, γ-ureidopropyltriisopropoxysilane, γ-ureidopropylmethyldiethoxysilane, N-phenyl-γ-aminopropyltriethoxysilane, N-benzyl-γ-aminopropyltriethoxysilane, N-n-butyl-γ-aminopropyltriethoxysilane, N-vinylbenzyl-γ-aminopropyltriethoxysilane, N,N'-bis(γ-triethoxysilylpropyl) ethylenediamine, bis(triethoxysilylpropyl) amine, 3-[2-(2-aminoethyl)aminoethyl]aminopropyltriethoxysilane and the like. In addition, derivatives in which the above-described silane compound has been modified and condensates of the above-described silane compounds may also be used as component (G).

Component (G) is preferably used in a range from 0.1 to 10 parts and more preferably from 1 to 5 parts, per 100 parts of the organic polymer of component (A2). Component (G) can be used alone or used in combination with two types or more.

A dehydrating agent may also be added when the component (A2) and component (G)-containing composition is used as a one-part composition. Such a dehydrating agent is not particularly restricted, wherein various compounds may be employed. As the dehydrating agent, a silicon compound which has an alkoxysilyl group and does not contain an amino group is preferable, for the reasons that under aging at a comparatively low temperature, the change in properties before and after storage is small (because the ester exchange reaction between component (A2) and the reactive silicon group is slow), and that the dehydrating effects are high. A silicon compound which has a trialkoxysilyl group and does not contain an amino group is preferable because it has a higher dehydrating effect, and a silicon compound which has a trimethoxysilyl group and does not contain an amino group is particularly preferable. Specific examples include alkyltrialkoxysilanes such as vinyltrimethoxysilane, methyltrimethoxysilane and phenyltrimethoxysilane, which are preferable in view of their dehydrating effect, curability, availability and cured article tensile properties.

In the present invention, as the component (H), the aminosilane coupling agent represented by general formula (4):

$$—SiR^4_b(OCH_3)_c(OR^5)_{3-b-c} \quad (4)$$

wherein b $R^4$ each are independent by a monovalent organic group having 1 to 20 carbons, 3-a-c $R^5$ each are independent by a monovalent organic group having 2 to 20 carbons, b represents 0, 1 or 2 and c represents 1, 2 or 3 (3-b-c≧0), can be used. If a curable composition in which this component (H) has been added to an organic polymer having a group represented by general formula (2) (the (A2) component of the present invention):

$$—Si(OR^1)_3 \quad (2)$$

(wherein $R^1$ is the same as described above) is pre-aged, an ester exchange reaction proceeds between the methoxy group of component (H) and the reactive silicon group of component (A2), thus forming a highly reactive methoxysilyl group in the reactive silicon group of component (A2). As a result, the yielded curable composition has excellent recovery properties, durability and creep resistance, as well as being a quick-curing curable composition.

Although preferable aging conditions for the above-described curable composition comprising a component (H) and a component (A2) cannot be categorically defined, as they differ depending on the presence, and amount thereof, of an ester exchange reaction catalyst and the ester exchange reactivity between the component (H) and reactive silicon group of component (A2) etc., if the ester exchange reaction catalyst content in the system is about 0.5 to 3 parts of an organotin catalyst or a Ti-based catalyst, aging for more than one week under comparatively low-temperature conditions of 10 to 30° C. is preferable, while under high-temperature conditions of 30° C. and higher, aging for more than one day is preferable.

The above-described curable composition, which comprises a component (H) and a component (A2), can be used as a one-part or a multi-part composition, such as two-part, although a one-part composition has the particular advantage that the change in curing speed is dramatic, and is thus more preferable.

Component (H) is a compound which has a reactive silicon group represented by general formula (4) and an amino group. Specific examples of the reactive silicon group represented by general formula (4) include trimethoxysilyl, methyldimethoxysilyl, ethyldimethoxysilyl, ethoxydimethoxysilyl, dimethylmethoxysilyl, diethylmethoxysilyl, diethoxymethoxysilyl and the like. The number of alkoxy groups bound to a single silicon atom of the reactive silicon group is preferably 2 or more, and more preferably 3. A trimethoxysilyl group is therefore the most preferable.

Specific examples of component (H) include amino group-containing silanes such as γ-aminopropyltrimethoxysilane, γ-aminopropylmethyldimethoxysilane, γ-aminopropylethyldimethoxysilane, γ-aminopropylethoxydimethoxysilane, γ-((β-aminoethyl)amino)propyltrimethoxysilane, γ-((β-aminoethyl)amino)propylmethyldimethoxysilane, γ-((β-aminoethyl)amino)propylethyldimethoxysilane, γ-((β-aminoethyl)amino)propylethoxydimethoxysilane, γ-ureidopropyltrimethoxysilane, γ-ureidopropylmethyldimethoxysilane, N-phenyl-γ-aminopropyltrimethoxysilane, N-benzyl-γ-aminopropyltrimethoxysilane, N-n-butyl- γ-aminopropyltrimethoxysilane, N-vinylbenzyl-γ-aminopropyltrimethoxysilane, N,N'-bis(γ-trimethoxysilylpropyl)ethylenediamine, bis(trimethoxysilylpropyl) amine, 3-[2-(2-aminoethyl)aminoethyl]aminopropyltrimethoxysilane and the like. In addition, derivatives in which the above-described silane compound has been modified and condensates of the above-described silane compounds may also be used as component (H)

Component (H) used in the present invention is preferably used in a range from 0.1 to 10 parts and more preferably from 1 to 5 parts, per 100 parts of the organic polymer of component (A2). Component (H) can be used alone or used in combination with two types or more.

An epoxy resin can be used as the component (I) in the present invention. This epoxy resin not only improves the impact strength and toughness of the component (A2) organic polymer of the present invention, but also has a function of further increasing recovery properties, durability and creep resistance.

As the epoxy resin used as component (I) in the present invention, widely-used epoxy resins can be employed, examples thereof including epichlorohydrin-bisphenol A type epoxy resin, epichlorohydrin-bisphenol F type epoxy resin, flame retardant epoxy resins such as glycidyl ether of tetrabromobisphenol A; novolak type epoxy resin, hydrogenated bisphenol A type epoxy resin, glycidyl ether type epoxy resin of a bisphenol A propylene epoxide adduct, p-oxybenzoic acid glycidyl ether ester type epoxy resin, m-aminophenol epoxy resin, diaminodiphenylmethane epoxy resin, urethane-modified epoxy resin, various alicyclic epoxy resins, N,N-diglycidylaniline, N,N-diglycidyl-o-toluidine, triglycidyl isocyanurate, polyalkylene glycol diglycidyl ether, glycidyl ethers of polyvalent alcohol such as glycerin, hydantoin type epoxy resin, and epoxidated compounds of unsaturated polymers such as a petroleum resin. The epoxy resin is not limited to these examples. Among these epoxy resins, those having at least two epoxy groups in the molecule are preferable because the resulting composition exhibits high reactivity upon curing and the cured article easily forms a three-dimensional network. More preferable epoxy resins are bisphenol A type epoxy resin and novolak type epoxy resin. The usage ratio between the epoxy resin (I) and the reactive silicon group-containing organic polymer (A2) is within the range from 100/1 to 1/100 parts by weight of (A2) to the epoxy resin. If the (A2)/epoxy ratio is less than 1/100, the improvement in impact strength, toughness, properties, durability and creep resistance for the epoxy resin cured article cannot be achieved. If the (A2)/epoxy ratio is more than 100/1, the strength of the organic polymer cured article is insufficient. Although a preferable usage ratio cannot be categorically defined, as it differs depending on the intended use of the curable composition, if the impact strength, flexibility, toughness, peeling strength and the like of the epoxy resin cured article are to be improved, for example, using from about 1 to 100 parts by weight of component (A2) in relation to 100 parts by weight of the epoxy resin is preferable, and more preferable is from 5 to 100 parts by weight. In the case of improving the strength of the component (A2) cured article, using from about 1 to 200 parts by weight of the epoxy resin in relation to 100 parts by weight of component (A2) is preferable, more preferable is from 5 to 100 parts by weight, and particularly preferable is from 5 to 50 parts by weight.

It is obvious that in the composition of the present invention, a curing agent for curing the epoxy resin can be used in combination. The epoxy resin curing agent which can be used is not particularly restricted, and thus a conventionally used epoxy resin curing agent may be employed. Specific examples include primary and secondary amines, such as triethylenetetramine, tetraethylenepentamine, diethylaminopropylamine, N-aminoethylpiperazine, m-xylylenediamine, m-phenylenediamine, diaminodiphenylmethane, diaminodiphenylsulfone, isophoronediamine, and an amine-terminated polyether; tertiary amines and the salts thereof, such as 2,4,6-tris(dimethylaminomethyl)phenol and tripropylamine; polyamide resins; imidazoles; dicyandiamides; boron trifluoride complex compounds; carboxylic anhydrides such as phthalic anhydride, hexahydrophthalic anhydride, tetrahydrophthalic anhydride, dodecenylsuccinic anhydride, pyromellitic anhydride, and curorenic anhydride; alcohols; phenols; carboxylic acids; and diketone complex compounds of aluminum or zirconium. The epoxy resin curing agent is not limited to these examples. The curing agent can be alone or in combination of two types or more.

When using a curing agent for the epoxy resin, the content should be in the range from about 0.1 to 300 parts by weight in relation to 100 parts by weight of the epoxy resin.

A ketimine may be used as the curing agent for the epoxy resin. Ketimines stably exist in conditions free from moisture, and react with moisture and decompose to a primary amine, wherein the formed primary amine can serve as a room temperature-curable curing agent for the epoxy resin. If a ketimine is used, a one-part compound can be achieved. Such ketimines can be obtained from the condensation reaction of an amine compound with a carbonyl compound.

Known amine compounds and carbonyl compounds can be used for the ketimine synthesis. Examples of the amine compound that can be used include diamines such as ethylenediamine, propylenediamine, trimethylenediamine, tetramethylenediamine, 1,3-diaminobutane, 2,3-diaminobutane, pentamethylenediamine, 2,4-diaminopentane, hexamethylenediamine, p-phenylenediamine and p,p'-biphenylenediamine; polyvalent amines, such as 1,2,3-triaminopropane, triaminobenzene, tris(2-aminoethyl)amine and tetra(aminomethyl)methane; polyalkylenepolyamines, such as diethylenetriamine, triethylenetriamine and tetraethylenepentamine; polyoxyalkylene-based polyamines; and aminosilanes, such as γ-aminopropyltriethoxysilane, N-(β-aminoethyl)-γ-aminopropyltrimethoxysilane and N-(β-aminoethyl)-γ-aminopropylmethyldimethoxysilane. Examples of the carbonyl compound that can be used include aldehydes such as acetylaldehyde, propionaldehyde, n-butylaldehyde, isobutylaldehyde, diethylacetaldehyde, glyoxal and benzaldehyde; cyclic ketones, such as cyclopentanone, trimethylcyclopentanone, cyclohexanone and trimethylcyclohexanone; aliphatic ketones, such as acetone, methylethyl ketone, methylpropyl ketone, methylisopropyl ketone, methylisobutyl ketone, diethyl ketone, dipropyl ketone, diisopropyl ketone, dibutylketone and diisobutyl ketone; and β-dicarbonyl compounds, such as acetylacetone, methyl acetoacetate, ethyl acetoacetate, dimethyl malonate, diethyl malonate, methylethyl malonate and dibenzoylmethane.

When an imino group is present in the ketimine, the imino group may be reacted with styrene oxide; a glycidyl ether such as butyl glycidyl ether and allyl glycidyl ether; and glycidyl ester. These ketimines may be used alone or in combination of two kinds or more. The ketamines may be used from 1 to 100 parts by weight in relation to 100 parts by weight of the epoxy resin, although the content will depend on the epoxy resin and the type of ketimine.

In the present invention, an aminosilane coupling agent can be further added. While it is known that the addition of an aminosilane coupling agent generally improves the adhesion of the compound, such addition can also have the effect of lowering the recovery properties, durability and creep resistance of the obtained cured article. If an amino silane coupling agent is added to the composition of the present invention, adhesion can coexist with recovery properties, durability and creep resistance, and is thus preferable.

Specific examples of the aminosilane coupling agent include the same compounds as those described above as the specific examples for component (G) and component (H).

The content of the aminosilane coupling agent is preferably from about 0.1 to 10 parts by weight in relation to 100 parts by weight of component (A1), and more preferably from about 1 to 5 parts by weight. If the amount is lower than this range, the adhesion improvement effects may not be sufficient, while if the amount is higher than this range, extension of the cured article can be reduced, and the recovery properties and durability may deteriorate.

The curable composition according to the present invention can serve as a one-part curable composition through the further addition of a dehydrating agent. Since a dehydrating agent-containing one-part curable composition does not need to undergo a mixing operation, it is a more convenient material than a two-part composition. However, because a one-part curable composition cures from its surface due to moisture in the atmosphere, curing of the entire sealing material requires a long time, wherein deep crosslinking is insufficient and the recovery properties and durability may deteriorate. If a one-part composition is used by adding a dehydrating agent to the composition of the present invention, the convenience of a one-part composition can coexist with recovery properties, durability and creep resistance, and is thus preferable.

Specific examples of the dehydrating agent, while not particularly restricted, include alkyl orthoformates, such as methyl orthoformate and ethyl orthoformate, alkyl orthoacetates, such as methyl orthoacetate and ethyl orthoacetate, and hydrolyzable organic silicon compounds, such as vinyltrimethoxysilane and methyltrimethoxysilane. In view of cost and effects, vinyltrimethoxysilane and methyltrimethoxysilane are particularly preferable.

The content of the dehydrating agent is preferably from about 0.1 to 10 parts by weight in relation to 100 parts by weight of component (A1), and more preferably from about 1 to 5 parts by weight. If the amount is lower than this range, the dehydrating effects may not be sufficient, while if the amount is higher than this range, the extension of the cured article and deep-part curability may deteriorate.

Various fillers other than the component (F) balloons may be mixed into the curable composition of the present invention. Such fillers are not particularly restricted, but include reinforcing fillers such as fumed silica, precipitated silica, silicic anhydride, hydrous silicic acid, carbon black and the like; fillers such as calcium carbonate, magnesium carbonate, diatomaceous earth, calcined clay, clay, talc, titanium oxide, bentonite, organic bentonite, ferric oxide, zinc oxide, activated zinc white, hydrogenated castor oil and the like; and fibrous fillers such as asbestos, glass fibers or filaments and the like.

When high-strength curable compositions are desired using these fillers, preferable effects can be obtained by mainly employing a filler selected from among fumed silica, precipitated silica, silicic anhydride, hydrous silicic acid, carbon black, surface-treated fine calcium carbonate, calcined clay, clay and activated zinc white, etc. in the range from 1 to 100 parts by weight in relation to 100 parts by weight of the organic polymer (A). When low-strength high-elongation curable compositions are desired, preferable effects can be obtained by mainly using a filler selected from among titanium oxide, calcium carbonate, magnesium carbonate, talc, ferric oxide and zinc oxide etc. in the range from 5 to 200 parts by weight in relation to 100 parts by weight of the organic polymer (A). Needless to say, a single filler may be used alone or two or more fillers may be used in combination.

In the curable composition of the present invention, it is more effective to use a plasticizer in combination with a filler because it is possible to enhance elongation of the cured article and to mix a large amount of the filler.

Specific examples of a plasticizer include phthalic acid esters such as dioctyl phthalate, dibutyl phthalate and butylbenzyl phthalate; aliphatic dibasic acid esters such as dioctyl adipate, isodecyl succinate, and dibutyl sebacate; glycol esters such as diethylene glycol dibenzoate and pentaerythritol ester; aliphatic esters such as butyl oleate and methyl acetylricinoleate; phosphoric acid esters such as tricresyl phosphate, trioctyl phosphate, and octyldiphenyl phosphate; epoxy plasticizers such as epoxidated soybean oil, epoxidated linseed oil, and benzyl epoxystearate; polyester plasticizers such as polyesters of dibasic acid and a divalent alcohol; polyethers such as polypropylene glycol and its derivatives; polystyrenes such as poly-α-methylstyrene and polystyrene; and polybutadiene, butadiene-acrylonitrile copolymer, polychloroprene, polyisoprene, polybutene, chlorinated paraffins and the like.

In addition, high-molecular weight plasticizers can also be used. Compared with when using a low-molecular weight plasticizer that does not contain a polymer component in the molecule, the use of a high-molecular weight plasticizer enables the initial physical properties to be maintained over a long period of time, and improves the dryability (also referred to as "coatability") when an alkyd coating is applied to said curing article. Specific examples of such high-molecular weight plasticizer include, but are not limited to, vinyl polymers obtainable by polymerizing a vinyl monomer by various methods; polyalkylene glycol esters such as diethylene glycol dibenzoate, triethylene glycol dibenzoate and pentaerythritol esters; polyester plasticizers obtainable from a dibasic acid, such as sebacic acid, adipic acid, azelaic acid or phthalic acid, and a dihydric alcohol, such as ethylene glycol, diethylene glycol, triethylene glycol, propylene glycol or dipropylene glycol; polyethers such as polyether polyols, e.g. polyethylene glycol, polypropylene glycol and polytetramethylene glycol that have a molecular weight of 500 or more, and even further 1,000 or more, and derivatives of these as obtainable by converting the hydroxyl groups of these polyether polyols to an ester, ether or the like groups; polystyrenes such as polystyrene and poly-α-methylstyrene; polybutadiene, polybutene, polyisobutylene, butadiene-acrylonitrile, polychloroprene and the like.

Among these high-molecular-weight plasticizers, those compatible with component (A) are preferred. Polyethers and vinyl polymers are preferred. Among them, vinyl polymers are preferred in view of compatibility, weatherability and heat resistance. Among vinyl polymers, acrylic or methacrylic polymers are preferred, and acrylic polymers such as polyalkyl acrylate ester are more preferred. For the method of synthesizing such polymers, living radical polymerization is preferable, since this method makes it possible to narrow the molecular weight distribution of the polymer and reduce the viscosity. Further, atom transfer radical polymerization is more preferred. It is preferable to use a polymer obtained from continuous mass polymerization (so-called "SGO process") under high-temperature high-pressure of an alkyl acrylate ester monomer disclosed in Japanese Patent Publication No. 2001-207157.

The number average molecular weight of the high-molecular-weight plasticizer is preferably from 500 to 15,000, more preferably from 800 to 10,000, still more preferably from 1,000 to 8,000, particularly preferably from 1,000 to 5,000, and most preferably from 1,000 to 3,000. If the molecular weight is too low, the plasticizer will leak out over time due to heat and precipitation, whereby the initial physical properties cannot be maintained for a long period of time and nor can the alkyd coatability be improved. If the molecular weight is too high, viscosity becomes high and workability deteriorates. Although the molecular weight distribution of the high-molecular weight plasticizer is not particularly restricted, a narrow distribution is preferable, less than 1.80 being preferable, 1.70 or less more preferable, 1.60 or less still more preferable, 1.50 or less especially preferable, and 1.30 or less the most preferable.

The number average molecular weight of the high-molecular-weight plasticizer and the molecular weight distribution (Mw/Mn) were measured using a GPC method (polystryrene conversion).

While the high-molecular-weight plasticizer may be without a reactive silicon group, it may contain a reactive silicon group. When the high-molecular-weight plasticizer does contain a reactive silicon group, it can act as a reactive plasticizer, thereby preventing the movement of a plasticizer from the cured article. When the high-molecular-weight plasticizer contains a reactive silicon group, an average of not more than 1 group per molecule is preferable, and not more than 0.8 is more preferable. When a reactive silicon group-containing high-molecular-weight plasticizer, especially a reactive silicon group-containing oxyalkylene polymer, is used, its number average molecular weight must be lower than that of the component (A) polymer.

The plasticizer may be used alone or in combination of 2 types or more. A combination of a low-molecular-weight plasticizer and a high-molecular-weight plasticizer can also be used. These plasticizers can be mixed in when the polymer is produced.

The amount of a plasticizer is preferably from 5 to 150 parts by weight, more preferably from 10 to 120 parts by weight, and still more preferably from 20 to 100 parts by weight in relation to 100 parts by weight of component (A). When the amount of a plasticizer is less than 5 parts by weight, the effects as a plasticizer may not be expressed, while more than 150 parts by weight and the mechanical strength of the cured article are insufficient.

In the curable composition according to the present invention, the silicon compound represented by the general formula $R^{20}{}_h\text{Si}(OR^{21})_{4-h}$ (wherein $R^{20}$ and $R^{21}$ are each independent by substituted or unsubstituted hydrocarbons having 1 to 20 carbons; and h represents 0, 1, 2 or 3) may be added to increase the activity of the condensation catalyst. While this silicon compound is not restricted, a general formula in which R is an aryl group having 6 to 20 carbons, such as phenyltrimethoxysilane, phenylmethyldimethoxysilane, phenyldimethylmethoxysilane, diphenyldimethoxysilane, diphenyldiethoxysilane and triphenylmethoxysilane, is preferred since its accelerating effect on the curing reaction of the composition is significant. In particular, diphenyldimethoxysilane and diphenyldiethoxysilane are inexpensive and easily available, and hence are most preferred. The amount of this silicon compound is preferably about 0.01 to 20 parts, more preferably 0.1 to 10 parts, relative in relation to 100 parts of component (A). When the amount of addition is below this range, the curing reaction-accelerating effect may decrease in some cases. When, conversely, the amount of addition of the silicon compound exceeds this range, the hardness and/or tensile strength of the curing products may fall.

A physical property modifier may be added to the curable composition of the present invention according to need for adjusting the tensile properties of the resulting cured article. The physical property modifier is not particularly restricted but includes, for example, alkylalkoxysilanes such as methyltrimethoxysilane, dimethyldimethoxysilane, trimethylmethoxysilane and n-propyltrimethoxysilane; functional group-containing alkoxysilanes, for example alkylisoproenoxysilanes such as dimethyldiisopropenoxysilane, methyltriisopropenoxysilane and γ-glycidoxypropylmethyldiisopropenoxysilane, γ-glycidoxypropylmethyldimethoxysilane, γ-glycidoxypropyltrimethoxysilane, vinyltrimethoxysilane, vinyldimethylmethoxysilane, γ-aminopropyltrimethoxysilane, N-(β-aminoethyl)aminopropylmethyldimethoxysilane, γ-mercaptopropyltrimethoxysilane and γ-mercaptopropylmethyldimethoxysilane; silicone varnishes; and polysiloxanes. Using the above-described physical property modifier enables the hardness to be increased or decreased and/or elongation properties to be attained upon curing of the composition of the invention. The above-described physical property modifies may be used alone or two or more types may be used in combination.

Especially, a compound which forms a monovalent silanol group-containing compound within the molecule from hydrolysis acts to reduce the modulus of the cured article without a deterioration in the cured article surface stickiness. In particular, a compound which forms trimethylsilanol is preferable. Examples of compounds which forms a monovalent silanol group-containing compound within the molecule from hydrolysis include those disclosed in Japanese Patent Publication No. 5-117521. Further examples include alkyl alcohol derivatives, such as hexanol, octanol and decanol, which form a silicon compound represented by the general formula $R^{22}{}_3\text{SiOH}$ (wherein $R^{22}$ are each independent by substituted or unsubstituted hydrocarbons having 1 to 20 carbons), such as trimethylsilanol from hydrolysis; and polyvalent alcohol derivatives having at least 3 hydroxyl groups, such as trimethylolpropane, glycerin, pentaerythritol or sorbitol disclosed in Japanese Patent Publication No. 11-241029, which form a silicon compound represented by the general formula $R^{22}{}_3\text{SiOH}$ (wherein $R^{22}$ are the same as described above) such as trimethylsilanol from hydrolysis.

Additional examples include oxypropylene polymer derivatives such as those disclosed in Japanese Patent Publication No. 7-258534, which form a silicon compound represented by the general formula $R^{22}{}_3\text{SiOH}$ (wherein $R^{22}$ are the same as described above), such as trimethylsilanol from hydrolysis. Still further, silicon group-containing polymers that are capable of turning into a monosilanol-containing compound from hydrolysis of the crosslinkable hydrolyzable silicon-containing groups disclosed in Japanese Patent Publication No. 6-279693 can be used.

The physical property modifier can be used in the range from 0.1 to 20 parts by weight, and preferably from 0.5 to 10 parts by weight, relative in relation to 100 parts by weight of component (A).

A thixotropy imparting agent (antisagging agent) may be added to the curable composition of the present invention according to need for sagging prevention and workability improvement. The antisagging agent is not particularly restricted but includes, for example, polyamide waxes; hydrogenated castor oil derivatives; and metal soaps such as calcium stearate, aluminum stearate and barium stearate. These thixotropy imparting agents (antisagging agents) may be used singly or two or more of them may be used in combination. The thixotropy imparting agent can be used in the range from 0.1 to 20 parts by weight relative in relation to 100 parts by weight of component (A).

In the composition of the present invention, a compound which contains an epoxy group in a molecule can be used. If an epoxy group-containing compound is used, the recovery properties of the cured article can be increased. Examples of epoxy group-containing compounds include epoxidized unsaturated fats, epoxidized unsaturated fatty acid esters, alicyclic epoxidized compounds and compounds shown in epichlorohydrin derivatives and mixtures thereof. Specific examples include epoxidized soybean oil and epoxidized linseed oil, di-(2-ethylhexyl)4,5-epoxycyclohexane-1,2-dicarboxylate (E-PS), epoxy octyl stearate and epoxy butyl stearate. Among these E-PS is particularly preferable. The epoxy compound can be used in the range from 0.5 to 50 parts by weight relative in relation to 100 parts by weight of component (A).

In the composition of the present invention, an oxidation-curable substance can be used. The air oxidation-curable substance includes unsaturated compounds capable of reacting with oxygen in the air, which react in the air to form a cured skin close to the surface of the cured article for preventing surface stickiness and dirt and dust from adhering to the cured article surface. Specific examples of the air oxidation-curable substance include, for example, dry oils such as tung oil and linseed oil; various alkyd resins obtainable by modification of such dry oils; acrylic polymers, epoxy resins and silicone resins each modified by a drying oil; liquid polymers, such as 1,2-polybutyldiene, 1,4-polybutyldiene and the polymers of C5 to C8 dienes, obtainable by polymerizing or copolymerizing diene compounds such as butadiene, chloroprene, isoprene and 1,3-pentadiene, NBR, SBR and like polymers obtainable by copolymerizing such diene compounds with a monomer copolymerizable with the diene compounds, for example acrylonitrile or styrene, in a manner such that the diene compounds account for the majority and, further, various modifications (maleic modifications, boiled oil modifications, etc.) thereof. These may be used singly or two or more of them may be used in combination. Among these compounds, tung oil and liquid diene polymers are particularly preferred. In some cases, the use of the air oxidation-curable substance together with a catalyst or metal drier capable of promoting the oxidation/curing reactions may bring about enhanced effects. As such catalyst or metal drier, there may be mentioned, for example, cobalt naphthenate, lead naphthenate, zirconium naphthenate, cobalt octylate, zirconium octylate and like metal salts as well as amine compounds. The air oxidation-curable substance is added preferably in an amount of 0.1 to 20 parts by weight, more preferably 0.5 to 10 parts by weight, relative in relation to 100 parts by weight of component (A). If the amount is less than 0.1 parts by weight, the improvement in staining are insufficient and, if it is in excess of 20 parts by weight, there is a tendency for the tensile properties of the cured article to be adversely affected. As disclosed in Japanese Patent Publication No. 3-160053, the oxidation-curable substance is preferably used in combination with a photocurable substance.

In the composition of the present invention, a photocurable substance can be used. If a photocurable substance is used, a photocurable substance skin forms on the surface of the cured article, which can improve the stickiness and the weatherability of the cured article. The photocurable substance is a substance which, under the action of light, undergoes chemical changes in molecular structure in a short period of time, leading to curing and other changes in physical properties. A number of compounds of this kind are known, including organic monomers, oligomers, resins, and compositions containing them. A commercially-available compound can be employed, representative examples including an unsaturated acrylic compound, a polyvinyl cinnamate or an azide resin. Examples of the unsaturated acrylic compound include a monomer or oligomer containing one or more acrylic or methacrylic unsaturated groups, or a mixture thereof, for example monomers such as propylene (or butylene or ethylene) glycol di(meth)acrylate, neopentyl glycol di(meth)acrylate, or oligo esters having a molecular weight of 10,000 or less. Specific examples include the particular acrylates (bifunctional) Aronix M-210, Aronix M-215, Aronix M-220, Aronix M-233, Aronix M-240 and Aronix M-245; (trifunctional) Aronix M-305, Aronix M-309, Aronix M-310, Aronix M-315, Aronix M-320 and Aronix M-325; (polyfunctional) Aronix M-400 and the like. Compounds which contain an acryl group are preferable, which compounds contain an average of 3 or more of the same functional group per molecule being preferable. (The above-described Aronix products are all manufactured by Toa Gosei Chemical Industries.)

The polyvinyl cinnamate is a photosensitive resin whose cinnamoyl groups serve as photosensitive groups. It includes cinnamic acid-esterified polyvinyl alcohol and, further, various polyvinyl cinnamate derivatives. The azide resin is known as a photosensitive resin whose azide groups serve as photosensitive groups. It includes photosensitive rubber solutions generally containing an azide compound as a photosensitive agent and, further, various examples are described in detail in the monograph "Kankosei Jushi (Photosensitive Resins)" (published Mar. 17, 1972 by Insatsu Gakkai Shuppanbu, page 93 ff, page 106 ff and page 117 ff). These can be used singly or in admixture, and if necessary supplemented with a sensitizer. In some cases, the addition of a sensitizer, such as a ketone or nitro compound, and/or a promoter, such as an amine, may result in enhanced effects. The photocurable substance is used in an amount of 0.1 to 20 parts by weight, and preferably 0.5 to 10 parts by weight, per 100 parts by weight of component (A). If the amount is less than 0.1 parts by weight, there is no increase in weatherability and, when it exceeds 20 parts by weight, the cured article becomes too hard, which is not preferable since cracks may form.

An antioxidant (anti-aging agent) can be used in the composition of the present invention. If an antioxidant is used, the heat resistance of the cured article can be increased. Examples of the antioxidant include hindered phenols, monophenols, bisphenols and polyphenols, although hindered phenols are preferable. Examples which can be used as the hindered-amine photostabilizer include TINUVIN 622LD, TINUVIN 144, CHIMASSORB 944LD, CHIMASSORB 119FL (all being products of Ciba Specialty Chemicals); Adeka Stab LA-57, Adeka Stab LA-62, Adeka Stab LA-67, Adeka Stab LA-63 and Adeka Stab LA-68 (all being products of Asahi Denka Co., Ltd.); Sanol LS-770, Sanol LS-765, Sanol LS-292, Sanol LS-2626, Sanol LS-1114 and Sanol LS-744 (all being products of Sankyo Co.), and the like. Specific examples of the antioxidant agent are also disclosed in Japanese Patent Publication Nos. 4-283259 and 9-194731. The amount of antioxidant is preferably in the range from 0.1 to 10 parts by weight, and more preferably 0.2 to 5 parts by weight, per 100 parts by weight of component (A).

A photostabilizer can be used in the composition of the present invention. If a photostabilizer is used, photo-oxidation of the cured article can be prevented. Examples of the photostabilizer include benzotriazoles, hindered amines and benzoate compounds, although hindered amines are preferable. The amount of photostabilizer is preferably in the range from 0.1 to 10 parts by weight, and more preferably 0.2 to 5 parts by weight, per 100 parts by weight of component (A).

Specific examples of the photostabilizer are also disclosed in Japanese Patent Publication No. 9-194731.

In the composition of the present invention, particularly when an unsaturated acrylic compound is used as the photocurable substance, for reasons of storage stability improvement of the compound it is preferable to use a hindered-amine-containing photostabilizer which contains a tertiary amine as the hindered amine photostabilizer, as disclosed in Japanese Patent Publication No. 5-70531. Examples of a tertiary amine-containing hindered amine photostabilizer include TINUVIN 622LD, TINUVIN 144, CHIMASSORB 119FL (all being products of Ciba Specialty Chemicals); Adeka Stab LA-57, Adeka Stab LA-62, Adeka Stab LA-67 and Adeka Stab LA-63 (all being products of Asahi Denka Co., Ltd.); Sanol LS-765, Sanol LS-292, Sanol LS-2626, Sanol LS-1114 and Sanol LS-744 (all being products of Sankyo Co.) and the like.

An ultraviolet absorber can be used in the composition of the present invention. If an ultraviolet absorber is used, the surface weatherability of the cured article can be increased. Examples of the ultraviolet absorber include benzophenones, benzotriazoles, salicylates, substituted trioles and metal chelate compounds, although benzotriazoles are preferable. The amount of ultraviolet absorber is preferably in the range from 0.1 to 10 parts by weight, and more preferably 0.2 to 5 parts by weight, per 100 parts by weight of component (A). The benzotriazole ultraviolet absorber is preferably used in combination with a phenol or hindered phenol antioxidant and a hindered amine photostabilizer.

The method of preparing the curable composition of the present invention is not particularly restricted and, for example, there can be used a method of mixing the above-described components, kneading the mixture at normal temperature or elevated temperature using a mixer, roll, kneader or the like, or a method of dissolving the components in a small amount of a proper solvent and mixing. By appropriately using these components in combination, one-part and multi-part, such as two-part, compositions can be prepared and used.

When the curable composition of the present invention is exposed to atmospheric air, it forms a three-dimensional network by the action of moisture in the atmospheric air and thus rapidly cures into a solid having rubber elasticity.

To the curable composition of the present invention, various additives can be added, if necessary. Examples of such additives include adhesion imparting agents other than aminosilanes, storage stabilizers, metal deactivators, antiozonants, amine type radical chain inhibitors, phosphorus peroxide decomposing agents, lubricants, pigments and blowing agents.

The curable composition of the invention can be used in tackifiers, sealants for buildings, ships, motor vehicles, roads, and so on, adhesives, mold extrusion agents, vibration absorbers, dampening materials, sound insulating materials, foaming materials, paint and gunning materials. The curable composition of the invention can be further used in a variety of applications, for example electric and electronic part materials such as solar cell reverse side sealing materials; electric insulating materials such as insulating covering materials for electric wires and cables, elastic adhesives, powder coatings, casting materials, rubber materials for medical use, adhesives for medical use, device sealants for medical use, food packaging materials and exterior seam sealing materials such as siding boards; coating materials, primers, electromagnetic shielding conductive materials, thermally conductive materials, hot melt materials, potting agents for electric and electronic use, films, gaskets, various molding materials, and rustproof/waterproof sealants for terminal faces (cut sections) of wire glass or double glazing, and liquid sealants used in automotive parts, electric machinery parts and various other machinery parts. Furthermore, either used alone or with the aid of a primer, the composition is capable of adhering intimately to a large variety of adherends inclusive of shaped articles of glass, porcelain, ceramics, wood, metal or resin, and thus the composition can be applied to a sealing composition or an adhesive composition in many different fields. Since the curable composition of the present invention has excellent creep resistance, it can be preferably used as a panel adhesive such as an interior panel adhesive, an exterior panel adhesive, a tile hanging adhesive, a stone hanging adhesive, an automotive panel adhesive and the like. Among these, using the present composition as an automotive panel adhesive is especially preferable, because of the high creep resistance demanded. Moreover, since the curable composition of the present invention is excellent in recovery properties and durability, it can be preferably used as a sealing material for the working joints of a building (coping, periphery of window glass, periphery of window frame/window sash, curtain walls and various exterior panels). The larger the displacement of a seam, the larger the elongation of a sealing material can be. Therefore, the curable composition of this invention achieves remarkable effect when the displacement of a seam is large. Therefore, the present composition is preferably used in a seam wherein the ratio of the displacement width to the average width is 10% or greater, more preferably used in a seam of 15% or greater, and especially preferably used in a seam of 20% or greater.

EXAMPLES

The present invention will now be further described using Examples and Comparative Examples. However, these Examples and Comparative Examples are by no means meant to limit the scope of the present invention.

Synthesis Example 1

Using polyoxypropylenetriol having a molecular weight of about 3,000 as an initiator, propyleneoxide was polymerized in the presence of a zinc hexacyanocobaltate glyme complex catalyst to obtain polypropylene oxide having a number average molecular weight of about 26,000 (molecular weight relative to polystyrene standards as measured by using a HLC-8120GPC manufactured by Tosoh Corporation as the liquid delivery system, using a TSK-GEL H-type column manufactured by Tosoh Corporation as the column, and using THF as the solvent). Subsequently, a methanol solution of NaOMe was added in the amount of 1.2 equivalent mol per equivalent mol of the hydroxyl group of the hydroxyl-terminated polypropyl eneoxide. The methanol was distilled off and allyl chloride was further added to convert the terminal hydroxyl group into an allyl group. Unreacted allyl chloride was removed by reduced-pressure evaporation. In relation to 100 parts by weight of the obtained crude allyl-terminated polypropylene oxide, 300 parts by weight of n-hexane and 300 parts by weight of water were mixed while stirring. The water was then removed by centrifugal separation. Once again, 300 parts by weight of water were added with stirring, and removed by centrifugal separation. Hexane was then removed by reduced-pressure evaporation, to thereby obtain an allyl-terminated trifunctional polypropylene oxide having a number average molecular weight of about 26,000.

Using an isopropanol solution of platinum divinyldisiloxane complex of 3 wt. % in terms of platinum as a catalyst, in 150 ppm 1.4 parts by weight of methyldimethoxysilane were reacted with 100 parts by weight of the obtained allyl-terminated trifunctional polypropylene oxide at 90° C. for 5 hours, to thereby obtain a methyldimethoxysilyl-terminated polyoxypropylene polymer (A-1). The terminal methyldimethoxysilyl groups were present in an average of 2.3 groups per molecule as measured by $^1$H-NMR (measured in a CDCl$_3$ solvent using JNM-LA400 manufactured by JEOL).

Examples 1 to 4 and Comparative Examples 1 and 2

Added together in accordance with the mixing formulation shown in Table 1 were 100 parts by weight of the reactive silicon group-containing organic polymer (A-1) obtained in Synthesis Example 1, 120 parts by weight of surface-treated precipitated calcium carbonate (manufactured by Shiraishi Kogyo Co., Ltd. under the trade name of HAKUENKA CCR), 20 parts by weight of titanium oxide (manufactured by Ishihara Sangyo Kaisha, Ltd., under the trade name of Tipaque R-820), 55 parts by weight of a plasticizer diisodecyl phthalate (manufactured by New Japan Chemical Co., Ltd., under the trade name SANSOCIZER DIDP), 2 parts by weight of a thixotropy imparting agent (manufactured by Kusumoto Chemicals, Ltd., under the trade name Disparlon 6500), 1 part by weight of a photostabilizer (manufactured by Sankyo Co., Ltd. under the trade name of Sanol LS-770), 1 part by weight of an ultraviolet absorber (manufactured by Ciba Specialty Chemicals, under the trade name of TINUVIN 327), 1 part by weight of an antioxidant (manufactured by Ouchi Shinko Chemical Industrial Co., Ltd., under the trade name Nocrac SP), 2 parts by weight of the dehydrating agent vinyltrimethoxysilane (manufactured by Nippon Unicar Co., Ltd. under the trade name of A-171), 3 parts by weight of an adhesion-imparting agent N-(β-aminoethyl)-γ-aminopropyl-trimethoxysilane (manufactured by Nippon Unicar Co., Ltd. under the trade name of A-1120), 2 parts by weight of the silicates shown in Table 1 (trade names Ethyl Silicate 28; Ethyl Silicate 40; and Methyl Silicate 51, all manufactured by Colcoat Co., Ltd.) and the curing catalyst as shown in Table 1, in the amount shown in Table 1 (dibutyltin bisacetylacetonate (manufactured by Nitto Kasei Co., Ltd. under the trade name of U-220); tin neodecanoate (divalent) (manufactured by Nitto Kasei Co., Ltd. under the trade name of U-50); neodecanoic acid (manufactured by Japan Epoxy Resins Co., Ltd., under the trade name of Versatic 10); and laurylamine (manufactured by Wako Pure Chemical Industries, Ltd.) The resultant mixture was kneaded under dehydrating conditions in a state in which the mixture was essentially free from water, then sealed into a moisture-proof container to obtain a one-part curable composition.

(Tensile Properties of the Cured Article)

Each of the compositions of Table 1 was aged at 23° C. for 3 days and at 50° C. for 4 days to prepare a sheet which was 3 mm in thickness. This sheet was stamped out by No. 3 dumbbell-shaped dies, and the dumbbell specimen was subjected to a tensile test at a tensile rate of 200 mm per minute for measuring the M50: 50% tensile modulus (MPa) Tb: tensile strength at break (MPa) and Eb: the elongation at break (%). Results are shown in Table 1.

(Recovery Ratio)

Each of the compositions of Table 1 was aged at 23° C. for 3 days and at 50° C. for 4 days to prepare sheets which were about 3 mm in thickness. These sheets were stamped out by No. 3 dumbbell-shaped dies, and the dumbbell specimens were fixed for 24 hours at 60° C. in a state in which 20 mm token line intervals were stretched to 40 mm (100% elongation). These dumbbell specimens were released at 23° C., whereby the recovery ratio was determined from the ratio that the token line had recovered after 1 hour. A greater recovery ratio indicated superior recovery properties. Results are shown Table 1.

(Creep Measurement Employing a Dumbbell Specimen)

Each of the compositions of Table 1 was aged at 23° C. for 3 days at 50° C. for 4 days to prepare sheets which were about 3 mm in thickness. These sheets were stamped out by No. 3 dumbbell-shaped dies, and the dumbbell specimens were marked with a token line at 20 mm intervals. One terminal of this dumbbell specimen was fixed in an oven at 60° C., whereby the dumbbell specimen was made to hang down. A load of 0.4 times the M50 value obtained from the above-described tensile properties measurement for the subject cured article was placed onto the lower terminal of the hanging-down dumbbell specimen. The displacement difference of the token line interval distances between immediately after the load was placed and 200 hours after the load was placed was measured. A smaller displacement difference indicated superior recovery properties. Results are shown in Table 1.

TABLE 1

| Composition (parts by weight) | | Example 1 | Example 2 | Example 3 | Example 4 | Comparative Example 1 | Comparative Example 2 |
|---|---|---|---|---|---|---|---|
| Organic Polymer (A) | Component A-1 | 100 | 100 | 100 | 100 | 100 | 100 |
| Filler | HAKUENKA CCR | 120 | 120 | 120 | 120 | 120 | 120 |
|  | Tipaque R-820 | 20 | 20 | 20 | 20 | 20 | 20 |
| Plasticizer | SANSOCIZER DIDP | 55 | 55 | 55 | 55 | 55 | 55 |
| Thixotropy Imparting Agent | Disparlon #6500 | 2 | 2 | 2 | 2 | 2 | 2 |
| Photostabilizer | Sanol LS-770 | 1 | 1 | 1 | 1 | 1 | 1 |
| Ultraviolet Absorber | TINUVIN 327 | 1 | 1 | 1 | 1 | 1 | 1 |
| Antioxidant | Nocrac SP | 1 | 1 | 1 | 1 | 1 | 1 |
| Dehydrating Agent | A-171 | 2 | 2 | 2 | 2 | 2 | 2 |
| Adhesion-imparting agent | A-1120 | 3 | 3 | 3 | 3 | 3 | 3 |
| Silicate Component (B) | Ethyl Silicate 28 | 2 | 2 |  |  |  |  |
|  | Ethyl Silicate 40 |  |  |  |  |  | 2 |

TABLE 1-continued

| Composition (parts by weight) | | | Example 1 | Example 2 | Example 3 | Example 4 | Comparative Example 1 | Comparative Example 2 |
|---|---|---|---|---|---|---|---|---|
| | | Methyl Silicate 51 | | | | 2 | | |
| Curing Catalyst | Organotin | Neostann U-220 | 2 | | | | 2 | |
| | Tin carboxylate | Neostann U-50 | | 3.4 | 3.4 | 3.4 | | 3.4 |
| | Carboxylic Acid | Versatic 10 | | 1.2 | 1.2 | 1.2 | | 1.2 |
| | Amine | Laurylamine | | 0.75 | 0.75 | 0.75 | | 0.75 |
| Recovery Ratio | | (%) | 54 | 84 | 88 | 86 | 26 | 80 |
| Creep | | (mm) | 15.1 | 1.6 | 1.2 | 1.4 | 30.2 | 2.2 |
| Cured Article Properties | M50 | (MPa) | 0.53 | 0.46 | 0.48 | 0.50 | 0.42 | 0.43 |
| | Tb | (MPa) | 2.00 | 2.27 | 2.61 | 2.35 | 1.96 | 2.23 |
| | Eb | (%) | 297 | 400 | 442 | 389 | 385 | 480 |

As illustrated in Comparative Example 1 of Table 1, when organotin (U-220) was used as the curing catalyst, without the addition of silicate, the recovery properties were especially low and creep resistance was poor. However, as illustrated in Example 1, the addition of silicate dramatically improved recovery properties and creep resistance. As illustrated by Comparative Example 2, when tin carboxylate (Neostann U-50) or the like was used as the curing catalyst rather than organotin (U-220), good recovery properties and creep resistance were exhibited even without the addition of silicate, although as illustrated in Examples 2 to 4, even more superior recovery properties and creep resistance were exhibited with silicate addition. The Ethyl Silicate 40 and Methyl Silicate 51 used in Examples 3 and 4 are condensates of respectively tetraethoxysilane and tetramethoxysilane, and exhibited especially excellent effects.

Synthesis Example 2

Using polyoxypropylene glycol having a molecular weight of about 2,000 as an initiator, propylene oxide was polymerized in the presence of a zinc hexacyanocobaltate glyme complex catalyst to obtain a hydroxyl-terminated polypropylene oxide having a number average molecular weight of about 14,500. This hydroxyl-terminated polypropylene oxide was employed to obtain an allyl-terminated polypropylene oxide using the same steps as those used in Synthesis Example 1. This allyl-terminated polypropylene oxide was, in the same manner as in Synthesis Example 1, reacted with trimethoxysilane to obtain a polyoxypropylene polymer (A-2) having on its terminals an average of 1.5 trimethoxysilyl.

Synthesis Example 3

Using the same steps as those in Synthesis Example 1, the allyl-terminated polypropylene oxide obtained in Synthesis Example 2 was reacted with triethoxysilane to obtain a polyoxypropylene polymer (A-3) having on its terminals an average of 1.5 triethoxysilyl groups.

Synthesis Example 4

Using the same steps as those of Synthesis Example 1, the allyl-terminated polypropylene oxide obtained in Synthesis Example 2 was reacted with methyldimethoxysilane to obtain a polyoxypropylene polymer (A-4) having on its terminals an average of 1.5 methyldimethoxysilyl groups.

Examples 5 to 11 and Comparative Examples 3 to 5

Added together in accordance with the mixing formulation shown in Table 2 were 100 parts by weight of the reactive silicon group-containing organic polymer (A-2 to A-4) obtained in Synthesis Examples 2 to 4, 120 parts by weight of surface-treated precipitated calcium carbonate (manufactured by Shiraishi Kogyo Co., Ltd. under the trade name of HAKUENKA CCR), 20 parts by weight of titanium oxide (manufactured by Ishihara Sangyo Kaisha, Ltd., under the trade name of Tipaque R-820), 12 parts by weight of a plasticizer diisodecyl phthalate (manufactured by New Japan Chemical Co., Ltd., under the trade name SANSOCIZER DIDP), 2 parts by weight of a thixotropy imparting agent (manufactured by Kusumoto Chemicals, Ltd., under the trade name Disparlon 6500), 1 part by weight of a photostabilizer (manufactured by Sankyo Co., Ltd. under the trade name of Sanol LS-770), 1 part by weight of an ultraviolet absorber (manufactured by Ciba Specialty Chemicals, under the trade name of TINUVIN 327), 1 part by weight of an antioxidant (manufactured by Ouchi Shinko Chemical Industrial Co., Ltd., under the trade name Nocrac SP), 2 parts by weight of the dehydrating agent vinyltrimethoxysilane (manufactured by Nippon Unicar Co., Ltd. under the trade name of A-171), 3 parts by weight of an adhesion-imparting agent N-(β-aminoethyl)-γ-aminopropyltrimethoxysilane (manufactured by Nippon Unicar Co., Ltd. under the trade name of A-1120), the amount shown in Table 2 of a silicate (manufactured by Colcoat Co., Ltd., under the trade name Methyl Silicate 51), the amount shown in Table 2 of the curing catalyst of component (D) (dibutyltin bisacetylacetonate, manufactured by Nitto Kasei Co., Ltd. under the trade name of U-220); dibutyltin dilaurate, manufactured by Sankyo Co., Ltd. under the trade name of STANN BL), or the curing catalyst of component (C) (tin neodecanoate (divalent), manufactured by Nitto Kasei Co., Ltd. under the trade name of U-50) and an amine (laurylamine, manufactured by Wako Pure Chemical Industries, Ltd.). The resultant mixture was kneaded under dehydrating conditions in a state in which the mixture was essentially free from water, then sealed into a moisture-proof container to obtain a one-part curable composition.

Each of the compositions of Table 2 was subjected to a tensile test in the same manner as that described above for measuring the M50: 50% tensile modulus (MPa), Tb: tensile strength at break (MPa) and Eb: the elongation at break (%). Results are shown in Table 2.

Each of the compositions shown in Table 2 was measured for recovery ratio in the same manner as that described above.

However, in the present test, the 100% elongation state was fixed at 23° C. for 24 hours, released at 23° C., whereby the recovery ratio was determined from the ratio that the token line had recovered after 1 hour. Results are shown in Table 2.

(Creep Test Employing a Shear Sample)

Using each of the compositions of Table 2, shear samples were prepared having an area of 20 mm×25 mm and a thickness of 1 mm. These samples were aged at 23° C. for 3 days and 50° C. for 4 days, and were then put into a 60° C. oven. A 0.1 MPa load was placed on each sample, whereby the displacement difference between immediately after the load was placed and 140 hours after the load was placed was measured. A displacement difference of less than 0.4 mm was evaluated as "G" and a displacement difference of 0.4 mm or more was evaluated as "P". Results are shown in Table 2.

A comparison of Examples 5 to 9 with Comparative Examples 3 to 5 from Table 2 shows that the use of an organic polymer (A-2 or A-3) in which the terminal reactive silicon group is a trialkoxysilyl group dramatically improves recovery properties and creep resistance. Moreover, Example 10, in which a silicate was added, and Example 11, in which tin carboxylate (Neostann U-50) was used as the curing catalyst, exhibited an even more superior recovery ratio.

Synthesis Example 5

Using the same steps as those of Synthesis Example 1, the allyl-terminated polypropylene oxide obtained in Synthesis Example 1 was reacted with methyl dimethoxy silane to obtain a polyoxypropylene polymer (A-5) having on its terminals an average of 2 methyldimethoxysilyl groups.

Synthesis Example 6

Using polyoxypropylene triol having a molecular weight of about 3,000 as an initiator, propylene oxide was polymerized in the presence of a zinc hexacyanocobaltate glyme complex catalyst to obtain a hydroxyl-terminated polypropylene oxide having a number average molecular weight of about 26,000. This hydroxyl-terminated polypropylene oxide was employed to obtain a metallyl-terminated polypropylene oxide using the same steps as those used in Synthesis Example 1, except that metallyl chloride was used in place of allyl chloride. Using 0.5 parts by weight of isopropanol solution of platinum vinyldisiloxane complex of 3 wt. % in terms of platinum as a catalyst, sulfur was mixed in relation to 100 parts by weight of the metallyl-terminated polypropylene oxide, in a sulfur 1 eq/Pt 1 eq ratio, under a nitrogen atmosphere containing 6 vol % oxygen. The resultant mixture was reacted with 3.2 parts by weight of methyl dimethoxysilane at 90° C. for 5 hours, to thereby obtain a polyoxypropylene polymer (A-6) having an average of 2.8 methyldimethoxysilyl groups on its terminals.

TABLE 2

| Composition (parts by weight) | | | Structure of reactive silicon group | Example | | | | | | | Comparative Example | | |
|---|---|---|---|---|---|---|---|---|---|---|---|---|---|
| | | | | 5 | 6 | 7 | 8 | 9 | 10 | 11 | 3 | 4 | 5 |
| Organic polymer | Component (A1) | A-2 | Trimethoxysilyl group | 100 | 100 | | | | | | | | |
| | | A-3 | Triethoxysilyl group | | | 100 | 100 | 100 | 100 | 100 | | | |
| | | A-4 | Methyldimethoxysilyl group | | | | | | | | 100 | 100 | 100 |
| Filler | | | HAKUENKA CCR | 120 | 120 | 120 | 120 | 120 | 120 | 120 | 120 | 120 | 120 |
| | | | Tipaque R-820 | 20 | 20 | 20 | 20 | 20 | 20 | 20 | 20 | 20 | 20 |
| Plasticizer | | | SANSOCIZER-DIDP | 12 | 12 | 12 | 12 | 12 | 12 | 12 | 12 | 12 | 12 |
| Thixotropy imparting agent | | | Disparlon #6500 | 2 | 2 | 2 | 2 | 2 | 2 | 2 | 2 | 2 | 2 |
| Photostabilizer | | | Sanol LS-770 | 1 | 1 | 1 | 1 | 1 | 1 | 1 | 1 | 1 | 1 |
| Ultraviolet Absorber | | | TINUVIN 327 | 1 | 1 | 1 | 1 | 1 | 1 | 1 | 1 | 1 | 1 |
| Antioxidant | | | Nocrac SP | 1 | 1 | 1 | 1 | 1 | 1 | 1 | 1 | 1 | 1 |
| Dehydrating Agent | | | A-171 | 2 | 2 | 2 | 2 | 2 | 2 | 2 | 2 | 2 | 2 |
| Adhesion-imparting agent | | | A-1120 | 3 | 3 | 3 | 3 | 3 | 3 | 3 | 3 | 3 | 3 |
| Silicate | Component (B) | | Methyl Silicate 51 | | | | | | | 2 | | | |
| Curing Catalyst | Component (D) | | Neostann U-220 | 0.2 | | 0.2 | 2 | | 2 | | 0.2 | 2 | |
| | | | Stann BL | | 0.3 | | | 3 | | | | | 3 |
| | Component (C) | | Neostann U-50 | | | | | | | 3.4 | | | |
| Amine | | | Laurylamine | | | | | | | 0.75 | | | |
| Recovery Ratio | | | (%) | 93 | 93 | 93 | 93 | 94 | 96 | 96 | 67 | 47 | 64 |
| Creep (shear) | | | | "G" | "G" | "G" | "G" | "G" | "G" | "G" | "P" | "P" | "P" |
| Cured Article Properties | M50 | | (MPa) | 0.94 | 0.95 | 1.13 | 0.92 | 0.92 | 1.15 | 0.94 | 1.01 | 0.85 | 0.82 |
| | Tb | | (MPa) | 2.24 | 2.20 | 2.61 | 2.35 | 2.08 | 2.20 | 2.18 | 2.83 | 2.84 | 2.70 |
| | Eb | | (%) | 193 | 196 | 184 | 208 | 208 | 167 | 216 | 269 | 340 | 370 |

Examples 12 to 14 and Comparative Example 6

Added together in accordance with the mixing formulation shown in Table 3 were 100 parts by weight of the reactive silicon group-containing organic polymer (A-1 or A-4 to A-6) obtained in Synthesis Examples 1 and 4 to 6, 120 parts by weight of surface-treated precipitated calcium carbonate (manufactured by Shiraishi Kogyo Co., Ltd. under the trade name of HAKUENKA CCR), 20 parts by weight of titanium oxide (manufactured by Ishihara Sangyo Kaisha, Ltd., under the trade name of Tipaque R-820), 55 parts by weight of a plasticizer diisodecyl phthalate (manufactured by New Japan Chemical Co., Ltd., under the trade name SANSOCIZER DIDP), 2 parts by weight of a thixotropy imparting agent (manufactured by Kusumoto Chemicals, Ltd., under the trade name Disparlon 6500), 1 part by weight of a photostabilizer (manufactured by Sankyo Co., Ltd. under the trade name of Sanol LS-770), 1 part by weight of an ultraviolet absorber (manufactured by Ciba Specialty Chemicals, under the trade name of TINUVIN 327), 1 part by weight of an antioxidant (manufactured by Ouchi Shinko Chemical Industrial Co., Ltd., under the trade name Nocrac SP), 2 parts by weight of a dehydrating agent vinyltrimethoxysilane (manufactured by Nippon Unicar Co., Ltd. under the trade name of A-171), 3 parts by weight of an adhesion-imparting agent N-(β-aminoethyl)-γ-aminopropyltrimethoxysilane (manufactured by Nippon Unicar Co., Ltd. under the trade name of A-1120), and as the curing catalyst, 3.4 parts by weight of tin carboxylate (tin neodecanoate (divalent), manufactured by Nitto Kasei Co., Ltd. under the trade name of U-50), 1.2 parts by weight of a carboxylic acid (neodecanoic acid, manufactured by Japan Epoxy Resins Co., Ltd. under the trade name of Versatic 10) and 0.75 parts by weight of an amine (laurylamine, manufactured by Wako Pure Chemical Industries, Ltd.). The resultant mixture was kneaded under dehydrating conditions in a state in which the mixture was essentially free from water, then sealed into a moisture-proof container to obtain a one-part curable composition.

Each of the compositions of Table 3 was subjected to a tensile test in the same manner as that described above for measuring the M50:50% tensile modulus (MPa), Tb: tensile strength at break (MPa) and Eb: the elongation at break (%). Results are shown in Table 3.

Each of the compositions of Table 3 was measured for recovery ratio in the same manner as that described above. However, in the present test, the 100% elongation state was fixed at 60° C. for 24 hours, released at 23° C., whereby the recovery ratio was determined from the ratio that the token line had recovered after 1 hour. Results are shown in Table 3.

Each of the compositions shown in Table 3 was subjected to a creep test, in the same manner as that described above for Examples 1 to 4, by using a dumbbell specimen for measuring the displacement difference of the token line interval distances between immediately after a load was placed and 200 hours after the load had been placed. Results are shown in Table 3.

A comparison of Examples 12 to 14 with Comparative Example 6 of Table 3 shows that organic polymers (A-1, A-5 and A-6) which have a high number of reactive silicon groups per molecule possess excellent recovery properties and creep resistance.

Synthesis Example 7

Using polyoxypropylene glycol having a molecular weight of about 2,000 as an initiator, propylene oxide was polymerized in the presence of a zinc hexacyanocobaltate glyme complex catalyst to obtain a hydroxyl-terminated polypropylene oxide having a number average molecular weight of about 28,500. This hydroxyl-terminated polypropylene oxide was employed to obtain a metallyl-terminated polypropylene oxide using the same steps as those used in Synthesis Example 6. Using the same steps as those of Synthesis Example 6, the metallyl-terminated polypropylene oxide was reacted with methyldimethoxysilane to obtain a polyoxypropylene polymer (A-7) having on its terminals an average of 1.9 methyldimethoxysilyl groups.

Synthesis Example 8

Using the same steps as those of Synthesis Example 6, the metallyl-terminated polypropylene oxide obtained in Synthesis Example 7 was reacted with methyldimethoxysilane to obtain a polyoxypropylene polymer (A-8) having on its terminals an average of 1.5 methyldimethoxysilyl.

Synthesis Example 9

Using polyoxypropylene glycol having a molecular weight of about 2,000 as an initiator, propyleneoxide was polymerized in the presence of a zinc hexacyanocobaltate glyme complex catalyst to obtain a hydroxyl-terminated polypropylene oxide having a number average molecular weight of about 28,500. This hydroxyl-terminated polypropylene oxide was employed to obtain an allyl-terminated polypropylene

TABLE 3

| Composition (parts by weight) | | | Number of Reactive Silicon Groups Per Molecule | Example 12 | Example 13 | Example 14 | Comparative Example 6 |
|---|---|---|---|---|---|---|---|
| Organic Polymer | Component (A2) | A-5 | 2.0 | 100 | | | |
| | | A-1 | 2.3 | | 100 | | |
| | | A-6 | 2.8 | | | 100 | |
| | | A-4 | 1.5 | | | | 100 |
| | Filler | | HAKUENKA CCR | 120 | 120 | 120 | 120 |
| | | | Tipaque R-820 | 20 | 20 | 20 | 20 |
| | Plasticizer | | SANSOCIZER DIDP | 55 | 55 | 55 | 55 |
| Thixotropy Imparting Agent | | | Disparlon #6500 | 2 | 2 | 2 | 2 |
| Photostabilizer | | | Sanol LS-770 | 1 | 1 | 1 | 1 |
| Ultraviolet Absorber | | | TINUVIN 327 | 1 | 1 | 1 | 1 |
| Antioxidant | | | Nocrac SP | 1 | 1 | 1 | 1 |
| Dehydrating Agent | | | A-171 | 2 | 2 | 2 | 2 |
| Adhesion-imparting agent | | | A-1120 | 3 | 3 | 3 | 3 |
| Curing Catalyst | Tin Carboxylate | | Neostann U-50 | 3.4 | 3.4 | 3.4 | 3.4 |
| | Carboxylic Acid | | Versatic 10 | 1.2 | 1.2 | 1.2 | 1.2 |
| | Amine | | laurylamine | 0.75 | 0.75 | 0.75 | 0.75 |
| Recovery Ratio | | | (%) | 78 | 81 | 86 | 73 |
| Creep | | | (mm) | 2.5 | 2.2 | 1.3 | 3.2 |
| Cured Article Properties | M50 | | (MPa) | 0.35 | 0.43 | 0.68 | 0.38 |
| | Tb | | (MPa) | 2.39 | 2.30 | 1.87 | 2.02 |
| | Eb | | (%) | 601 | 483 | 273 | 502 | oxide using the same steps as those used in Synthesis Example 1. Using the same steps as those of Synthesis Example 1, the allyl-terminated polypropylene oxide was reacted with methyldimethoxysilane to obtain a polyoxypropylene polymer (A-9) having on its terminals an average of 1.5 methyldimethoxysilyl groups.

Examples 15 and 16 and Comparative Examples 7 and 8

Added together in accordance with the mixing formulation shown in Table 4 were 100 parts by weight of the reactive silicon group-containing organic polymer (A-4 or A-7 to A-9) obtained in Synthesis Examples 4 and 7 to 9, 120 parts by weight of surface-treated precipitated calcium carbonate (manufactured by Shiraishi Kogyo Co., Ltd. under the trade name of HAKUENKA CCR), 20 parts by weight of titanium oxide (manufactured by Ishihara Sangyo Kaisha, Ltd., under the trade name of Tipaque R-820), 55 parts by weight of a plasticizer diisodecyl phthalate (manufactured by New Japan Chemical Co., Ltd., under the trade name SANSOCIZER DIDP), 2 parts by weight of a thixotropy imparting agent (manufactured by Kusumoto Chemicals, Ltd., under the trade name Disparlon 6500), 1 part by weight of a photostabilizer (manufactured by Sankyo Co., Ltd. under the trade name of Sanol LS-770), 1 part by weight of an ultraviolet absorber (manufactured by Ciba Specialty Chemicals, under the trade name of TINUVIN 327), 1 part by weight of an antioxidant (manufactured by Ouchi Shinko Chemical Industrial Co., Ltd., under the trade name Nocrac SP), 2 parts by weight of the dehydrating agent vinyltrimethoxysilane (manufactured by Nippon Unicar Co., Ltd. under the trade name of A-171), 3 parts by weight of an adhesion-imparting agent N-(β-aminoethyl)-γ-aminopropyltrimethoxysilane (manufactured by Nippon Unicar Co., Ltd. under the trade name of A-1120), and 2 parts by weight of the curing catalyst dibutyltin bisacetylacetonate (manufactured by Nitto Kasei Co., Ltd. under the trade name of Neostann U-220). The resultant mixture was kneaded under dehydrating conditions in a state in which the mixture was essentially free from water, then sealed into a moisture-proof container to obtain a one-part curable composition.

Each of the compositions of Table 4 was subjected to a tensile test in the same manner as that described above for measuring the M50:50% tensile modulus (MPa), Tb: tensile strength at break (MPa) and Eb: the elongation at break (%). Results are shown in Table 4.

Each of the compositions of Table 4 was measured for recovery ratio in the same manner as that described above. However, in the present test, the 100% elongation state was fixed at 23° C. for 24 hours, released at 23° C., whereby the recovery ratio was determined from the ratio that the token line had recovered after 24 hour. Results are shown in Table 4.

Each of the compositions of Table 4 was subjected to a creep test using a dumbbell specimen in the same manner as that described above for Examples 1 to 4 for measuring the displacement difference of the token line interval distances between immediately after the load was placed and 45 hours after the load was placed. Results are shown in Table 4.

A comparison of Examples 15 and 16 with Comparative Examples 7 and 8 of Table 4 shows that organic polymers (A-7 and A-8), in which a reactive silicon group is introduced into a metallyl-terminated polymer, possess excellent recovery properties and creep resistance.

TABLE 4

| Composition (parts by weight) | | | Structure of terminal group before introducing reactive silicon group | Number of reactive silicon groups per molecule | Example 15 | Example 16 | Comparative Example 7 | Comparative Example 8 |
|---|---|---|---|---|---|---|---|---|
| Organic polymer | Component (A3) | A-7 | Methallyl group | 1.9 | 100 | | | |
| | | A-8 | Methallyl group | 1.5 | | 100 | | |
| | | A-9 | Allyl group | 1.5 | | | 100 | |
| | | A-4 | Allyl group | 1.5 | | | | 100 |
| Filler | | | HAKUENKA CCR | | 120 | 120 | 120 | 120 |
| | | | Tipaque R-820 | | 20 | 20 | 20 | 20 |
| Plasticizer | | | SANSOCIZER-DIDP | | 55 | 55 | 55 | 55 |
| Thixotropy imparting agent | | | Disparlon #6500 | | 2 | 2 | 2 | 2 |
| Photostabilizer | | | Sanol LS-770 | | 1 | 1 | 1 | 1 |
| Ultraviolet Absorber | | | TINUVIN 327 | | 1 | 1 | 1 | 1 |
| Antioxidant | | | Nocrac SP | | 1 | 1 | 1 | 1 |
| Dehydrating Agent | | | A-171 | | 2 | 2 | 2 | 2 |
| Adhesion-imparting agent | | | A-1120 | | 3 | 3 | 3 | 3 |
| Curing Catalyst | | | Neostann U-220 | | 2 | 2 | 2 | 2 |
| Recovery Ratio | | | (%) | | 86 | 84 | 74 | 75 |
| Creep | | | (mm) | | 15 | 22 | 44 | 41 |
| Cured Article Properties | M50 | | (MPa) | | 0.41 | 0.21 | 0.19 | 0.39 |
| | Tb | | (MPa) | | 2.71 | 3.02 | 2.60 | 1.90 |
| | Eb | | (%) | | 652 | 1019 | 1018 | 403 |

Synthesis Example 10

Using the same steps as those of Synthesis Example 1, the allyl-terminated polypropylene oxide obtained in Synthesis Example 1 was reacted with triethoxysilane to obtain a polyoxypropylene polymer (A-10) having on its terminals an average of 2.3 triethoxysilyl groups.

Examples 17 and 18 and Comparative Example 9

Added together in accordance with the mixing formulation shown in Table 5 were 100 parts by weight of the reactive silicon group-containing organic polymer (A-1 or A-10) obtained in Synthesis Examples 1 and 10, 120 parts by weight of surface-treated precipitated calcium carbonate (manufactured by Solvay S.A., under the trade name of Winnofil SPM), 20 parts by weight of titanium oxide (manufactured by Kerr-McGee Corporation, under the trade name of RFK-2), 50 parts by weight of a plasticizer diisoundecyl phthalate (manufactured by Exxon Mobil Chemical Corporation, under the trade name JAYFLEX DIUP), 5 parts by weight of a thixotropy imparting agent (manufactured by Cray Valley, under the trade name Crayvallac super), 1 part by weight of a photostabilizer (manufactured by Sankyo Co., Ltd. under the trade name of Sanol LS-770), 1 part by weight of an ultraviolet absorber (manufactured by Ciba Specialty Chemicals, under the trade name of TINUVIN 327), 1 part by weight of an antioxidant (manufactured by Ouchi Shinko Chemical Industrial Co., Ltd., under the trade name Nocrac SP), 2 parts by weight of vinyltrimethoxysilane as a dehydrating agent (manufactured by Nippon Unicar Co., Ltd. under the trade name of A-171), 3 parts by weight of component (G) γ-aminopropyltriethoxysilane (manufactured by Nippon Unicar Co., Ltd. under the trade name of A-1100) or N-(β-aminoethyl)-γ-aminopropyltrimethoxysilane (manufactured by Nippon Unicar Co., Ltd. under the trade name of A-1120) as a adhesion-imparting agent, and 2 parts by weight of the curing catalyst dibutyltinbisacetylacetonate (manufactured by Nitto Kasei Co., Ltd. under the trade name of Neostann U-220). The resultant mixture was kneaded under dehydrating conditions in a state in which the mixture was essentially free from water, then sealed into a moisture-proof container to obtain a one-part curable composition.

Each of the compositions of Table 5 was measured for recovery ratio in the same manner as that described above. However, in the present test, the 100% elongation state was fixed at 60° C. for 24 hours, released at 23° C., whereby the recovery ratio was determined from the ratio that the token line had recovered after 1 hour. Results are shown in Table 5.

Using each of the compositions shown in Table 5, shear samples were prepared in the same manner as that of Examples 5 to 11 and subjected to a creep test. The displacement difference of the token line interval distances between immediately after the load was placed and 140 hours after the load was placed was measured. The evaluation standards were set at a displacement difference of less than 0.4 mm being evaluated as a "G" and a displacement difference of 0.4 mm or more as a "P". Results are shown in Table 5.

(Curability of the Curable Composition)

Each of the compositions shown in Table 5 was thinly extended to a thickness of about 3 mm. The time taken until a skin covered the surface (skin formation time) under the conditions of 23° C. and a humidity of 50% RH was measured. A shorter skin formation time indicated superior curability. Results are shown in Table 5.

As illustrated in Example 17 of Table 5, using a (A2) component polymer having a triethoxysilyl group on its terminal as the organic polymer in combination with an aminosilane as (G) component having the triethoxysilyl group as the adhesion-imparting agent, provides for excellent recovery properties and creep resistance as well as good storage stability in which there was little variation in skin formation time before and after storage.

Example 19 and Comparative Examples 10 and 11

Added together in accordance with the mixing formulation shown in Table 6 were 100 parts by weight of the reactive silicon group-containing organic polymer (A-2) obtained in Synthesis Example 2, 30 parts by weight of a plasticizer diisodecyl phthalate (manufactured by New Japan Chemical Co., Ltd., under the trade name SANSOCIZER DIDP), 2 parts by weight of tetraethoxysilane (manufactured by Colcoat Co., Ltd., under the trade name Ethyl Silicate 28) as the dehydrating agent, 3 parts by weight of the component (H) N-(β-aminoethyl)-γ-aminopropyltrimethoxysilane (manufactured by Nippon Unicar Co., Ltd. under the trade name of A-1120) or N-(β-aminoethyl)-γ-aminopropyltriethoxysilane (manufactured by Shin-Etsu Chemical Co., Ltd. under the trade name of KBE-603) as a adhesion-imparting agent, and 2 parts by weight of the curing catalyst dibutyltin bisacetylacetonate (manufactured by Nitto Kasei Co., Ltd. under the trade name of Neostann U-220). The resultant mixture was sealed into a glass container that had been purged with nitrogen to obtain a one-part curable composition. In Comparative Example 10, the skin formation time test was carried out under conditions of 23° C. temperature and 50% RH humidity

TABLE 5

| Composition (parts by weight) | | | | Structure of the Reactive Silicon Group | Example 17 | Example 18 | Comparative Example 9 |
|---|---|---|---|---|---|---|---|
| Organic Polymer | Component (A4) | A-10 | | Triethoxysilyl Group | 100 | 100 | |
| | | A-1 | | Methyldimethoxysilyl Group | | | 100 |
| Filler | | | | Winnofil SPM | 120 | 120 | 120 |
| | | | | RFK-2 | 20 | 20 | 20 |
| Plasticizer | | | | JAYFLEX DIUP | 50 | 50 | 50 |
| Thixotropy Imparting Agent | | | | Crayvallac super | 5 | 5 | 5 |
| Photostabilizer | | | | Sanol LS-770 | 1 | 1 | 1 |
| Ultraviolet Absorber | | | | TINUVIN 327 | 1 | 1 | 1 |
| Antioxidant | | | | Nocrac SP | 1 | 1 | 1 |
| Dehydrating Agent | | | | A-171 | 2 | 2 | 2 |
| Adhesion-imparting agent | Component (G) | A-1100 | | Triethoxysilyl Group | 3 | | |
| | | A-1120 | | Trimethoxysilyl Group | | 3 | 3 |
| Curing Catalyst | | | | Neostann U-220 | 2 | 2 | 2 |
| Recovery Ratio | | | | (%) | 87 | 85 | 25 |
| Creep (shear) | | | | | "G" | "G" | "P" |
| Skin Formation Time | Pre-storage | | | (min) | 20 | 15 | 15 |
| | 50° C. × 7 days Post-storage | | | (min) | 20 | 5 | 15 | without aging the obtained one-part curable composition. In Example 19 and Comparative Example 11, an ester exchange reaction was promoted among the reactive silicon groups by aging the obtained one-part curable composition at 50° C. for 7 days, whereafter the skin formation time test was carried out under conditions of 23° C. temperature and 50% RH humidity. Results are shown in Table 6.

trade name of Versatic 10), which is the non-tin catalyst of component (E), and 0.75 parts by weight of an amine (laurylamine, manufactured by Wako Pure Chemical Industries, Ltd.) had been added, while Example 21 used a mixture to which 2 parts by weight of dibutyltin bisacetylacetonate (manufactured by Nitto Kasei Co., Ltd. under the trade name of Neostann U-220) had been added.

TABLE 6

| Composition (parts by weight) | | | Structure of the Reactive Silicon Group | Example 19 | Comparative Example 10 | Comparative Example 11 |
|---|---|---|---|---|---|---|
| Organic Polymer | Component (A4) | A-2 | Triethoxysilyl Group | 100 | 100 | 100 |
| Plasticizer | | | SANSOCIZER DIDP | 30 | 30 | 30 |
| Dehydrating Agent | | | Ethyl Silicate 28 | 2 | 2 | 2 |
| Adhesion-imparting agent | Component (H) | A-1120 | Trimethoxysilyl Group | 3 | 3 | |
| | | KBE-603 | Triethoxysilyl Group | | | 3 |
| Curing Catalyst | | | Neostann U-220 | 2 | 2 | 2 |
| 50° C. × 7 days Aging | | | | yes | no | yes |
| Skin Formation Time | | | (min) | 3 | 13 | 12 |

As illustrated in Example 19 of Table 6, using a (A2) component polymer having a triethoxysilyl group on its terminal as the organic polymer in combination with an aminosilane as (H) component having the methoxysilyl group as the adhesion-imparting agent, enables a dramatic improvement in the curability of the organic polymer, if an ester exchange reaction through aging is promoted.

Examples 20 and 21

Added together were 100 parts by weight of the reactive silicon group-containing organic polymer (A-10) obtained in Synthesis Example 10, 120 parts by weight of surface-treated precipitated calcium carbonate (manufactured by Shiraishi Kogyo Co., Ltd. under the trade name of HAKUENKA CCR), 20 parts by weight of titanium oxide (manufactured by Ishihara Sangyo Kaisha, Ltd., under the trade name of Tipaque R-820), 55 parts by weight of a plasticizer diisodecyl phthalate (manufactured by New Japan Chemical Co., Ltd., under the trade name SANSOCIZER DIDP), 2 parts by weight of a thixotropy imparting agent (manufactured by Kusumoto Chemicals, Ltd., under the trade name Disparlon 6500), 1 part by weight of a photostabilizer (manufactured by Sankyo Co., Ltd. under the trade name of Sanol LS-770), 1 part by weight of an ultraviolet absorber (manufactured by Ciba Specialty Chemicals, under the trade name of TINUVIN 327), 1 part by weight of an antioxidant (manufactured by Ouchi Shinko Chemical Industrial Co., Ltd., under the trade name Nocrac SP), 2 parts by weight of the dehydrating agent vinyltrimethoxysilane (manufactured by Nippon Unicar Co., Ltd. under the trade name of A-171), 3 parts by weight of an adhesion-imparting agent N-(β-aminoethyl)-γ-aminopropyltrimethoxysilane (manufactured by Nippon Unicar Co., Ltd. under the trade name of A-1120), and the respective kinds of curing catalyst which shall be described below. The resultant mixture was kneaded under dehydrating conditions in a state in which the mixture was essentially free from water, then sealed into a moisture-proof container to obtain a one-part curable composition. As the curing catalyst, Example 20 used a mixture to which 6 parts by weight of neodecanoic acid (manufactured by Japan Epoxy Resins Co., Ltd. under the Each of these compositions was measured for recovery ratio in the same manner as that described above. However, in the present test, the 100% elongation state was fixed at 80° C. for 24 hours, released at 23° C., whereby the recovery ratio was determined from the ratio that the token line had recovered after 1 hour. The results showed that the recovery ratios of Example 20 and Example 21 were both high at respectively 86% and 80%, although the combination with the non-tin catalyst of Example 20 showed an especially high recovery ratio.

Synthesis Example 11

Using polyoxypropylene glycol having a molecular weight of about 2,000 as an initiator, propyleneoxide was polymerized in the presence of a zinc hexacyanocobaltate glyme complex catalyst to obtain a hydroxyl-terminated polypropylene oxide having a number average molecular weight of about 25,500. This hydroxyl-terminated polypropylene oxide was employed to obtain an allyl-terminated polypropylene oxide using the same steps as those used in Synthesis Example 1. This allyl-terminated polypropylene oxide was, in the same manner as in Synthesis Example 1, reacted with triethoxysilane to obtain a polyoxypropylene polymer (A-11) having on its terminals an average of 1.5 triethoxysilyl groups.

Synthesis Example 12

The allyl-terminated polypropylene oxide obtained in Synthesis Example 11 was, in the same manner as in Synthesis Example 1, reacted with methyldimethoxysilane to obtain a polyoxypropylene polymer (A-12) having on its terminals an average of 1.5 methyldimethoxysilyl groups.

Examples 22 and 23 and Comparative Examples 12 and 13

Weighed out in accordance with the mixing formulation shown in Table 7, and thoroughly kneaded using a paint roller with 3 rolls to form a main ingredient, were 95 parts by weight of the reactive silicon group-containing organic polymer (A-11 or A-12) obtained in Synthesis Examples 11 and 12, 60 parts by weight of surface-treated precipitated calcium carbonate (manufactured by Shiraishi Kogyo Co., Ltd. under the trade name of HAKUENKA CCR), 60 parts by weight of surface-treated precipitated calcium carbonate (manufactured by Shiraishi Kogyo Co., Ltd. under the trade name of Viscolite R), 20 parts by weight of ground calcium carbonate (manufactured by Shiraishi Calcium Co., Ltd. under the trade name of Whiton SB), 40 parts by weight of a plasticizer di-2-ethylhexyl phthalate (manufactured by New Japan Chemical Co., Ltd., under the trade name SANSOCIZER DOP), 20 parts by weight of an epoxy-type plasticizer (manufactured by New Japan Chemical Co., Ltd., under the trade name SANSOCIZER EP-S), 3 parts by weight of a thixotropy imparting agent (manufactured by Kusumoto Chemicals, Ltd., under the trade name Disparlon 305), 3 parts by weight of a photocurable resin (manufactured by Toagosei Co., Ltd. under the trade name of ARONIX M-309), 1 part by weight of a photostabilizer (manufactured by Sankyo Co., Ltd. under the trade name of Sanol LS-770), 1 part by weight of an ultraviolet absorber (manufactured by Ciba Specialty Chemicals, under the trade name of TINUVIN 327), 1 part by weight of an antioxidant (manufactured by Ciba Specialty Chemicals, under the trade name Irganox 1010), and 0 parts or 20 parts of the component (F) microballoons (manufactured by Fuji Silysia Chemical Ltd., under the trade name Fuji Balloon H-40). In Example 22, a mixture was used which employed (A-11) as the organic polymer and contained 20 parts of the microballoons, while in Example 23 a mixture was used which employed (A-11) as the organic polymer and contained 0 parts of the microballoons. In Comparative Example 12, a mixture was used which employed (A-12) as the organic polymer and contained 20 parts of the microballoons, while in Comparative Example 13 a mixture was used which employed (A-12) as the organic polymer and contained 0 parts of the microballoons.

A curing agent consisting of 3 parts by weight of tin 2-ethylhexanoate (divalent) (manufactured by Nitto Kasei Co., Ltd. under the trade name of U-28) and 0.75 parts by weight of an amine (laurylamine, manufactured by Wako Pure Chemical Industries, Ltd.) was mixed with the above-described main ingredient to form a uniform mixture for evaluating workability (thread-pulling properties) and the compression recovery ratio.

(Compression Recovery Ratio)

H-shaped specimens as defined in JIS A 5758 were prepared using each of the compositions of Table 7, and subjected to aging at 23° C. for 7 days and 50° C. for 7 days. The specimens were immersed in 50° C. warm water for 24 hours, then allowed to stand under normal conditions of 23° C. for 24 hours. The H-shaped specimens were then compressed by 30%, and fixed at 90° C. for 7 days. The specimens were released at 23° C., and the recovery ratio was measured after 24 hours. A greater recovery ratio indicated superior recovery properties. Results are shown in Table 7.

TABLE 7

| Composition (parts by weight) | | | Reactive Silicon Group Structure | Example 22 | Example 23 | Comparative Example 12 | Comparative Example 13 |
|---|---|---|---|---|---|---|---|
| Organic Polymer | Component (A4) | A-11 | Triethoxysilyl Group | 95 | 95 | | |
| | | A-12 | Methyldimethoxysilyl Group | | | 95 | 95 |
| Filler | | | HAKUENKA CCR | 60 | 60 | 60 | 60 |
| | | | Viscolite R | 60 | 60 | 60 | 60 |
| | | | Whiton SB | 20 | 20 | 20 | 20 |
| Plasticizer | | | SANSOCIZER DOP | 40 | 40 | 40 | 40 |
| | | | SANSOCIZER EP-S | 20 | 20 | 20 | 20 |
| Thixotropy Imparting Agent | | | Disparlon #309 | 3 | 3 | 3 | 3 |
| Photocurable Resin | | | ARONIX M-309 | 3 | 3 | 3 | 3 |
| Photostabilizer | | | Sanol LS-770 | 1 | 1 | 1 | 1 |
| Ultraviolet Absorber | | | TINUVIN 327 | 1 | 1 | 1 | 1 |
| Antioxidant | | | Irganox 1010 | 1 | 1 | 1 | 1 |
| Microballoons | Component (F) | | Fuji Balloon H-40 | 20 | 0 | 20 | 0 |
| Curing Catalyst | Tin Carboxylate | | Neostann U-28 | 3 | 3 | 3 | 3 |
| | Amine | | Laurylamine | 0.75 | 0.75 | 0.75 | 0.75 |
| Workability | | | | "G" | "M" | "G" | "M" |
| Compression Recovery Ratio | | | (%) | 64 | 59 | 39 | 36 |

The composition of Example 22 had superior workability than that of Example 23, and a superior recovery ratio to those of Comparative Examples 12 and 13.

Examples 24 and 25 and Comparative Examples 14 to 16

Weighed out in accordance with the mixing formulation shown in Table 8, and thoroughly kneaded using a paint roller with 3 rolls to form a main ingredient, were 60 parts by weight of a surface-treated precipitated calcium carbonate (manufactured by Shiraishi Kogyo Co., Ltd. under the trade name of HAKUENKA CCR), 60 parts by weight of a surface-treated precipitated calcium carbonate (manufactured by Shiraishi Kogyo Co., Ltd. under the trade name of Viscolite R), 20 parts by weight of ground calcium carbonate (manufactured by Shiraishi Calcium Co., Ltd. under the trade name of Whiton SB), 40 parts by weight of a plasticizer di-2-ethylhexyl phthalate (manufactured by New Japan Chemical Co., Ltd., under the trade name SANSOCIZER DOP), 20 parts by weight of an epoxy-type plasticizer (manufactured by New Japan Chemical Co., Ltd., under the trade name SANSOCIZER EP-S), 3 parts by weight of a thixotropy imparting agent (manufactured by Kusumoto Chemicals, Ltd., under the trade name Disparlon 305), 3 parts by weight of a photocurable resin (manufactured by Toagosei Co., Ltd. under the trade name of ARONIX M-309), 1 part by weight of a photostabilizer (manufactured by Sankyo Co., Ltd. under the trade name of Sanol LS-770), 1 part by weight of an ultraviolet absorber (manufactured by Ciba Specialty Chemicals, under the trade name of TINUVIN 327), and 1 part by weight of an antioxidant (manufactured by Specialty Chemicals, under the trade name Irganox 1010). The amount defined in Table 8 of the reactive silicon group-containing organic polymer (A-10) obtained in Synthesis Example 10 or the reactive silicon group-containing organic polymer (A-1) obtained in Synthesis Example 1 was added to this main ingredient. In Example 24, 70 parts of (A-10) had been added as the organic polymer, while in Example 25 50 parts of (A-10) had been added as the organic polymer. In Comparative Example 14, 95 parts of (A-1) had been added as the organic polymer, while in Comparative Example 15 70 parts of (A-1) had been added as the organic polymer, and in Comparative Example 16 50 parts of (A-1) had been added as the organic polymer. Mixed into this main ingredient was a curing agent consisting of 3 parts by weight of tin 2-ethylhexanoate (divalent) (manufactured by Nitto Kasei Co., Ltd. under the trade name of U-28) and 0.75 parts by weight of an amine (laurylamine, manufactured by Wako Pure Chemical Industries, Ltd.). Dumbbell-type cured articles were prepared in the same manner as that described above for evaluation of the recovery properties. However, in the present test, the 100% elongation state was fixed at 90° C. for 24 hours, released at 23° C., whereby the recovery ratio was determined from the ratio that the token line had recovered after hour. Results are shown in Table 8.

SB), 40 parts by weight of a plasticizer di-2-ethylhexyl phthalate (manufactured by New Japan Chemical Co., Ltd., under the trade name SANSOCIZER DOP), 20 parts by weight of an epoxy-type plasticizer (manufactured by New Japan Chemical Co., Ltd., under the trade name SANSOCIZER EP-S), 3 parts by weight of a thixotropy imparting agent (manufactured by Kusumoto Chemicals, Ltd., under the trade name Disparlon 305), 3 parts by weight of a photocurable resin (manufactured by Toagosei Co., Ltd. under the trade name of ARONIX M-309), 1 part by weight of a photostabilizer (manufactured by Sankyo Co., Ltd. under the trade name of Sanol LS-770), 1 part by weight of an ultraviolet absorber (manufactured by Ciba Specialty Chemicals, under the trade name of TINUVIN 327), 1 part by weight of an antioxidant (manufactured by Ciba Specialty Chemicals, under the trade name Irganox 1010), and 0 parts or 5 parts of an epoxy resin (manufactured by Japan Epoxy Resins Co., Ltd., under the trade name of Epikote 828). The mixture which employed 5 parts of the epoxy resin was used for Example 26, while the mixture which employed 0 parts by weight of the epoxy resin was used for Example 27. Mixed into this main ingredient was a curing agent consisting of 3 parts by weight of tin 2-ethylhexanoate (divalent) (manufactured by Nitto Kasei Co., Ltd. under the trade name of U-28) and 0.75 parts by weight of an amine (laurylamine, manufactured by Wako Pure Chemical Industries, Ltd.). H-shaped cured articles were prepared in the same manner as described above for measurement of the compression recovery ratio.

The compounds of Examples 26 and 27 both showed a high compression recovery ratio, although that of Example 26 in particular showed a high recovery ratio from the combination with the epoxy resin.

TABLE 8

| Composition (parts by weight) | | | Structure of reactive silicon group | Example 24 | Example 25 | Comparative Example 14 | Comparative Example 15 | Comparative Example 16 |
|---|---|---|---|---|---|---|---|---|
| Organic polymer | Component (A4) | A-10 | Triethoxysilyl group | 70 | 50 | | | |
| | | A-1 | Methyldimethoxysilyl group | | | 95 | 70 | 50 |
| Filler | | | HAKUENKA CCR | 60 | 60 | 60 | 60 | 60 |
| | | | Viscolite R | 60 | 60 | 60 | 60 | 60 |
| | | | Whiton SB | 20 | 20 | 20 | 20 | 20 |
| Plasticizer | | | SANSOCIZER-DOP | 40 | 40 | 40 | 40 | 40 |
| | | | SANSOCIZER-E-PS | 20 | 20 | 20 | 20 | 20 |
| Thixotropy imparting agent | | | Disparlon #309 | 3 | 3 | 3 | 3 | 3 |
| Photocurable resin | | | ARONIX M-309 | 3 | 3 | 3 | 3 | 3 |
| Photostabilizer | | | Sanol LS-770 | 1 | 1 | 1 | 1 | 1 |
| Ultraviolet Absorber | | | TINUVIN 327 | 1 | 1 | 1 | 1 | 1 |
| Antioxidant | | | Irganox 1010 | 1 | 1 | 1 | 1 | 1 |
| Curing catalyst | Tin carboxylate | | Neostann U-28 | 3 | 3 | 3 | 3 | 3 |
| | Amine | | Laurylamine | 0.75 | 0.75 | 0.75 | 0.75 | 0.75 |
| Wt % of organic polymer in the composition | | | (wt %) | 25 | 19 | 31 | 25 | 19 |
| Recovery Ratio | | | (%) | 91 | 88 | 77 | 69 | 66 |

The compounds of Examples 24 and 25, while suppressing the weight % of the organic polymer, showed a higher recovery ratio than that of Comparative Example 14, which had a high weight % of organic polymer.

Examples 26 and 27

Weighed out and thoroughly kneaded using a paint roller with 3 rolls to form a main ingredient were 95 parts by weight of the reactive silicon group-containing organic polymer (A-10) obtained in Synthesis Example 10, 60 parts by weight of surface-treated precipitated calcium carbonate (manufactured by Shiraishi Kogyo Co., Ltd. under the trade name of HAKUENKA CCR), 60 parts by weight of surface-treated precipitated calcium carbonate (manufactured by Shiraishi Kogyo Co., Ltd. under the trade name of Viscolite R), 20 parts by weight of ground calcium carbonate (manufactured by Shiraishi Calcium Co., Ltd. under the trade name of Whiton Examples 28 and 29

Weighed out and thoroughly kneaded using a paint roller with 3 rolls to form a main ingredient were 95 parts by weight of the reactive silicon group-containing organic polymer (A-10) obtained in Synthesis Example 10, 60 parts by weight of surface-treated precipitated calcium carbonate (manufactured by Shiraishi Kogyo Co., Ltd. under the trade name of HAKUENKA CCR), 60 parts by weight of surface-treated precipitated calcium carbonate (manufactured by Shiraishi Kogyo Co., Ltd. under the trade name of Viscolite R), 20 parts by weight of ground calcium carbonate (manufactured by Shiraishi Calcium Co., Ltd. under the trade name of Whiton SB), 40 parts by weight of a plasticizer di-2-ethylhexyl phthalate (manufactured by New Japan Chemical Co., Ltd., under the trade name SANSOCIZER DOP), 20 parts by weight of an epoxy-type plasticizer (manufactured by New Japan Chemical Co., Ltd., under the trade name SANSOCIZER EP-S), 3 parts by weight of a thixotropy imparting agent (manufactured by Kusumoto Chemicals, Ltd., under the trade name Disparlon 305), 3 parts by weight of a photocurable resin (manufactured by Toagosei Co., Ltd. under the trade name of ARONIX M-309), 1 part by weight of a photostabilizer (manufactured by Sankyo Co., Ltd. under the trade name of Sanol LS-770), 1 part by weight of an ultraviolet absorber (manufactured by Ciba Specialty Chemicals, under the trade name of TINUVIN 327), and 1 part by weight of an antioxidant (manufactured by Ciba Specialty Chemicals, under the trade name Irganox 1010).

For Example 28, a mixture of 3 parts by weight of tin 2-ethylhexanoate (divalent) (manufactured by Nitto Kasei Co., Ltd. under the trade name of U-28), 0.75 parts by weight of an amine (laurylamine, manufactured by Wako Pure Chemical Industries, Ltd.) and 0.1 parts by weight of dibutyltin bisacetylacetonate (manufactured by Nitto Kasei Co., Ltd. under the trade name of Neostann U-220) was used as the curing agent, while for Example 29, a mixture of 3 parts by weight of tin 2-ethylhexanoate (divalent) (manufactured by Nitto Kasei Co., Ltd. under the trade name of U-28) and 0.75 parts by weight of an amine (laurylamine, manufactured by Wako Pure Chemical Industries, Ltd.) was used as the curing agent. The main ingredient and the curing agent were mixed uniformly together for evaluation of recovery ratio and thin-layer curability. Recovery ratio was, in the same manner as described above, measured by stretching a dumbbell-shaped cured article to 100%, fixing at 90° C. for 24 hours, then released at 23° C., whereby the recovery ratio was determined from the ratio that the token line had recovered after 1 hour.

Thin-layer curability was evaluated in the following manner. The above-described main ingredient and curing agent were weighed out, and mixed under stirring for 3 minutes using a spatula. The resulting mixture was placed onto an anodized aluminum (manufactured by Engineering Test Services Co., Ltd., measuring 0.8×70×150 mm) which conformed to JIS H4000. An applicator was used to prepare a 25 µm thin-layer. This thin-layer was immediately placed into a 50° C. dryer. After 1 day, the thin-layer portion of the sealant was touched with the finger to observe whether curing had occurred or not.

The recovery ratios of Example 28 and Example 29 were both high at respectively 90% and 92%. Moreover, Example 28 exhibited good thin-layer curability.

Synthesis Example 13

An allyl-terminated polyisobutylene obtained in accordance with the preparation examples described in Japanese Patent Publication No. 11-209639 was reacted with triethoxysilane in the presence of a Pt catalyst, to thereby obtain polyisobutylene (A-13) having triethoxysilyl groups on its terminals.

Synthesis Example 14

The allyl-terminated polyisobutylene obtained in Synthesis Example 13 was reacted with methyldimethoxysilane in the presence of a Pt catalyst, to thereby obtain polyisobutylene (A-14) having methyldimethoxysilyl groups on its terminals.

Example 30 and Comparative Example 17

In relation to 100 parts by weight of the reactive silicon group-containing organic polymers (A-13 and A-14) obtained in Synthesis Examples 13 and 14, 2 parts by weight of dibutyltin bisacetylacetonate (manufactured by Nitto Kasei Co., Ltd. under the trade name of Neostann U-220) was added to thereby obtain a cured article. The article in which A-13 was used as the organic polymer was taken as Example 30, while the article in which A-14 was used as the organic polymer was taken as Comparative Example 17. The cured article of Example 30 exhibited a higher recovery ratio than that of Comparative Example 17.

Synthesis Example 15

CuBr (4.2 g) and acetonitrile (27.3 g) were charged into a reaction vessel equipped with a stirrer, and stirred at 65° C. for 15 minutes under a nitrogen atmosphere. Added to the resultant mixture were n-butylacrylate (100 g), diethyl 2,5-dibromoadipate (8.8 g) and acetonitrile (16.6 g), and this mixture was thoroughly stirred. Pentamethyldiethylenetriamine (0.17) was added to the resultant mixture to initiate polymerization. While stirring under heat at 70° C., n-butyl acrylate (400 g) was continuously dropped. During the n-butyl acrylate dropping, triamine (0.68 g) was dropped divided in some portions.

When the monomer reaction ratio had reached 96%, the residual monomer and acetonitrile were evaporated off at 80° C., then 1,7-octadiene (53.7 g), acetonitrile (132 g) and triamine (1.69 g) were charged therein. The resulting mixture was subsequently stirred under heat at 70° C., to thereby obtain a mixture containing a polymer having alkenyl groups.

The acetonitrile and unreacted 1,7-octadiene in the mixture were evaporated away under heat, and the resulting mixture was diluted with methylcyclohexane. Undissolved polymer catalyst was made to precipitate using a centrifugal separator and removed. An absorbent in the amount of 6 parts absorbent (3 parts of KYOWAAD 500SH to 3 parts of KYOWAAD 700SL; both manufactured by Kyowa Chemical Industry Co., Ltd.) per 100 parts of polymer was added into a methylcyclohexane solution of the polymer and the resultant solution was stirred under heat in an oxygen-nitrogen gas atmosphere. Undissolved portions were removed and the polymer solution was concentrated to thereby obtain a polymer (polymer [P1]) having alkenyl groups.

The obtained polymer [P1] was evaporated off under heat (reduced pressure of 10 torr or less) while stirring at 180° C. for 12 hours, and 100 parts of the resultant polymer were diluted with 400 parts of methylcyclohexane. After the formed solid portion was removed, the solution was concentrated to thereby obtain polymer [P2]. Polymer [P2] had a number average molecular weight of 24,800 and a molecular distribution of 1.36. The number of introduced alkenyl groups per 1 polymer molecule was 1.8.

To this polymer [P2] were added and mixed in order methyl orthoformate (1 mole equivalent per alkenyl group), a platinum catalyst (10 mg per 1 kg of polymer as the platinum metal amount) and 1-(2-trimethoxysilylethynyl)-1,1,3,3-tetramethyldisiloxane (1.5 mole equivalent per alkenyl group). This mixture was stirred under heat under a nitrogen atmosphere at 100° C. for 0.5 hours. The fact that the alkenyl groups had been eliminated by the reaction was confirmed by ¹H-NMR. The reaction mixture was concentrated to thereby obtain the desired polymer (A-15), which contained trimethoxysilyl groups. The number average molecular weight was 27,900 and molecular distribution was 1.32. The number of introduced silyl groups per 1 polymer molecule was 1.7.

Synthesis Example 16

A triethoxysilyl-group-containing polymer (A-16) was prepared in the same manner as in Synthesis Example 15, except that triethoxysilane (3 mole equivalent per alkenyl group) was used in place of the 1-(2-trimethoxysilylethynyl)-1,1,3,3-tetramethyldisiloxane used in Synthesis Example 15 for the polymer [P2] obtained in Synthesis Example 15. The number average molecular weight was 28,600 and molecular distribution was 1.48. The number of introduced silyl groups per 1 polymer molecule was 1.5.

Synthesis Example 17

A methyldimethoxysilyl-group-containing polymer (A-17) was prepared in the same manner as in Synthesis Example 15, except that methyldimethoxysilane (3 mole equivalent per alkenyl group) was used in place of the 1-(2-trimethoxysilylethynyl)-1,1,3,3-tetramethyldisiloxane used in Synthesis Example 15 for the polymer [P2] obtained in Synthesis Example 15. The number average molecular weight was 28,400 and molecular distribution was 1.51. The number of introduced silyl groups per 1 polymer molecule was 1.5.

Examples 31 to 34 and Comparative Example 18

Added in relation to 100 parts by weight of an organic polymer having a reactive silicon group were 150 parts by weight of surface-treated precipitated calcium carbonate (manufactured by Shiraishi Kogyo Co., Ltd. under the trade name of HAKUENKA CCR), 20 parts by weight of ground calcium carbonate (manufactured by Maruo Calcium Co., Ltd., under the trade name of NANOX 25A), 10 parts by weight of titanium oxide (manufactured by Ishihara Sangyo Kaisha, Ltd., under the trade name of Tipaque R-820), 60 parts by weight of a plasticizer diisodecyl phthalate (manufactured by New Japan Chemical Co., Ltd., under the trade name SANSOCIZER DIDP), 2 parts by weight of a thixotropy imparting agent (manufactured by Kusumoto Chemicals, Ltd., under the trade name Disparlon 6500), 1 part by weight of a photostabilizer (manufactured by Sankyo Co., Ltd. under the trade name of Sanol LS-765), 1 part by weight of an ultraviolet absorber (manufactured by Ciba Specialty Chemicals, under the trade name of TINUVIN 213), 2 parts by weight of the dehydrating agent vinyltrimethoxysilane (manufactured by Nippon Unicar Co., Ltd. under the trade name of A-171), 2 parts by weight of an adhesion-imparting agent N-(β-aminoethyl)-γ-aminopropyltrimethoxysilane (manufactured by Nippon Unicar Co., Ltd. under the trade name of A-1120), and as the curing catalyst, 0.2 parts by weight of dibutyltin bisacetylacetonate (manufactured by Nitto Kasei Co., Ltd. under the trade name of Neostann U-220). The resultant mixture was kneaded under dehydrating conditions in a state in which the mixture was essentially free from water, then sealed into a moisture-proof container to obtain a one-part curable composition. As the organic polymer having a reactive silicon group, Example 31 used 100 parts by weight of the acrylic ester polymer (A-15) having a trimethoxysilyl group obtained in Synthesis Example 15; Example 32 used a 100 parts by weight mixture consisting of 50 parts by weight of (A-15) and 50 parts by weight of the polyoxypropylene polymer (A-4) having a methyldimethoxysilyl group obtained in Synthesis Example 4; Example 33 used 100 parts by weight of the acrylic ester polymer (A-16) having a triethoxysilyl group obtained in Synthesis Example 16; Example 34 used a 100 parts by weight mixture consisting of 50 parts by weight of (A-16) and 50 parts by weight of the polyoxypropylene polymer (A-3) having a triethoxysilyl group obtained in Synthesis Example 3; and Comparative Example 18 used a 100 parts by weight of the acrylic ester polymer (A-17) having a methyldimethoxysilyl group obtained in Synthesis Example 17. The cured articles of Examples 31 to 34 exhibited a higher recovery ratio than that of Comparative Example 18.

The invention claimed is:
1. A curable composition comprising:
an organic polymer (A1) having one or more silicon-containing functional groups capable of cross-linking by forming siloxane bonds in which the one or more silicon-containing functional groups capable of cross-linking by forming siloxane bonds each are a trimethoxysilyl group or a triethoxysilyl group, wherein the silicon-containing functional groups are located at the terminals of the molecular chain of the organic polymer (A1); and
a component which is a silicate (B) and further comprising a tin neodecanoate
wherein a main chain skeleton of the organic polymer (A1) is a polyoxyalkylene polymer.
2. The curable composition according to claim 1, wherein the silicate (B) is a condensate of a tetraalkoxysilane.
3. The curable composition according to claim 1, wherein the organic polymer having one or more silicon-containing functional groups capable of cross-linking by forming siloxane bonds is an organic polymer obtained by an addition reaction between an organic polymer having one or more unsaturated groups introduced into the terminals thereof and a hydrosilane compound represented by the general formula (1):

$$H-SiX_3 \qquad (1)$$

where X represents a hydroxy group or a hydrolyzable group, and three X's may be the same or different.
4. The curable composition according to claim 1, wherein the organic polymer having one or more silicon-containing functional groups capable of cross-linking by forming siloxane bonds is an organic polymer which substantially does not contain an amide segment (—NH—CO—) in the main chain skeleton thereof.
5. The curable composition according to claim 1, wherein the one or more silicon-containing functional groups capable of cross-linking by forming siloxane bonds each are a triethoxysilyl group.
6. The curable composition according to claim 1, further comprising an aminosilane coupling agent.
7. A one-part curable composition according to claim 1, further comprising a dehydrating agent.

* * * * *